(12) United States Patent
Kaga et al.

(10) Patent No.: US 8,456,569 B2
(45) Date of Patent: Jun. 4, 2013

(54) CAMERA BODY AND IMAGING UNIT ATTACHABLE TO AND DETACHABLE FROM CAMERA BODY, AND IMAGING APPARATUS

(75) Inventors: Ryota Kaga, Tokyo (JP); Junichi Shinohara, Yokohama (JP); Shu Kambe, Fujisawa (JP); Takashi Tada, Kawasaki (JP)

(73) Assignee: Ricoh Company, Ltd., Tokyo (JP)

( * ) Notice: Subject to any disclaimer, the term of this patent is extended or adjusted under 35 U.S.C. 154(b) by 320 days.

(21) Appl. No.: 12/916,948

(22) Filed: Nov. 1, 2010

(65) Prior Publication Data
US 2011/0102668 A1   May 5, 2011

(30) Foreign Application Priority Data
Nov. 5, 2009   (JP) .................................. 2009-253772

(51) Int. Cl.
| | |
|---|---|
| H04N 5/225 | (2006.01) |
| H04N 9/04 | (2006.01) |
| G02B 13/16 | (2006.01) |
| G03B 17/00 | (2006.01) |
| G03B 17/02 | (2006.01) |

(52) U.S. Cl.
USPC ...... 348/374; 348/207.99; 348/373; 348/375; 348/376; 348/335; 396/419; 396/529; 396/535

(58) Field of Classification Search
USPC ................ 348/207.99, 222.1, 335, 373–376, 348/211.14; 396/419–428, 529–533, 544
See application file for complete search history.

(56) References Cited

U.S. PATENT DOCUMENTS

| | | | |
|---|---|---|---|
| 6,742,943 B2 * | 6/2004 | Ushiro ........................... | 396/529 |
| 7,259,923 B2 | 8/2007 | Nuno et al. | |

(Continued)

FOREIGN PATENT DOCUMENTS

| | | |
|---|---|---|
| CN | 2504663 | 8/2002 |
| CN | 2511999 | 9/2002 |

(Continued)

OTHER PUBLICATIONS

U.S. Appl. No. 12/938,753, filed Nov. 3, 2010, Shinohara, et al.

(Continued)

*Primary Examiner* — Michael Osinski
(74) *Attorney, Agent, or Firm* — Oblon, Spivak, McClelland, Maier & Neustadt, L.L.P.

(57) ABSTRACT

A camera body includes a camera body connector and a recess to which an imaging unit including an optical system, an image pickup device, and an imaging unit connector is detachably attached to be placed therein. The recess includes a back wall, an upper wall, and a side wall to be opened to a lower side, a front side, and a lateral side of the camera body. The camera body has a guide mechanism to control a position of the camera body connector in relation to a position of the imaging unit connector. The imaging unit has a rear surface on which at least two guiding grooves provided to be extended between opposite edges of the imaging unit and an engagement plate section are formed. The imaging unit has a biasing member to bias the imaging unit toward the back wall. The guide mechanism has at least two guide protrusions provided on the back wall and inserted into the at least two guiding grooves and an engagement claw formed on the back wall so as to face the engagement plate section and to engage with the biasing member when the imaging unit is attached to the camera body.

20 Claims, 41 Drawing Sheets

U.S. PATENT DOCUMENTS

| | | | |
|---|---|---|---|
| 7,280,147 B2 | 10/2007 | Kitajima et al. | |
| 7,286,164 B2 | 10/2007 | Shinohara et al. | |
| 7,477,454 B2 | 1/2009 | Shinohara et al. | |
| 7,505,216 B2 | 3/2009 | Nuno | |
| 7,625,143 B2 * | 12/2009 | Matsushita et al. | 396/529 |
| 7,645,080 B2 * | 1/2010 | Toji | 396/531 |
| 7,664,385 B2 | 2/2010 | Shinohara | |
| 7,683,939 B2 | 3/2010 | Shinohara et al. | |
| 7,738,031 B2 | 6/2010 | Shinohara | |
| 7,983,557 B2 * | 7/2011 | Misawa et al. | 396/541 |
| 2004/0062545 A1 * | 4/2004 | Ushiro | 396/529 |
| 2005/0024528 A1 * | 2/2005 | Kurosawa | 348/375 |
| 2005/0062876 A1 * | 3/2005 | Okutani et al. | 348/371 |
| 2005/0200737 A1 | 9/2005 | Shinohara et al. | |
| 2006/0078324 A1 * | 4/2006 | Yasuda et al. | 396/299 |
| 2006/0088314 A1 * | 4/2006 | Matsushita et al. | 396/529 |
| 2006/0268159 A1 * | 11/2006 | Orimoto et al. | 348/373 |
| 2007/0058972 A1 * | 3/2007 | Misawa | 396/541 |
| 2007/0077062 A1 * | 4/2007 | Senba et al. | 396/529 |
| 2007/0077063 A1 * | 4/2007 | Tokiwa et al. | 396/532 |
| 2007/0086772 A1 | 4/2007 | Shinohara | |
| 2007/0086778 A1 * | 4/2007 | Tanaka | 396/529 |
| 2007/0268371 A1 * | 11/2007 | Misawa et al. | 348/207.99 |
| 2007/0273786 A1 * | 11/2007 | Ahn et al. | 348/373 |
| 2008/0218622 A1 | 9/2008 | Shinohara | |
| 2009/0067826 A1 | 3/2009 | Shinohara et al. | |

FOREIGN PATENT DOCUMENTS

| | | |
|---|---|---|
| CN | 1577047 | 2/2005 |
| CN | 1940702 | 4/2007 |
| CN | 102405439 | 4/2012 |
| JP | 2000-010166 | 1/2000 |
| JP | 2005-354177 | 12/2005 |
| JP | 2007-295091 | 11/2007 |
| JP | 2008-276079 | 11/2008 |
| JP | 2008276079 | * 11/2008 |
| WO | WO 2011/030928 A1 | 3/2011 |

OTHER PUBLICATIONS

Office Action issued Dec. 18, 2012 in Chinese Patent Application No. 201010624265.0 filed Nov. 5, 2009 (with English translation)—11 pages.

* cited by examiner

US 8,456,569 B2

CAMERA BODY AND IMAGING UNIT ATTACHABLE TO AND DETACHABLE FROM CAMERA BODY, AND IMAGING APPARATUS

CROSS REFERENCE TO RELATED APPLICATION

The present application is based on and claims priority from Japanese Patent Application No. 2009-253772, filed on Nov. 5, 2009, the disclosure of which is hereby incorporated by reference in its entirety.

BACKGROUND OF THE INVENTION

1. Field of the Invention

The present invention relates to improvements of a camera body which an imaging unit is attached to or detached from, an imaging unit which is attached to or detached from the camera body, and an imaging apparatus including a combination of the imaging unit and the camera body.

2. Description of the Related Art

Conventionally, an imaging apparatus in which an imaging unit is detachably attachable to a camera body has been known (see Japanese Patent Application Publication No. 2005-354177, for example).

In this conventional imaging apparatus, a camera body has a housing recess to which an imaging unit is detachably attached to be housed therein. The housing recess includes a back wall section, and includes an upper wall section, a lower wall section and a side wall section which are integrally formed with the back wall section. In the camera body, an attachment/detachment opening is provided on the side far from the side wall section, the attachment/detachment opening being formed of the back wall section, the upper wall section, and the lower wall section.

In the conventional imaging apparatus, the imaging unit is housed in the camera body by placing the imaging unit in front of the attachment/detachment opening and pushing the imaging unit toward the side wall section along the back wall section. On the other hand, the imaging unit is removed from the camera body by pulling the imaging unit out in a direction away from the side wall section along the back wall section.

However, although the imaging apparatus is configured so that the imaging unit is attached to or detached from the camera body while being guided along the upper wall section and the lower wall section, the conventional imaging apparatus has a problem that it is difficult to accurately and smoothly connect the camera body and the imaging unit to each other when detaching and attaching the imaging unit to the camera body.

Therefore, the applicants have proposed a camera body and an imaging unit to be attached to and detached from the camera body, and an imaging apparatus (Japanese Patent Application No. 2009-254029) in which a connection of the camera body and the imaging unit can be accurately and smoothly performed.

The camera body disclosed in the Japanese Patent Application No. 2009-254029 has a structure such that the imaging unit is attachable to and detachable from the camera body. The camera body includes a recess to which the imaging unit is detachably attached to be placed therein. The imaging unit includes an optical system configured to guide light incoming from a subject, an image pickup device configured to convert a subject image guided by the optical system into an electrical signal and an imaging unit connector section configured to perform communication with outside. The recess includes a back wall section, an upper wall section, and a side wall section to be opened to three directions; a lower side, a front side, and a lateral side of the camera body. The back wall section faces a rear of the imaging unit when the imaging unit is attached to the camera body, the upper wall section faces a topside of the imaging unit when the imaging unit is attached to the camera body and is connected to the back wall section, and the side wall section faces a side surface of the imaging unit when the imaging unit is attached to the camera body and is connected to the back wall section and the upper wall section.

In the camera body, since the recess is open to the three directions; the lower side, the front side, and the lateral side, a degree of freedom in attaching the imaging unit to the camera body and a degree of freedom in detaching the imaging unit from the camera body are high. Therefore, when the imaging unit is attached to or detached from the camera body, the imaging unit or the camera body or both may be damaged somehow.

Specifically, in order to obtain a secure fixation when the imaging unit is attached to the camera body, if the structure in which a projected engagement claw for fixing the imaging unit and the camera body is provided on either the imaging unit or the camera body is applied, the engagement claw may abut on the other one of the imaging unit and the camera body somehow and may damage either one of the imaging unit and the camera body by a friction or the like at the time of a sliding operation as an attaching operation of the imaging unit to the camera body. Also, in the same way, either one of the imaging unit and the camera body may be damaged when the imaging unit is detached from the camera body.

That is to say, in the imaging apparatus of this kind, because the recess is open to the three directions; the lower side, the front side and the lateral side and because the degree of freedom of attaching and detaching the imaging unit and the camera body is high, a quality of an manipulation of the attaching and detaching may be degraded.

SUMMARY OF THE INVENTION

The present invention has been made in light of the circumstances described above, and an object of the present invention is to provide a camera body having a recess being open to three directions, that is, a lower side, a front side and a lateral side and an imaging unit to be attached to and detached from the camera body, the camera body and the imaging unit being connectable to each other accurately and smoothly with having an improved quality of the manipulation of attaching and detaching when the imaging unit is detachably attached to the camera body, and to provide an imaging apparatus.

A camera body of an embodiment of the present invention includes a recess to which an imaging unit is detachably attached to be placed therein. The imaging unit includes an optical system configured to guide light incoming from a subject, an image pickup device configured to convert a subject image guided by the optical system into an electrical signal, and an imaging unit connector section. The recess includes a back wall section, an upper wall section, and a side wall section to be opened to a lower side, a front side, and a lateral side of the camera body, the back wall section facing a rear of the imaging unit when the imaging unit is placed in the recess, the upper wall section facing a topside of the imaging unit when the imaging unit is placed in the recess and being connected to the back wall section, the side wall section facing a side surface of the imaging unit when the imaging unit is placed in the recess and being connected to the back wall section and the side wall section. The camera body has a camera body connector section. The camera body has a guide mechanism configured to control a position of the camera body connector section in relation to a position of the imaging unit connector section in cooperation with the imaging unit and guide the imaging unit in a direction where the imaging unit approaches or separates from the side wall section of the camera body. The imaging unit has a rear surface on which at least two guiding grooves and an engagement plate section are formed, the at least two guiding grooves being provided to be extended between an edge of the imaging unit and an opposite edge of the imaging unit. One of the camera body and the imaging unit has a biasing member configured to bias the imaging unit toward the back wall section of the camera body. The guide mechanism has at least two guide protrusions provided on the back wall section of the camera body, the at least two guide protrusions being capable of being inserted into the at least two guiding grooves. The guide mechanism has an engagement claw formed on the back wall section of the camera body so as to face the engagement plate section and to engage with the biasing member when the imaging unit is attached to the camera body.

DETAILED DESCRIPTION OF THE PREFERRED EMBODIMENTS

Embodiments

Figure 4:
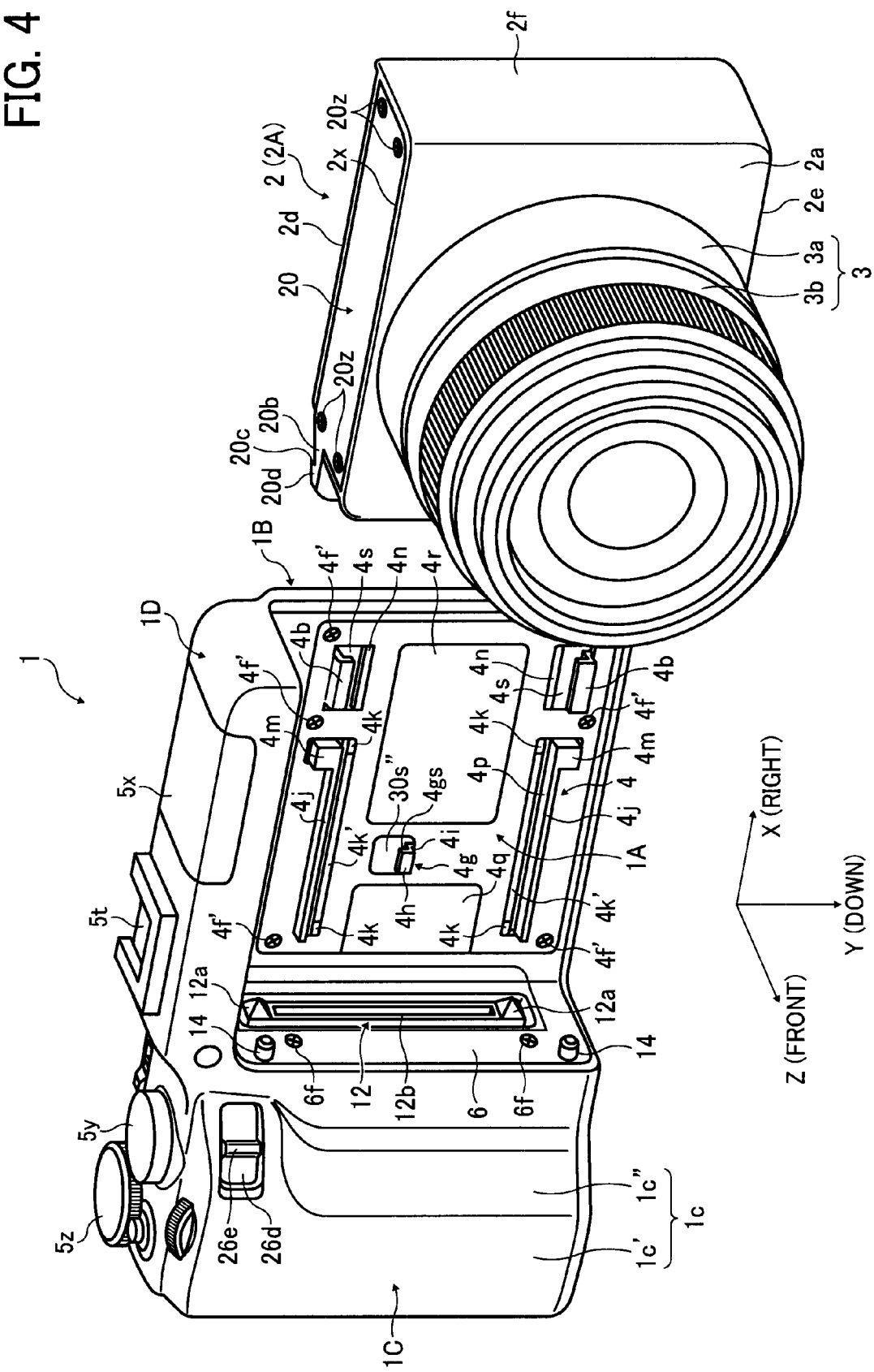
FIG. 4 is an explanatory diagram showing a state before the imaging unit is attached to the camera body shown in FIG. 1 or a state after the imaging unit is pulled out of the camera body, and a view of the camera body and the imaging unit according to an embodiment 1 of the present invention as viewed from the front side and from a right oblique direction.
Figure 5A:
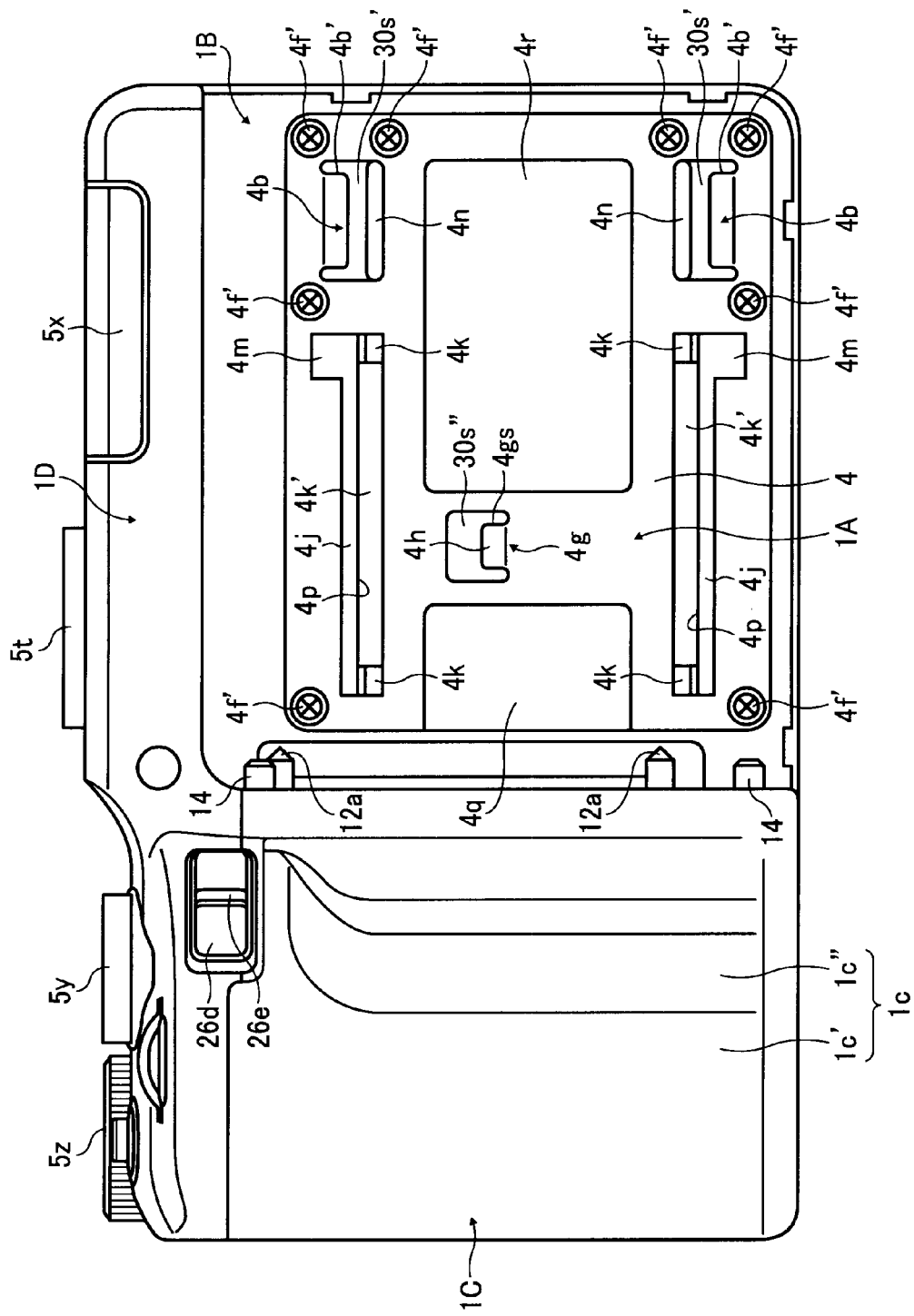
FIG. 5A is a view of the camera body shown in FIG. 4 as viewed from the front face side.
Figure 5B:
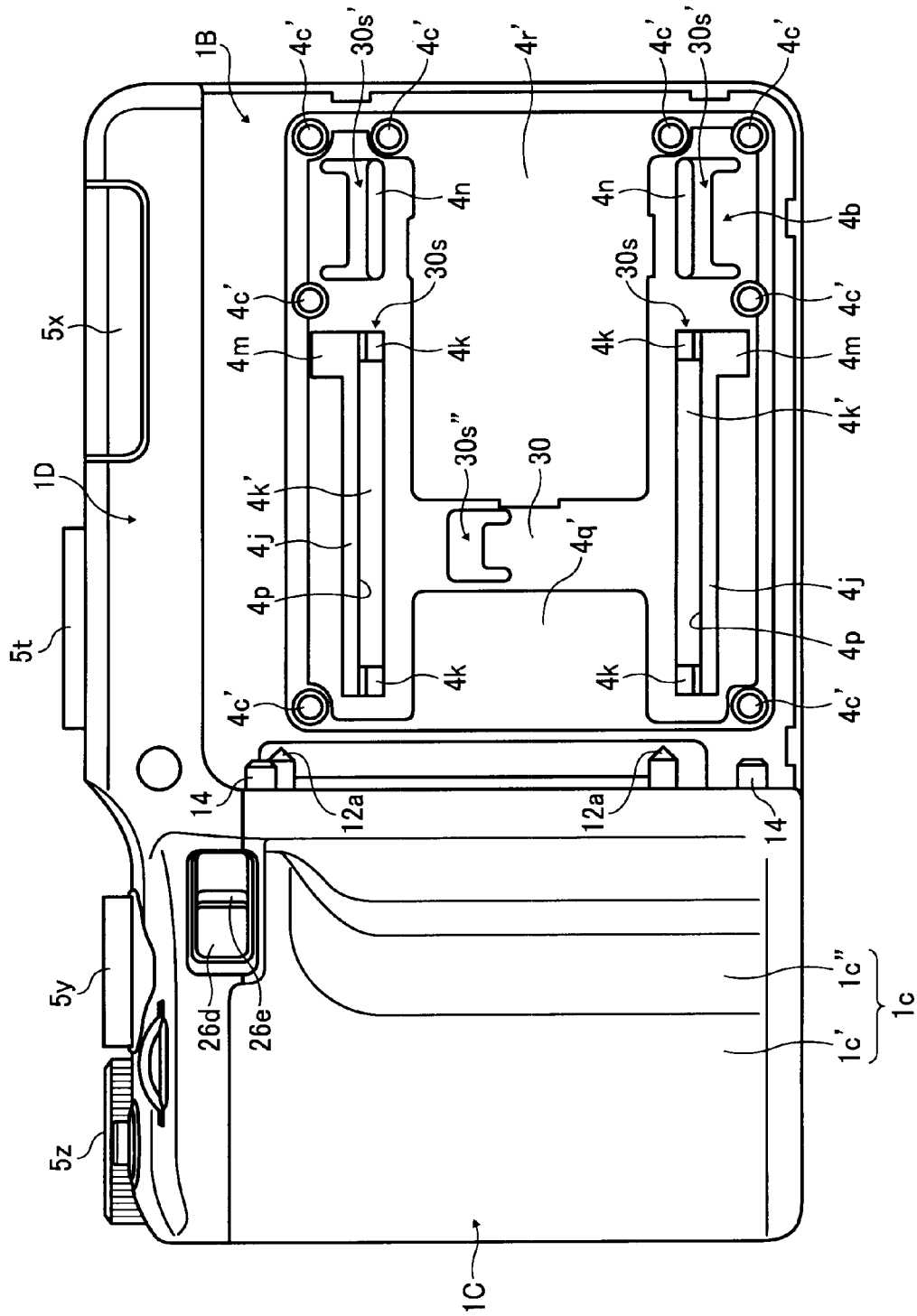
FIG. 5B is a view of the camera body from which a body rear wall reinforcing sheet metal member shown in FIG. 5A is removed, as viewed from the front face side.
Figure 5C:
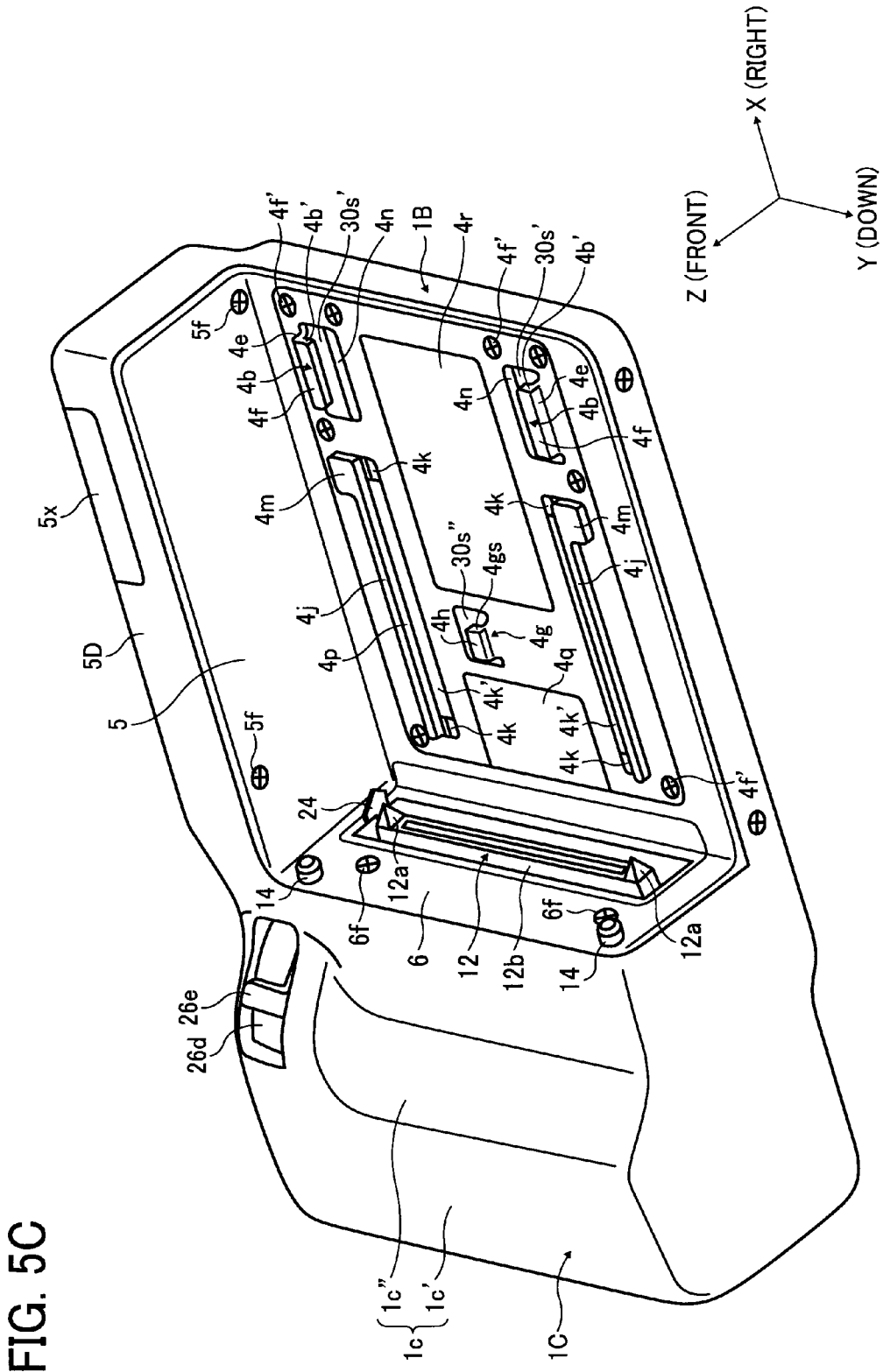
FIG. 5C is an external view of the camera body shown in FIG. 4 as viewed obliquely from below.
Figure 6:
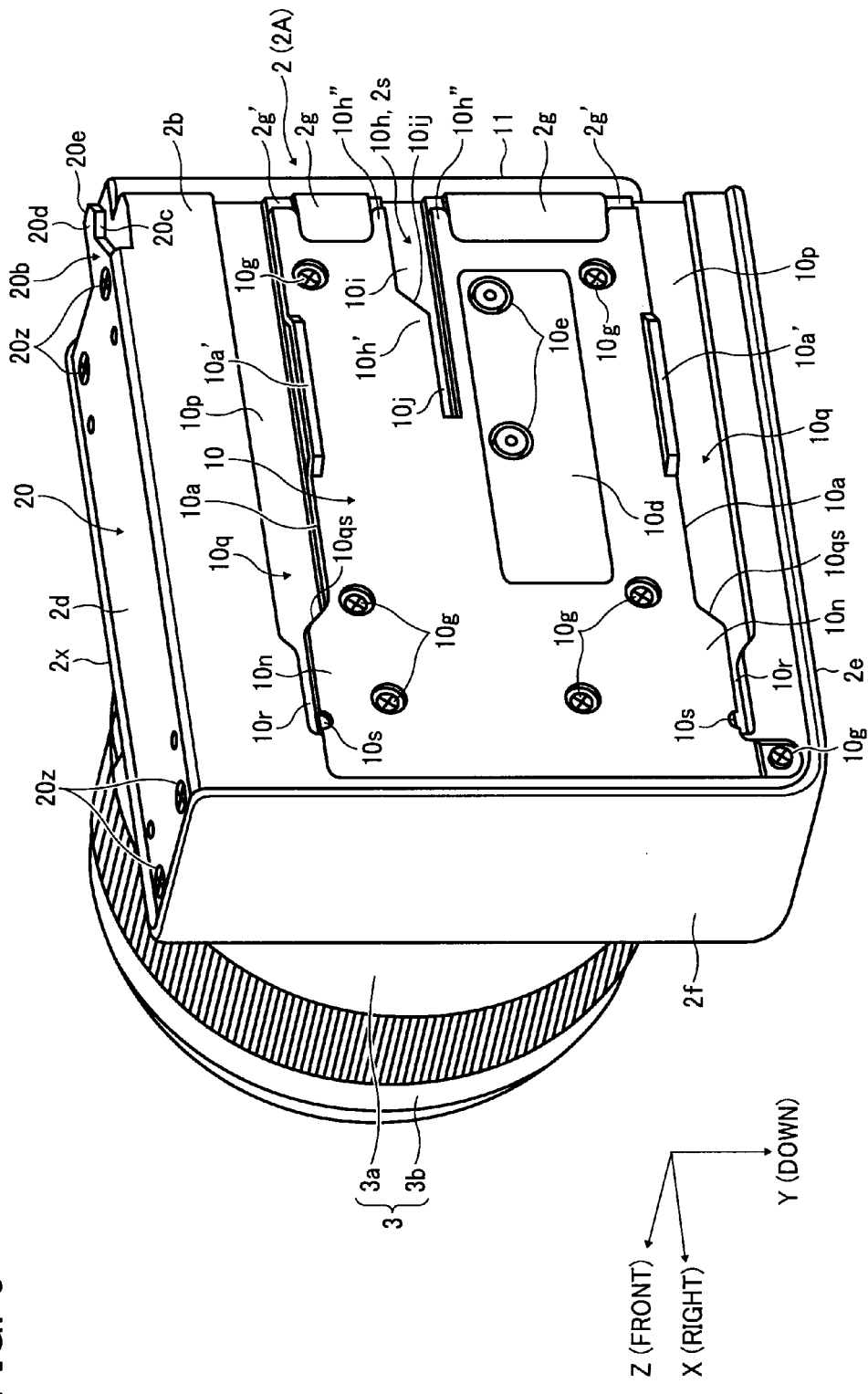
FIG. 6 is an external view of the imaging unit shown in FIG. 4 as viewed from the rear side.
Figure 33A:
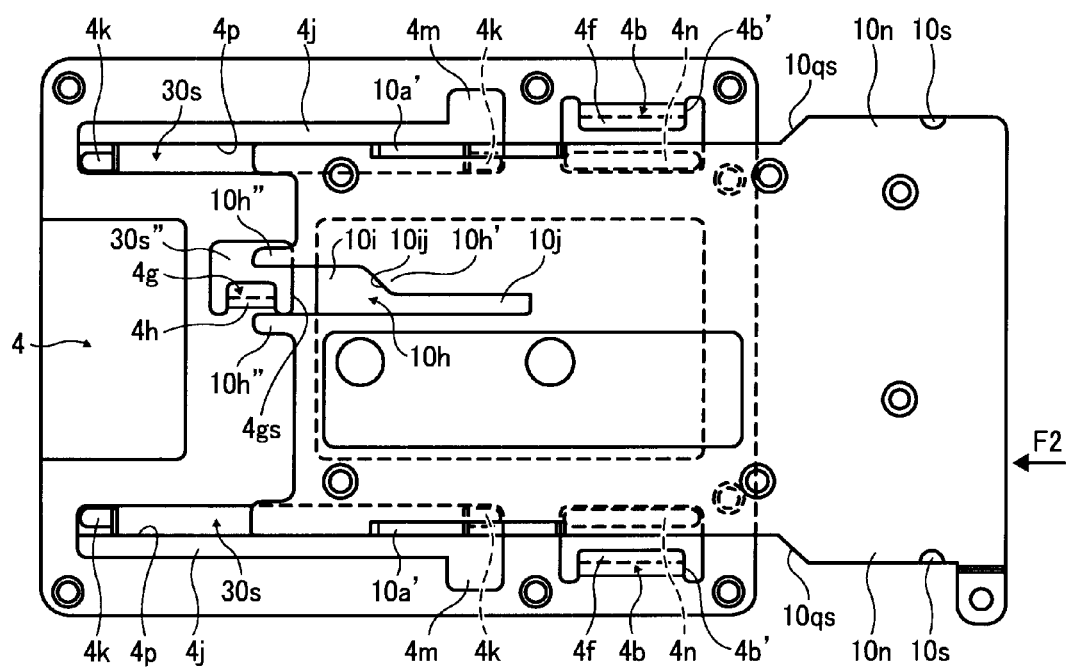
FIG. 33A is an explanatory diagram showing a relative positional relationship of the unit rear wall reinforcing sheet metal member to the body rear wall reinforcing sheet metal member in the process of setting the imaging unit in the camera body with a normal operating procedure, and a perspective view in which the unit rear wall reinforcing sheet metal member and the body rear wall reinforcing sheet metal member are shown from the front face side of the imaging unit.
Figure 33B:
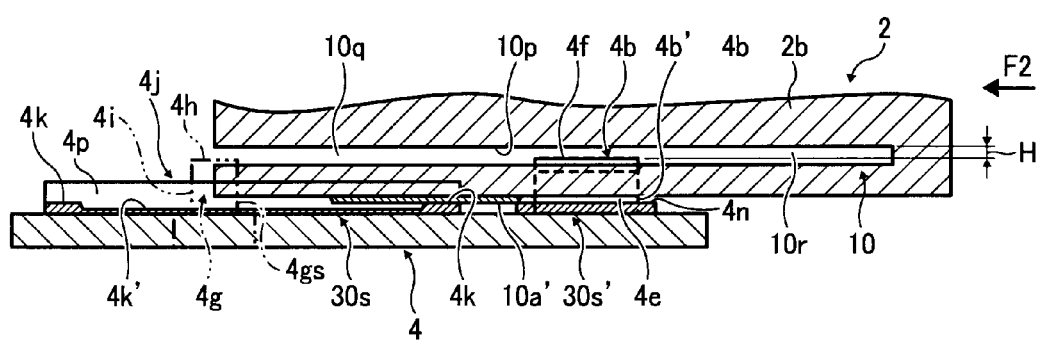
FIG. 33B is a cross sectional view of the body rear wall reinforcing sheet metal member and a rear part of the imaging unit, which are in a positional relationship shown in FIG. 33A.

A camera body 1 of an embodiment of the present invention, for example, as shown in FIGS. 4 and 5C, includes a recess 1A to which an imaging unit 2 is detachably attached to be placed therein. The imaging unit 2 has a housing 2A which includes an optical system configured to guide light incoming from a subject, an image pickup device 108 configured to convert a subject image guided by the optical system into an electrical signal, and an imaging unit connector section 11. The recess 1A includes a back wall section 1B, an upper wall section 1D, and a side wall section 1C to be opened to a lower side, a front side, and a lateral side of the camera body 1, the back wall section 1B facing a rear of the imaging unit 2 when the imaging unit 2 is placed in the recess 1A, the upper wall section 1D facing a topside of the imaging unit 2 when the imaging unit 2 is placed in the recess 1A and being connected to the back wall section 1B, the side wall section 1C facing a side surface of the imaging unit 2 when the imaging unit 2 is placed in the recess 1A and being connected to the back wall section 1B and the side wall section 1C. The camera body 1 has a camera body connector section 12 which performs communication with the imaging unit connector section. One of the camera body 1 or the housing 2A of the imaging unit 2 has a guide mechanism configured to control a position of the camera body connector section 12 in relation to a position of the imaging unit connector section 11 and guide the imaging unit 2 in a direction where the imaging unit 2 approaches or separates from the side wall section 1C of the camera body 1. The housing 2A of the imaging unit 2 has a rear surface on which at least two guiding grooves 10q and an engagement plate section 10n, which faces the engagement claw 4b and engages with the biasing member such as a plate spring 2k when the housing is attached to the camera body, are formed, the at least two guiding grooves 10q being provided to be extended between an edge of the housing 2A and an opposite edge of the housing 2A. One of the camera body 1 and the imaging unit 2 has a biasing member such as a plate spring 2k configured to bias the imaging unit 2 toward the back wall section 1B of the camera body 1. As shown in FIGS. 5A, 6 and 33F, the guide mechanism has at least two guide protrusions 4j provided on the back wall section 1B of the camera body 1, the at least two guide protrusions 4j being capable of being inserted into the at least two guiding grooves 10q. The guide mechanism has an engagement claw 4b formed on the back wall section 1B of the camera body 1 so as to face the engagement plate section 10n and to engage with the biasing member when the imaging unit 2 is attached to the camera body 1.

(Outline Description of Camera Body 1 and Imaging Unit 2)

Figure 1:
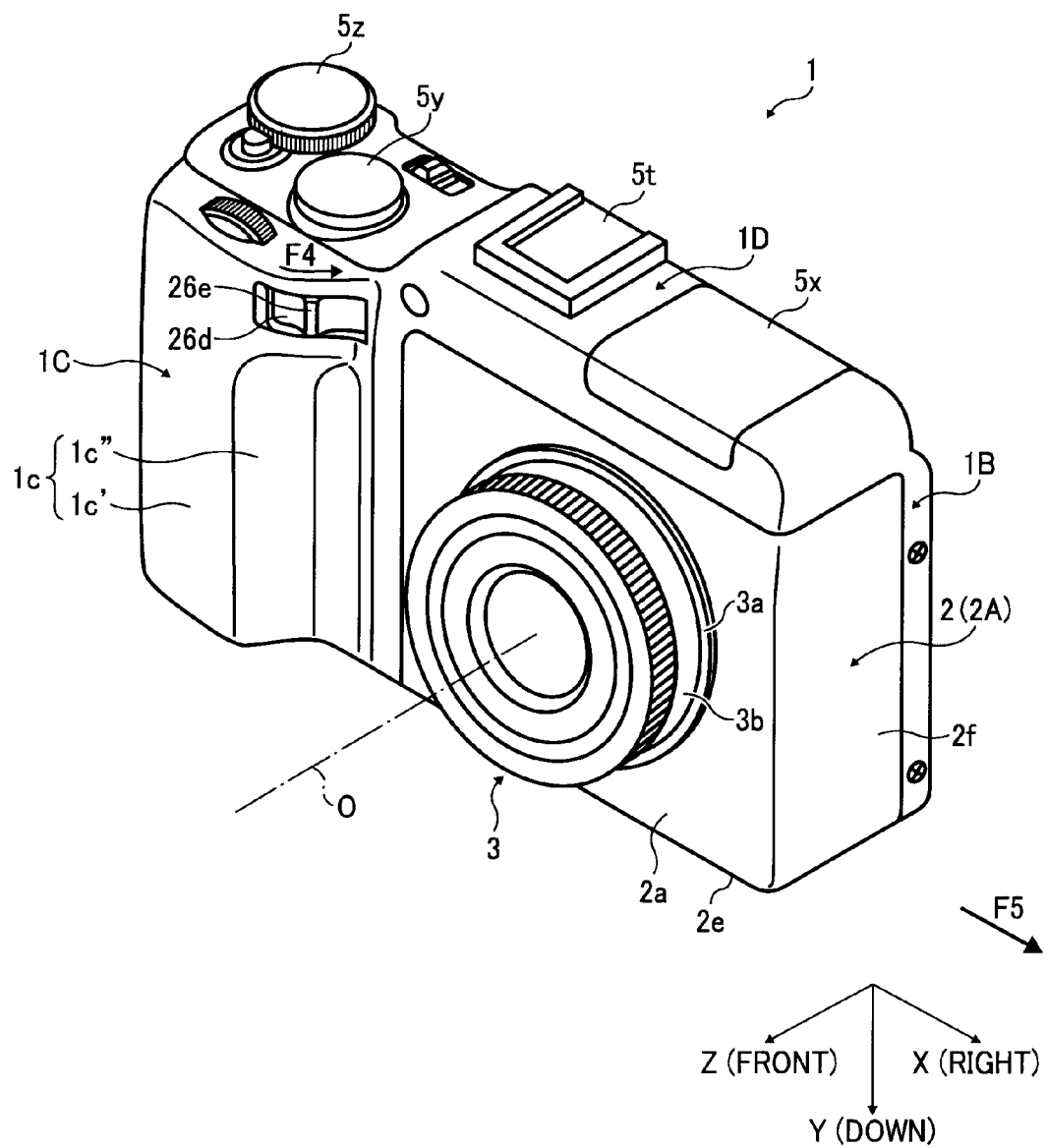
FIG. 1 is an explanatory diagram showing a state where a camera body and an imaging unit to which the present invention is applied are attached to each other, and an external view of an imaging apparatus including the camera body and the imaging unit as viewed from a front oblique direction.
Figure 2:
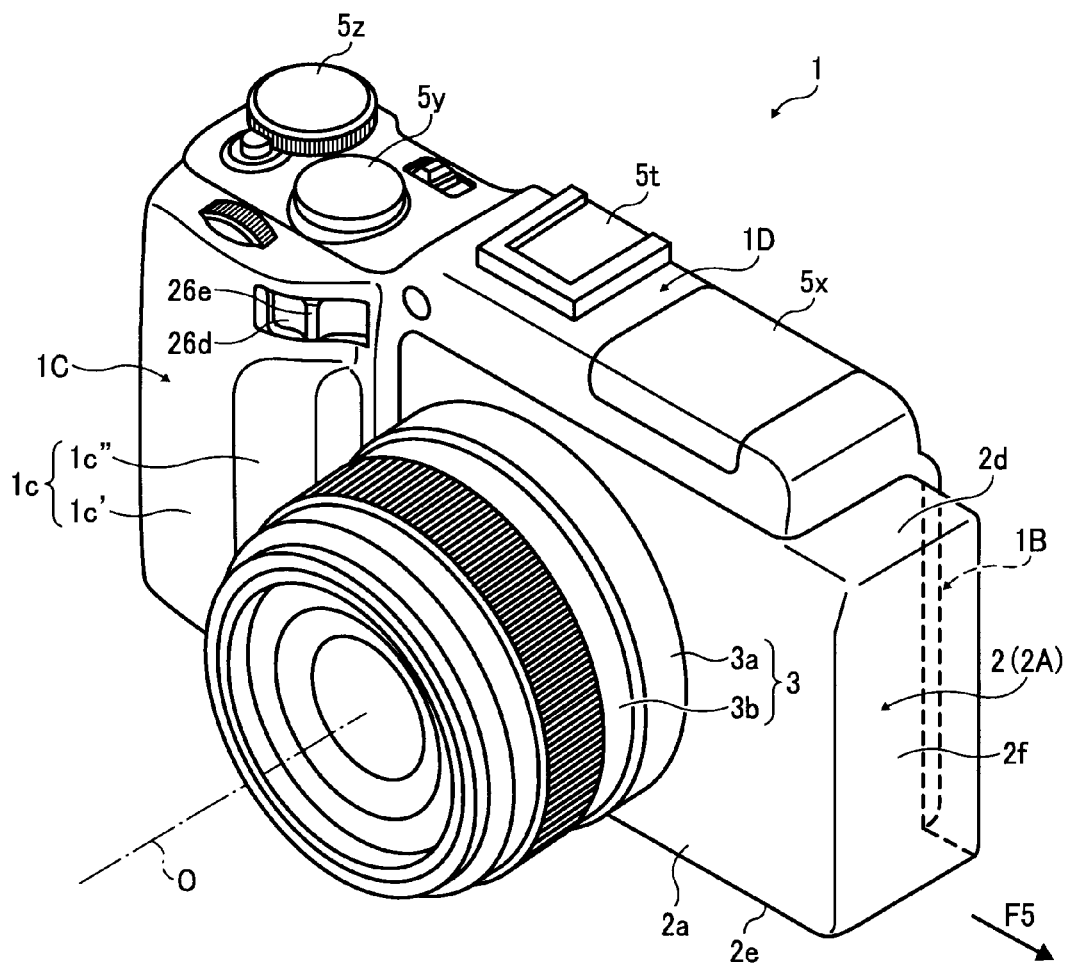
FIG. 2 is an explanatory diagram showing a state where an imaging unit, which is different from the imaging unit shown in FIG. 1, is attached to the camera body to which the present invention is applied, and an external view of an imaging apparatus including the camera body and the imaging unit as viewed from a front oblique direction.
Figure 3:
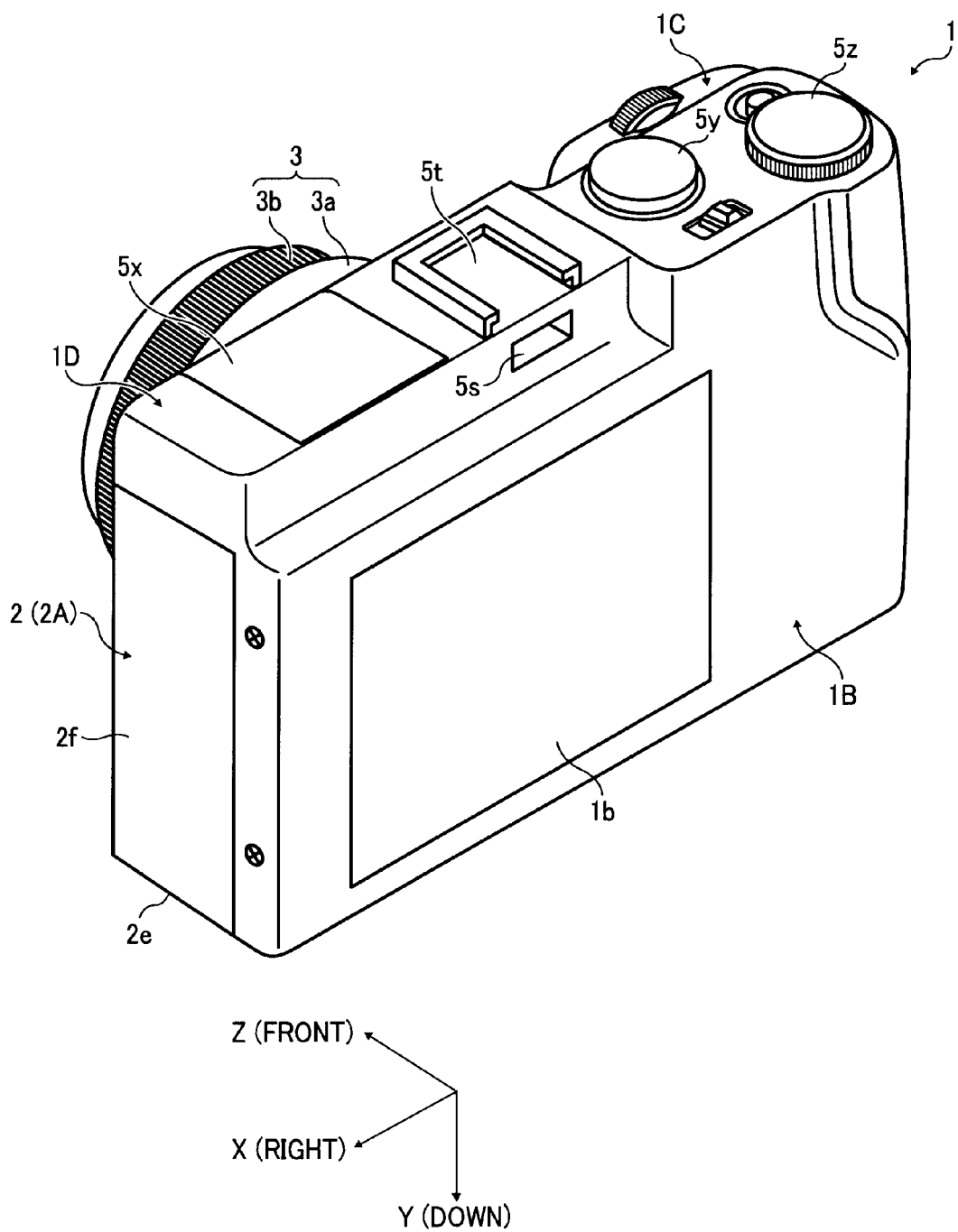
FIG. 3 is an external view of the imaging unit shown in FIG. 1 as viewed from the rear side.

FIGS. 1 to 3 show a state where the imaging unit having a cuboid shaped housing according to an embodiment of the present invention is attached to the camera body. FIGS. 1 and 2 show the camera body which the imaging unit is attached to and which is viewed from a front oblique direction. FIG. 3 shows the camera body in FIG. 1 viewed from a rear oblique direction.

In FIGS. 1 to 3, numeral 1 designates the camera body and 2 the imaging unit. The imaging unit 2 has the cuboid-shaped housing 2A. Here, the imaging unit 2 includes an interchangeable lens barrel unit which includes an image pickup optical system and the image pickup device. FIG. 2 shows a state where the imaging unit 2 having the housing 2A in which a size of the housing 2A is different from the size of the imaging unit 2 attached to the camera body 1 shown in FIG. 1 is attached to the camera body 1.

The size of an image pickup device placed inside the housing 2A of the imaging unit 2 shown in FIG. 2 is different from that of an image pickup device placed inside the housing 2A of the imaging unit 2 shown in FIG. 1.

That housing 2A has a lens barrel 3 on its front face 2a. As shown in FIG. 4, the imaging unit 2 is capable of being attached to and detached from the camera body 1. FIG. 4 shows a state where the imaging unit 2 shown in FIG. 1 is pulled out of the camera body shown in FIG. 1.

As shown in FIGS. 1, 2, and 4, the lens barrel 3 includes a guiding cylinder 3a and a movable barrel 3b. The movable barrel 3b is placed on the guiding cylinder 3a so that the movable barrel 3b is capable of advancing or retreating in a direction in which an optical axis O extends. A lens system such as zoom lens or the like is provided on the movable barrel 3b. The image pickup optical system including the lens system directs light incoming from a subject to the image pickup device, and the subject image is formed on the image pickup device which converts incident light into an electrical signal.

The Z direction in FIG. 1 is a direction parallel to an optical axis direction of the image pickup optical system (lens system) of the lens barrel 3 with the imaging unit 2 attached to the camera body 1, and referred to as a front-back direction in this embodiment. A positive side of the Z direction is the front face side of the camera (front side) and a negative side of the Z direction is a rear side (back side) of the camera.

The X direction in FIG. 1 is a direction perpendicular to the optical axis direction of the image pickup optical system (lens system) of the lens barrel 3 with the imaging unit 2 attached to the camera body 1, and referred to as a left-right direction in this embodiment. A positive side of the X direction is right side and a negative side of the X direction is left side.

The Y direction in FIG. 1 is a direction perpendicular to the optical axis direction of the image pickup system (lens system) of the lens barrel 3 with the imaging unit 2 attached to the camera body 1, and referred to as an up-down direction in this embodiment. A positive side of the Y direction is the lower side and a negative side of the Y direction is an upper side.

Embodiment 1

Detailed Description of Camera Body 1

As shown in FIGS. 4 and 5A, the camera body 1 has the recess 1A as a space in which the housing 2A is placed. The recess 1A is formed of three wall sections of the back wall section 1B, the side wall section 1C, and the upper wall section 1D which are made of resin. The back wall section 1B and the side wall section 1C are orthogonal to each other. The upper wall section 1D is orthogonal to the both wall sections 1B, 1C.

When the imaging unit 2 is attached to the recess 1A and this imaging unit 2 is viewed from a front face, that is to say, a subject side in the optical axis direction of the optical system, a rear part 2b (see FIG. 6) of the housing 2A faces the back wall section 1B. When the imaging unit 2 is attached to the housing 1A and the imaging unit 2 is viewed from the front face, a left side surface 2c of the housing 2A shown in FIG. 8 faces the side wall section 1C. When the imaging unit 2 is placed in the recess 1A and the imaging unit 2 is viewed from the front face, an upper surface 2d of the housing 2A faces the upper wall section 1D.

The back wall section 1B, the side wall section 1C and the upper wall section 1D are integrally formed. The recess 1A has its outline shape defined by a rear wall (XY plane) of the back wall section 1B, a side surface wall (YZ plane) of the side wall section 1C and an upper surface wall (ZX plane) of the upper wall section 1D. When the housing 2A is placed, the recess 1A is opened to a downward direction (Y direction) in which a lower surface 2e of the housing 2A is located, a right lateral direction (X direction) in which a right side surface 2f of the housing 2A is located, and a forward direction (Z direction) in which the front face 2a of the housing 2A is located.

Note that the X direction is also referred to as a first direction in which the imaging unit 2 moves toward or away from the side wall section 1C, and the Y direction is referred to as a vertical direction (Y direction) to the first direction.

Manipulating sections for electrically manipulating the camera body 1 and the imaging unit 2 are provided at appropriate positions on the back wall section 1B, the side wall section 1C and the upper wall section 1D. In the embodiment, as shown in FIGS. 1 to 4, a release button 5y and a dial 5z, for example, are provided as the manipulating sections on the upper wall section 1D. In addition, a popup type strobe device 5x and a hot shoe section 5t are provided on the upper wall section 1D. In addition, as shown in FIG. 3, an electronic viewfinder connection terminal 5s is provided on the back wall section 1B. An electronic viewfinder device (not shown) is connected to the electronic viewfinder connection terminal 5s.

Figure 7A:
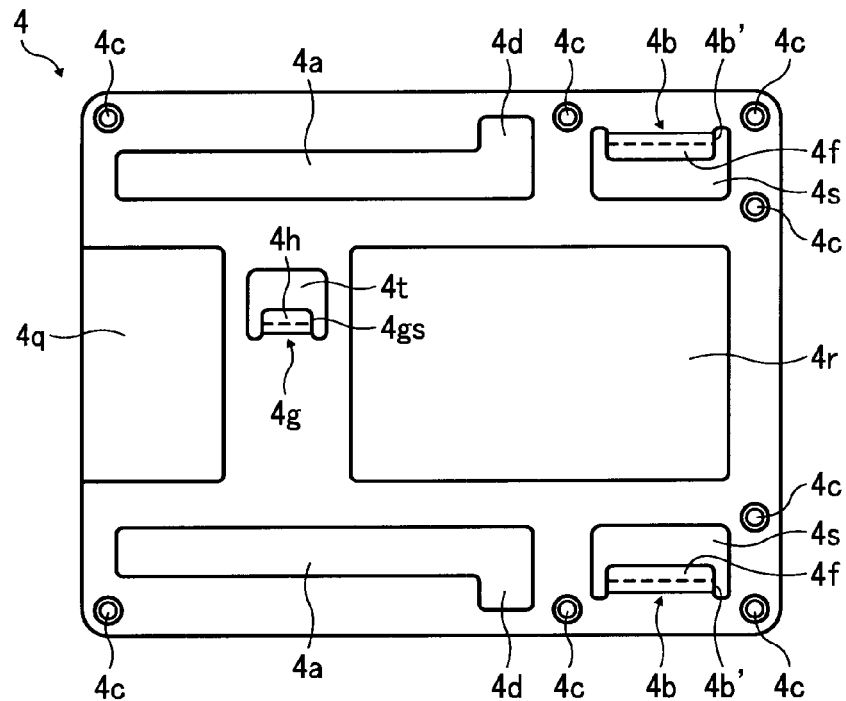
FIG. 7A is a plan view of the body rear wall reinforcing sheet metal member shown in FIG. 5A and a front face view thereof.
Figure 7B:
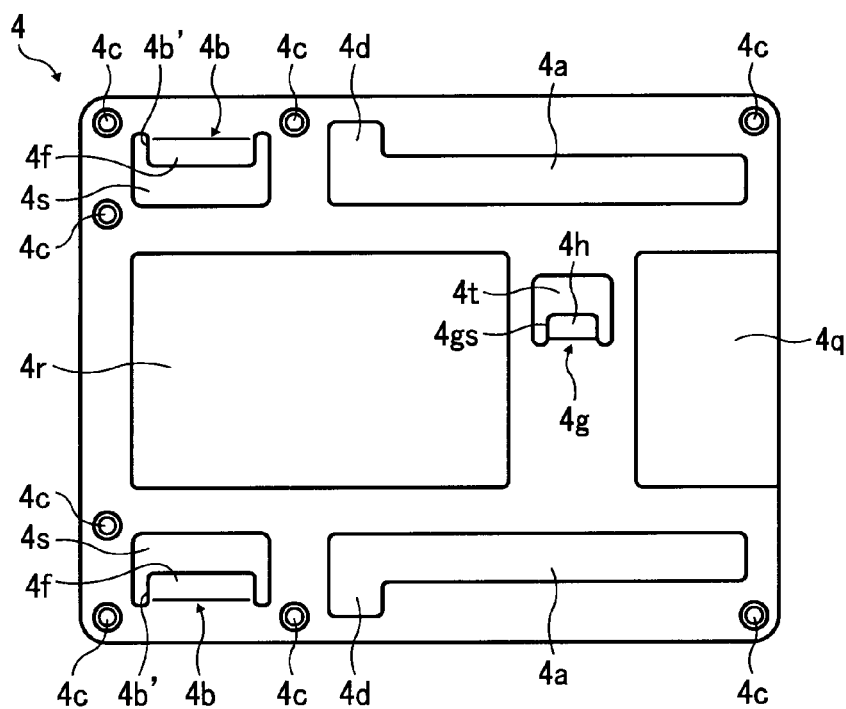
FIG. 7B is a plan view of the body rear wall reinforcing sheet metal member shown in FIG. 7A and a backside view thereof.
Figure 7C:
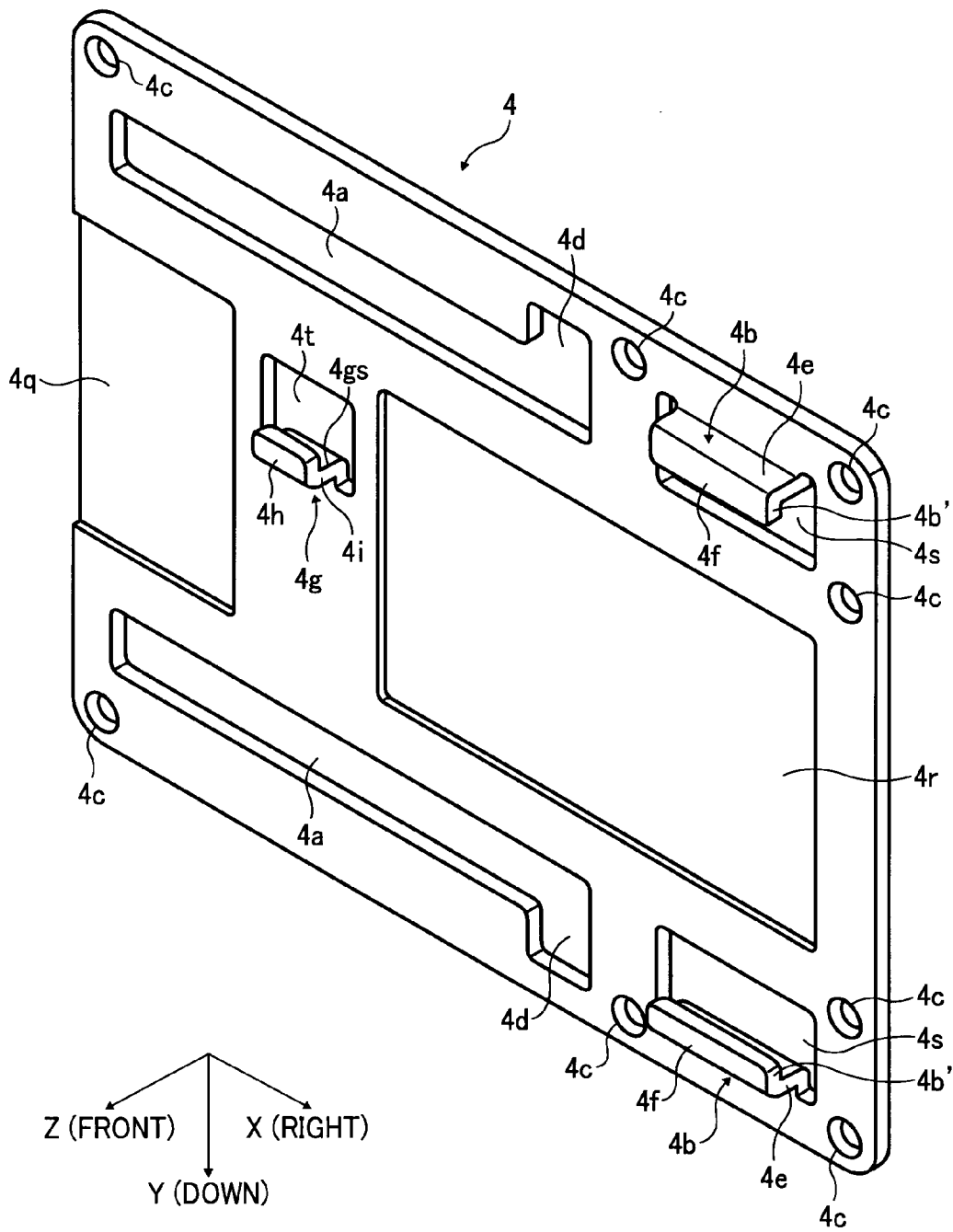
FIG. 7C is a perspective view of the body rear wall reinforcing sheet metal member shown in FIGS. 7A and 7B.

As shown in FIG. 5A, and FIGS. 7A to 7C, on the back wall section 1B, a body rear wall reinforcing sheet metal member 4 is provided as a rear wall. FIGS. 7A to 7C show the body rear wall reinforcing sheet metal member 4 which has been removed from the back wall section 1B. When the imaging unit 2 is set to the camera body 1, the rear part 2b thereof faces the body rear wall reinforcing sheet metal member 4.

(Description of Body Rear Wall Reinforcing Sheet Metal Member 4)

The body rear wall reinforcing sheet metal member 4 has an almost rectangular outline. This rear wall reinforcing sheet metal member for body 4, for example, is molded by pressing. As enlarged and shown in FIGS. 7A to 7C, this body rear wall reinforcing sheet metal member 4 has paired insertion openings 4a, 4a, paired engagement claws 4b, 4b which also serve as an biasing section to be described later, and screw holes 4c.

In addition, the biasing section includes a first biasing section and a second biasing section, and any one of the paired two engagement claws 4b, 4b is referred to as a first engagement claw and any other one a second engagement claw.

The paired insertion openings 4a, 4a are formed at an interval in a vertical direction (up-down direction) and extend in parallel to each other in a horizontal direction (left-right direction). Right ends of the paired insertion openings 4a, 4a are rectangular openings 4d, 4d. Rectangular protrusions described later are fitted into the rectangular openings 4d, 4d.

The paired engagement claws 4b, 4b are placed at positions far away from the side wall section 1C and placed at an interval in a vertical direction (up-down direction). As enlarged and shown in FIG. 7C, the paired engagement claws 4b, 4b each include a cut and bent section 4e and an inflected section 4f. In the body rear wall reinforcing sheet metal member 4, insertion openings 4s, 4s are formed at parts where the paired engagement claws 4b, 4b are formed.

On the body rear wall reinforcing sheet metal member 4, an engagement protrusion 4g is formed at an almost middle position of the vertical direction (up-down direction) in which the insertion opening 4a and the insertion opening 4a are formed at an interval. The engagement protrusion 4g includes a cut and bent section 4i and an inflected section 4h. An insertion opening 4t is formed at a part where this engagement protrusion 4g is formed.

The engagement protrusion 4g serves a function to have later-described connector sections to fit into each other at appropriate posture and angle. This engagement protrusion 4g, detailed structure of which will be described later, is located at an almost center of the camera-body connector section 12 when it is viewed from a vertical direction (Y direction) to a first direction in which the imaging unit 2 moves toward or away from the side wall section 1C.

(Description of Resin Plate 30)

FIG. 5B shows a state in which the body rear wall reinforcing sheet metal member 4 is removed from the back wall section 1B. The back wall section 1B has a recess in which a resin plate 30 having an H-formed shape is placed. On the resin plate 30, as shown in detail in FIG. 5D, paired raised sections 30s are formed at parts facing the paired insertion openings 4a, 4a, paired raised sections 30s' is formed at parts facing the paired insertion openings 4s, 4s, and a raised section 30s" is formed at a part facing the insertion opening 4t.

The paired raised sections 30s are provided on both sides of the raised section 30s", respectively. On each of the paired raised sections 30s, paired resin-made guide protrusion 4j which extends in a left-right direction is formed. Also, on each of the paired raised sections 30s, paired resin-made sliding contact ribs 4k, 4k which are adjoining to the guide protrusions are formed with a space in a direction in which the guide protrusions 4j, 4j extend. In the paired guiding protrusions 4j, 4j, guide surfaces 4p, 4p are formed on the side where the paired sliding contact ribs 4k, 4k are placed. The guide surfaces 4p, 4p exist on a plane parallel to the XY plane.

A projected line escaping recess 4k' which extends in the same direction as the extending direction of the guide protrusions 4j, 4j is formed between the paired contact ribs 4k, 4k. The projected line escaping recess 4k' allows a late-described projected line part to escape. The projected line part is formed on a unit rear wall reinforcing sheet metal member 10 for avoiding a debasement of a manipulation quality. As shown in FIGS. 5A to 5D, rectangular protrusions 4m are formed at the right ends of the paired resin-made guiding protrusions 4j, 4j. On the paired raised sections 30s', sliding contact ribs 4n, 4n are formed, respectively. As shown in FIG. 5B, the paired raised sections 30s, 30s are located between the side wall section 1C and the paired raised sections 30s', 30s'.

In addition, the paired resin-made guiding protrusions 4j, 4j constitute a camera-body guide mechanism. Any one of the paired resin-made guiding protrusions 4j, 4j is referred to as a first guiding protrusion and any other one of the paired resin-made guiding protrusions 4j, 4j is referred to as a second guiding protrusion. Further, the cut and bent section 4i extends to a positive direction in the Z direction.

The camera-body guide mechanism serves as the guide mechanism which, in cooperation with an imaging unit guide mechanism to be described later, controls a position of the camera-body connector section 12 in relation to a position of the imaging unit connector section 11 and guides the imaging unit 2 in a direction toward or away from the side wall section 1C.

Peripheral edges 10a, 10a of the unit rear wall reinforcing sheet metal member 10 shown in FIG. 6 are in sliding contact with the guide surfaces 4p, 4p. A detailed structure of the unit rear wall reinforcing sheet metal member 10 is described later. As shown in FIG. 5B, on the back wall section 1B, screw holes 4c' are formed at appropriate positions corresponding to screw holes 4c of the rear wall reinforcing sheet metal member for body 4.

(Structure for Mounting Body Rear Wall Reinforcing Sheet Metal Member 4 and Resin Plate 30 to Back Wall Section 1B)

Figure 5D:
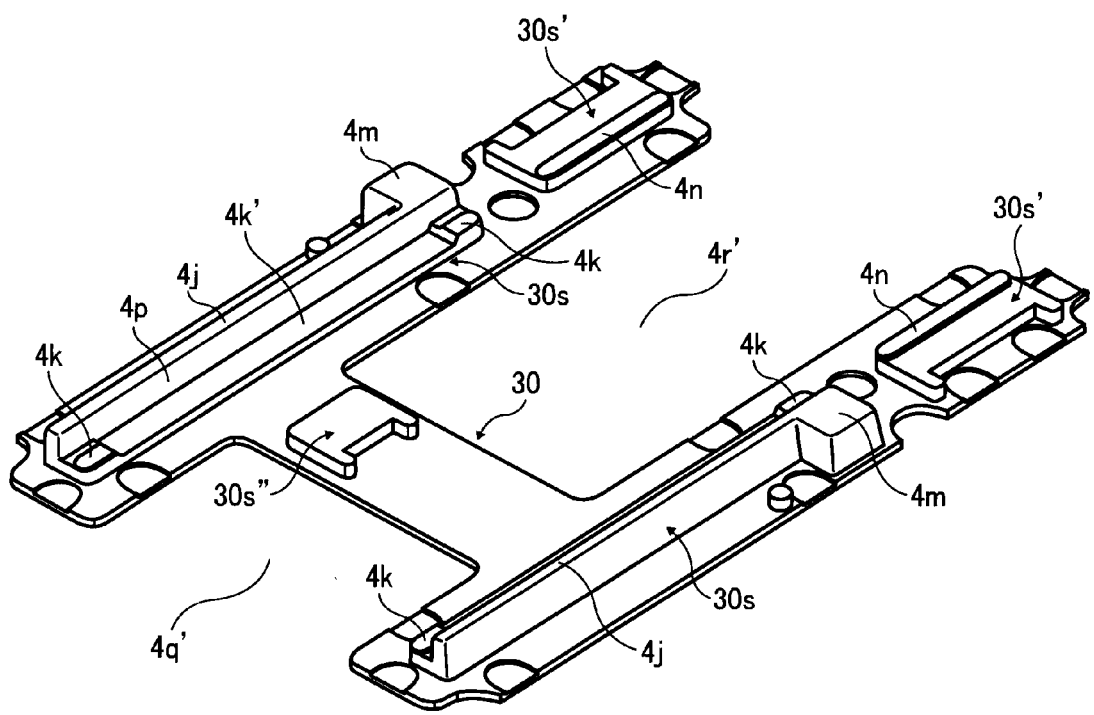
FIG. 5D is a perspective view of a resin plate shown in FIG. 5B.

As shown in FIG. 7A to 7C, raised flat plate sections 4q, 4r raised to the back wall section 1B are formed on the right and left sides of and in the middle part in the vertical direction of the rear wall reinforcing sheet metal member for body 4. As shown in FIGS. 5B and 5D, the resin plate 30 has notches 4q', 4r' having a shape corresponding to the raised flat plate sections 4q, 4r formed. The rear wall reinforcing sheet metal member for body 4 are given rigidity by the raised flat plate sections 4q, 4r.

As shown in FIGS. 4, 5A, and 5C, the rear wall reinforcing sheet metal member for body 4 and the resin plate 30 are fixed to the back wall section 1B by locking screws 4f' in the following state. Specifically, the raised flat plate sections 4q, 4r correspond to the notches 4q', 4r'; the raised sections 30s, 30s are inserted into the insertion openings 4a, 4a; the raised sections 30s', 30s' are inserted into the insertion openings 4s, 4s; and the raised section 30s" is inserted into the insertion opening 4t.

(Structure of Side Wall Section 1C and Upper Wall Section 1D of Camera Body and Rear Configuration of Back Wall Section 1B)

Inside the side wall section 1C, a battery chamber constituting frame member (not shown) inside the camera is fixed as a side surface wall by locking screws 6f, as shown in FIGS. 4 and 5C, through a side surface wall reinforcing sheet metal member 6. The side surface wall reinforcing sheet metal member 6 is provided by an insert molding when the camera body 1 is formed. The side surface wall reinforcing sheet metal member 6 faces the left side surface 2c of the housing 2A when it is set to the recess 1A of the housing 2A. The side surface wall reinforcing sheet metal member 6 stands up, when the side surface wall reinforcing sheet metal member 6 is viewed straight with the back wall section 1B located on the downside, the upper wall section 1D located on the right side and yet the forward direction being the topside.

Inside the upper wall section 1D, a mold forming member inside the camera (not shown) is fixed as an upper surface wall by locking screws 5f, as shown in FIG. 5C through a body upper surface wall reinforcing sheet metal member 5. The body upper surface wall reinforcing sheet metal member 5 is provided by the insert molding when the camera body 1 is formed. The body upper surface wall reinforcing sheet metal member 5 faces the upper surface 2d of the housing 2A when it is set to the recess 1A of the housing 2A. The body upper surface wall reinforcing sheet metal member 5 stands up forward from the back wall section 1B, when the side wall section 1C is viewed straight from the lateral side with the upper wall section 1D located on the top side.

As shown in FIGS. 5A to 5C, the camera body 1 has a grip section 1c connected to the side wall section 1C. The grip section 1c includes a bulging section 1c' and a finger rest recess 1c''. The bulging section 1c' bulges forward (the Z direction from the rear side to the front face side is defined as forward), that is to say, in a direction facing a subject in the optical axis of the optical system. The finger rest recess 1c'' is located between the bulging section 1c' and the recess 1A. The finger rest recess 1c'' is adjacent to the bulging section 1c'. When a user grips the grip section 1c with his/her right hand, he/she can place his/her long finger to little finger on the finger rest recess 1c''.

A storage chamber is formed inside the grip section 1c. The storage chamber houses a battery and various electrical parts requested by the imaging apparatus. That is to say, the storage chamber houses a battery, a circuit used to control the imaging unit 2 by manipulating the manipulating sections, a processing circuit to process an image captured by the imaging unit 2, a recording medium which stores an image data captured by the imaging unit 2 and is processed by the processing circuit, a power circuit, a strobe control circuit, a circuit board on which circuit parts constituting these are mounted, etc.

As shown in FIG. 3, on the rear of the back wall section 1B provided is a display surface 1b which displays images as a display section on the basis of image data captured by the imaging unit 2. On the display surface 1b, images recorded in a recording medium are reproduced and displayed. The size of the back wall section 1B is almost determined by that of the display surface 1b.

(Outline Structure of Imaging Unit Connector Section 11 and Camera-Body Connector Section 12)

Figure 8:
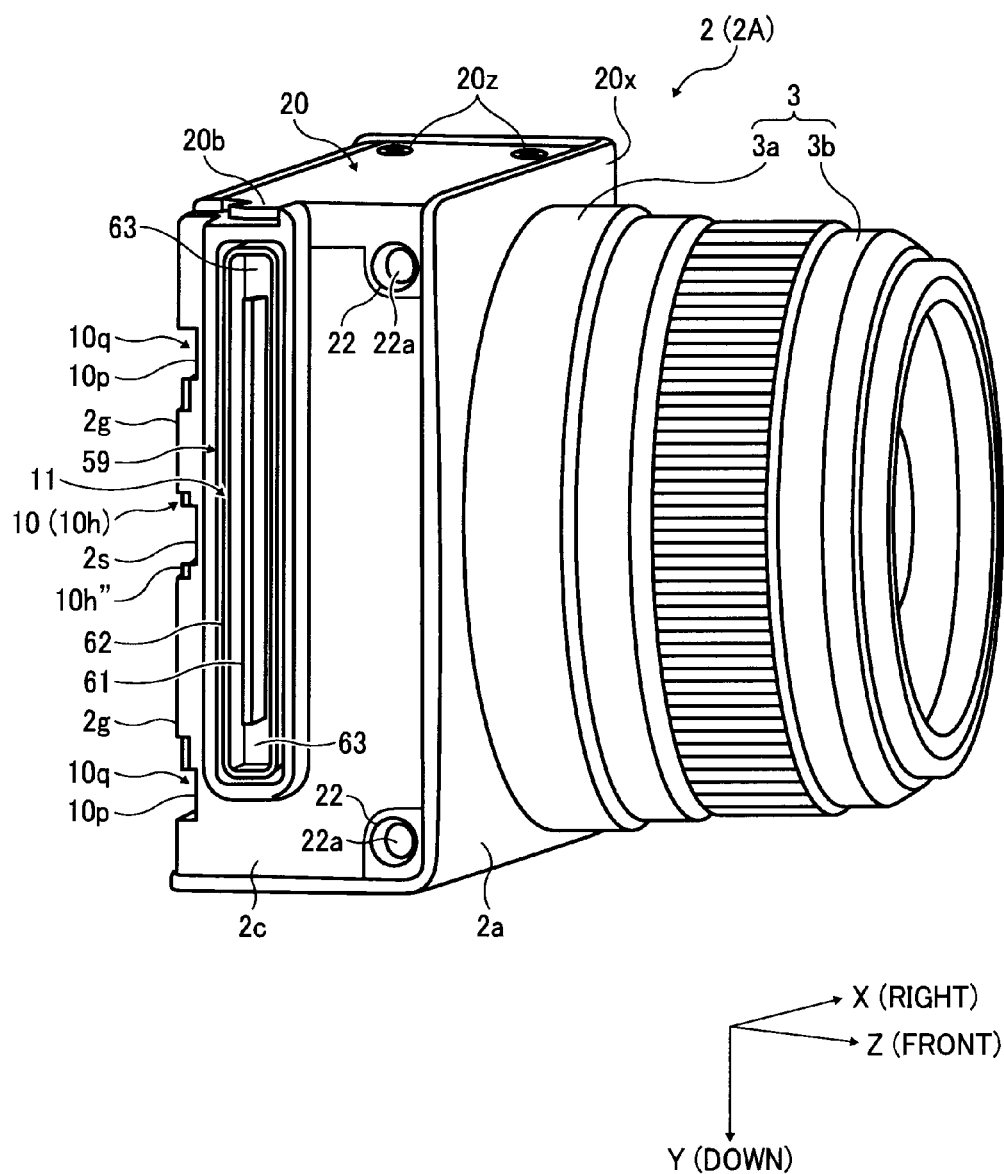
FIG. 8 is a perspective view of the imaging unit shown in FIG. 6 as viewed from the left side.

As shown in FIG. 8, on the imaging unit 2 provided is the imaging unit connector section 11 which extends vertically on the left side surface 2c facing the side surface wall reinforcing sheet metal member 6. The imaging unit connector section 11 is fixed to a connector board (plug base set) on which electric circuits are wired. The plug base set is placed in a floating structure inside the imaging unit 2. The imaging unit connector section 11 protrudes outward from the left side surface 2c.

When the imaging unit 2 is attached to the camera body 1 and the imaging unit connector section 11 and the camera-body connector section 12 are electrically joined, this floating structure serves a function to absorb and alleviate any mounting error of the imaging unit connector section 11 and the camera-body connector section 12, and to mitigate stress to be applied when the imaging unit connector section 11 and the camera-body connector section 12 are fitted.

As shown in FIG. 4, on the camera body 1 provided is the camera-body connector section 12 which is adjacent to the side surface reinforcing sheet metal member 6 and extends vertically. The camera-body connector section 12 has positioning protrusions 12a, 12a at both ends in the vertical direction. The imaging unit connector section 11 has positioning holes (to be described later) at the both ends in the vertical direction. A commercially available bay connector, for example, is used for the imaging unit connector section 11 and the camera-body connector section 12.

The camera-body connector section 12 is placed so that it will not inadvertently touch a rising base of the side wall section 1C which stands up from the back wall section 1B, when the side surface wall reinforcing sheet metal member 6 is viewed straight with the back wall section 1B located on the downside, the upper wall section 1D located on the right side and yet the forward direction being the topside. The camera-body connector section 12 has a covering member 12b which covers a connector terminal 12c shown in FIGS. 19 and 20. The action of the covering member 12b will be described later.

The camera-body connector section 12 faces the recess 1A. As the imaging unit 2 moves in a direction from right to left when the imaging unit 2 is attached to and set in the camera body 1, the camera-body connector section 12 is fitted into the imaging unit connector section 11 and the camera body 1 and the imaging unit 2 are connected. In addition, details of the setting of the imaging unit 2 to the camera body 1 and detailed structure of the imaging unit connector section 11 and the camera-body connector section 12 will be described later.

(Supplementary Description of Structure of Side Wall Section 1C)

As shown in FIG. 4, and FIGS. 5A to 5C, on the side wall section 1C, paired auxiliary fitting protrusions 14, 14 are formed at an interval in the up-down direction. The auxiliary fitting protrusions 14 are located above the camera-body connector section 12 when the side wall section 1C is viewed straight with the back wall section 1B located on the downside, the upper wall section 1D located on the right side and yet the forward direction being the topside. The paired auxiliary fitting protrusions 14, 14 have a capability of preventing the connector terminal 12c of the camera-body connector section 12 and the connector terminal (to be described later) of the imaging unit connector terminal 11 from being destroyed, in cooperation with paired auxiliary fitting holes to be described later, when inadvertent twisting force is applied to the imaging unit 2.

(Description of External Shape of Imaging Unit 2)

In the imaging unit 2, paired auxiliary fitting holes 22 is formed on the left side surface 2c to be faced by the side surface wall reinforcing sheet metal member 6, as shown in FIG. 8. When the imaging unit 2 is attached to and set in the camera body 1, the paired auxiliary fitting protrusions 14, 14 are fitted into the paired auxiliary fitting holes 22. A shock absorbing member 22a such as a sponge, rubber or the like is placed on the bottom of the paired supplementary fitting holes 22. Alternatively, the placement may be adopted such that the paired auxiliary fitting holes 22 are formed on the lateral wall section 1C and the paired auxiliary fitting protrusions 14, 14 are formed on the left side surface 2c of the housing 2A.

Figure 9:
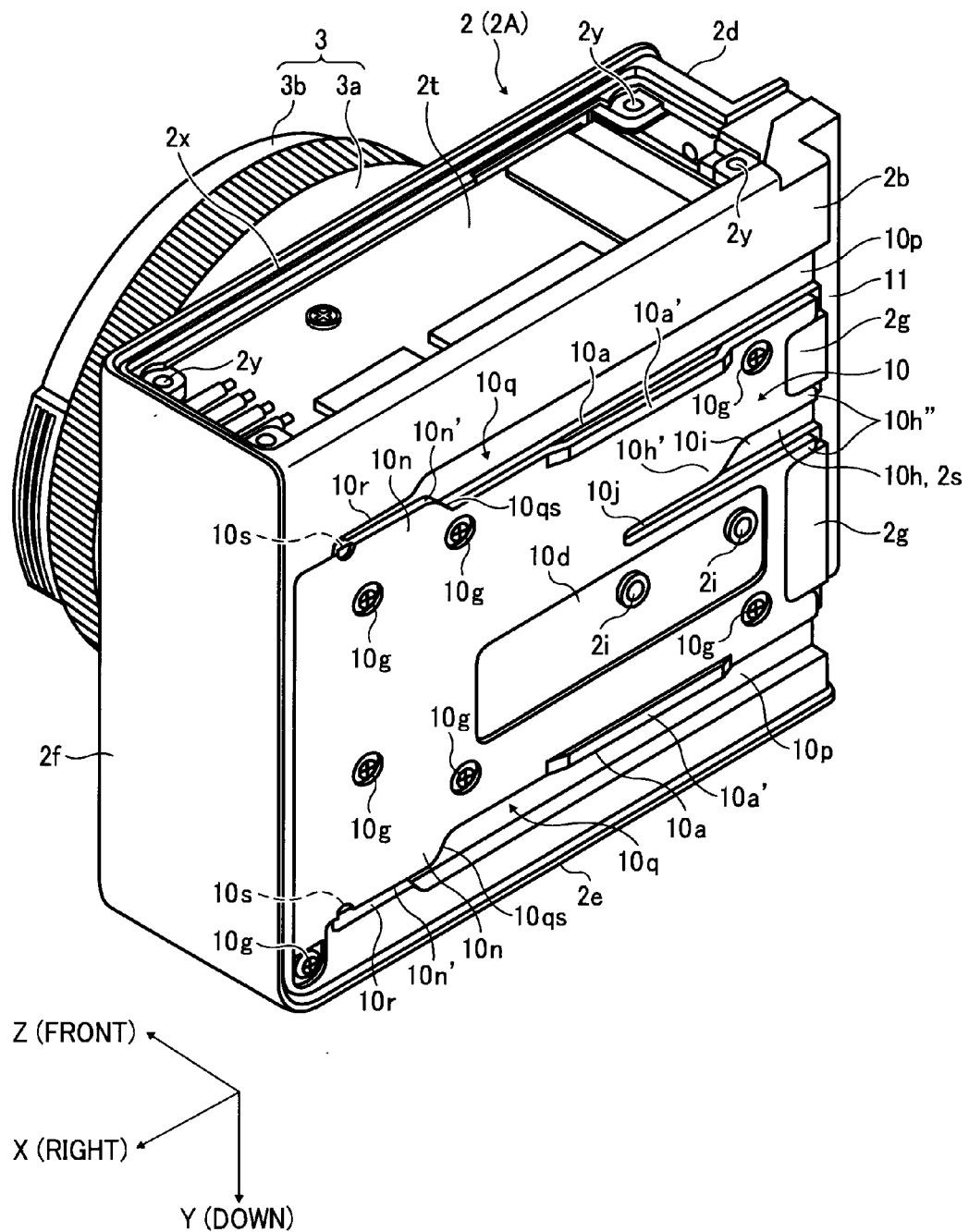
FIG. 9 is an external view of the imaging unit, as viewed from the rear side, from which a unit upper surface reinforcing sheet metal member shown in FIG. 6 is removed.
Figure 10A:
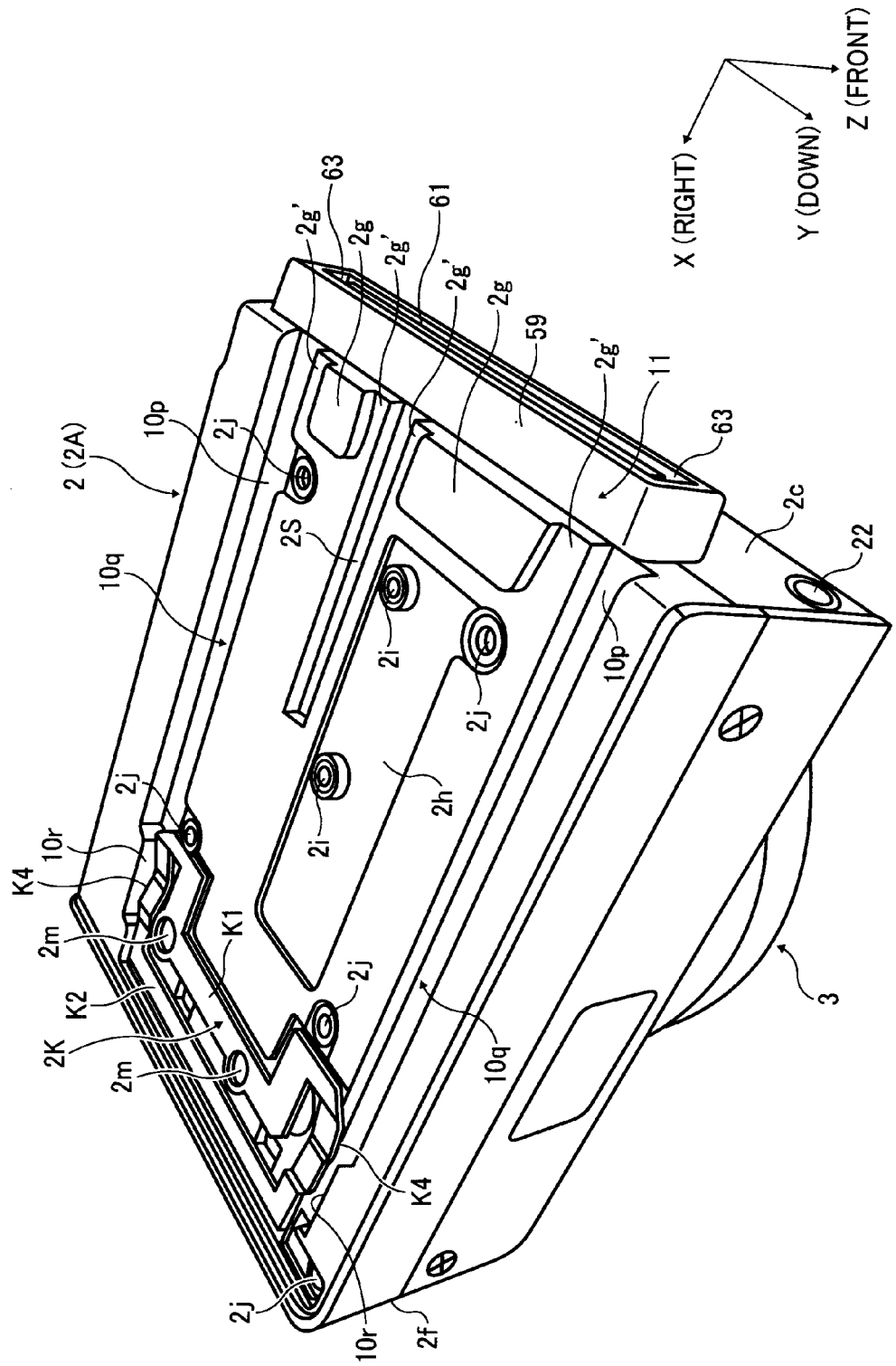
FIG. 10A is an external view of the imaging unit, as viewed from the rear side, from which a unit rear wall reinforcing sheet metal member shown in FIG. 6 is removed.

On the rear part 2b of the housing 2A, positioning raised sections 2g, 2g are formed on the side where the imaging unit connector terminal 11 exists, that is, the side of the left side surface 2c, as shown in FIGS. 6, 9, and 10A. Also, on the rear part 2b of the housing 2A, as shown in FIG. 10A, not only an engagement protrusion guiding groove 2s, a rectangular recess 2h, and paired cylindrical sections 2i are formed, but also screw holes 2j are formed at appropriate positions. On the positioning raised sections 2g, 2g, a different level section 2g' on which an open edge constituting wall section 10h'' which constitutes an late-described engagement protrusion guiding hole of the unit rear wall reinforcing sheet metal member 10 is mounted is provided.

On the side of the right side surface 2f of the housing 2A, a plate spring 2k having an inclined elastic plate section as a biasing spring which constitutes a part of the biasing section is placed. The plate spring 2k has the screw holes 2m, 2m formed. A detailed structure of the plate spring 2k will be described later.

Figure 11A:
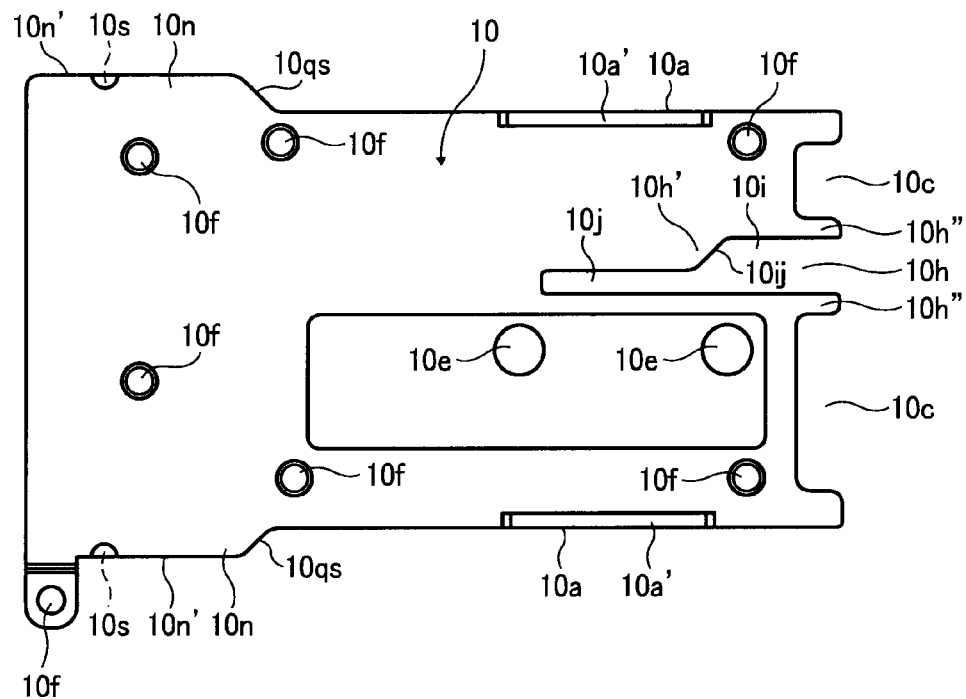
FIG. 11A is a plan view of the unit rear wall reinforcing sheet metal member shown in FIG. 6 as viewed from the outer surface.
Figure 11B:
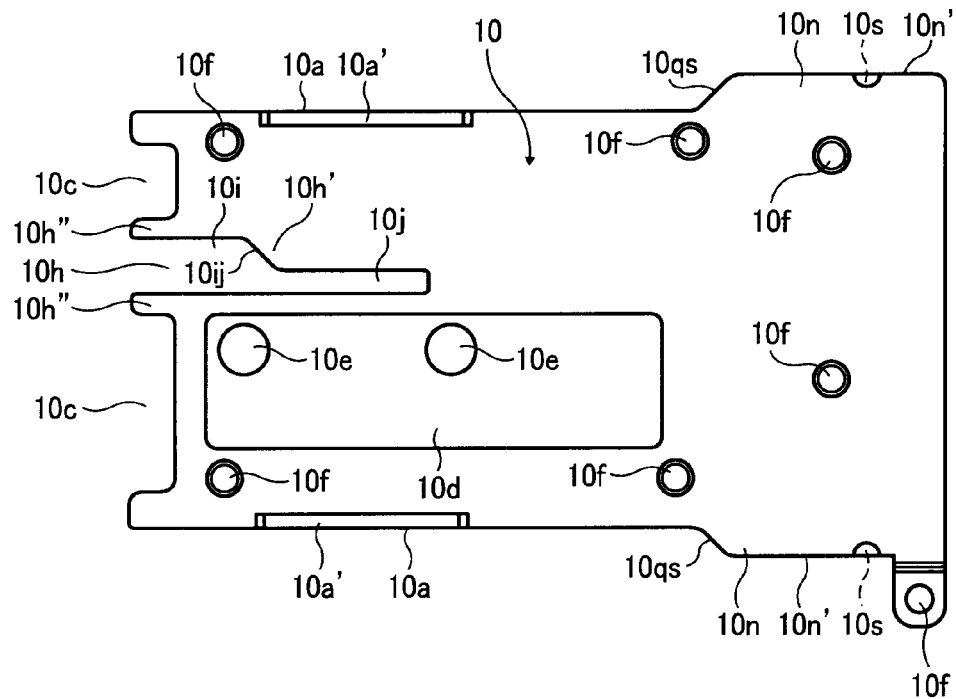
FIG. 11B is a plan view of the unit rear wall reinforcing sheet metal member shown in FIG. 11A as viewed from inside of the imaging unit.
Figure 11C:
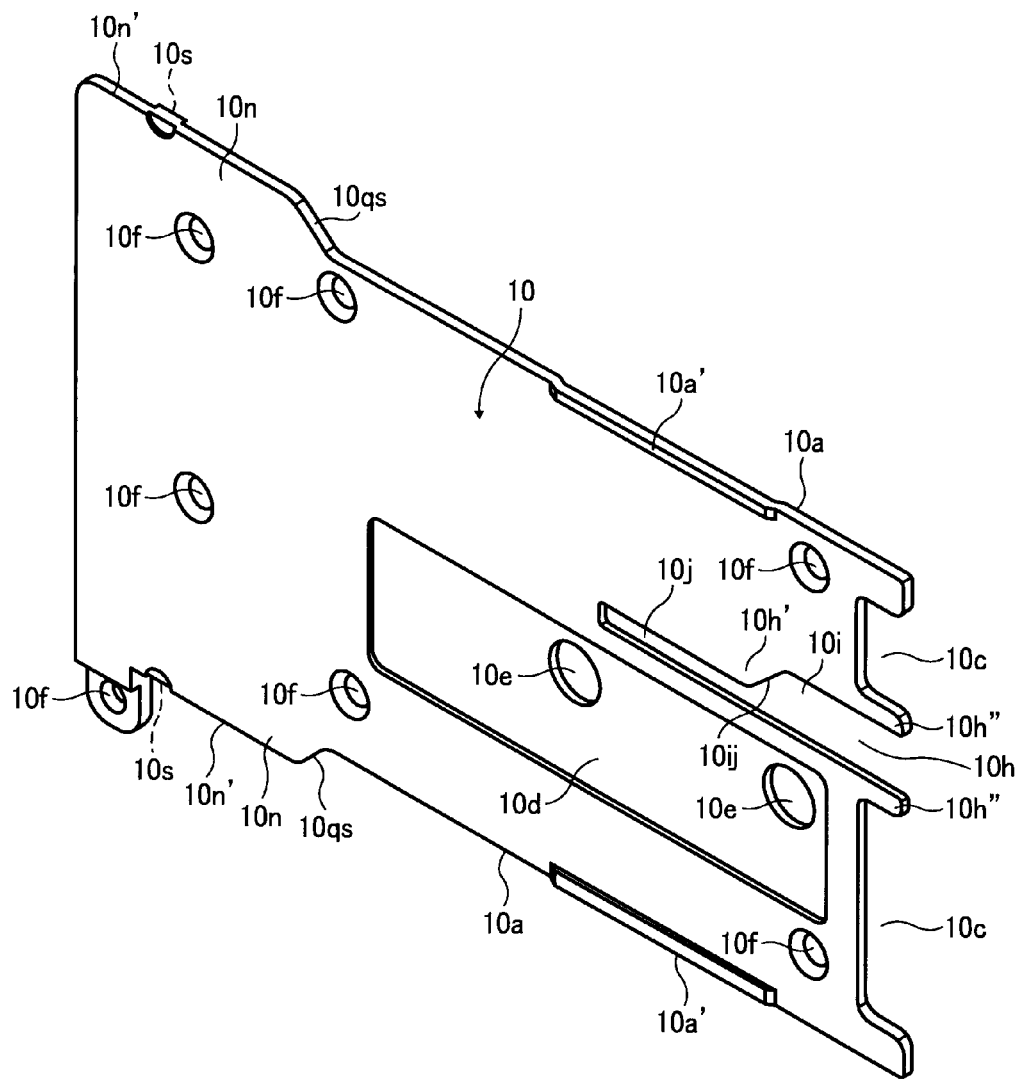
FIG. 11C is a perspective view of the unit rear wall reinforcing sheet metal member shown in FIG. 11A.
Figure 11C:
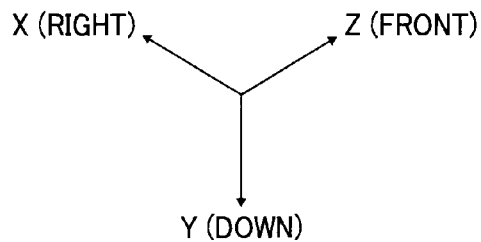

The unit rear wall reinforcing sheet metal member 10 has an almost rectangular shape, as shown in FIGS. 11A to 11C. On the unit rear wall reinforcing sheet metal member 10, positioning notches 10c, 10c are formed corresponding to positioning raised sections 2g, 2g.

In the embodiment of the present invention, as shown in FIG. 9, one of the rear surface of the imaging unit 2 and the back wall section 1B of the camera body 1 may include a projected line part 10a'. As shown in FIGS. 5C and 33D, another one of the back wall section 1B of the camera body 1 and the rear surface of the imaging unit 2 may include a projected line escaping recess 4k' configured to adjust a distance between the engagement claw 4b and a bottom wall 10p of the guiding groove 10q in cooperation with the projected line part 10a'. The projected line escaping recess 4k' may be configured to minify the distance between the engagement claw 4b and the bottom wall 10p of the guiding groove 10q if the projected line part 10a' is positioned at the projected line escaping recess 4k' when the imaging unit 2 is attached to or detached from the camera body 1 and to enlarge the distance between the engagement claw 4b and the bottom wall 10p of the guiding groove 10q if the projected line part 10a' is not positioned at the projected line escaping recess 4k' when the imaging unit 2 is attached to or detached from the camera body 1.

The back wall section 1B of the camera body 1 may include, as shown in FIGS. 5B, 5D and 7C, the resin plate 30 and the body rear wall reinforcing sheet metal member 4 having the engagement claw 4b. The resin plate 30 may include a sliding contact rib 4k adjoined to the guide protrusion 4j along with the guide protrusion 4j. The projected line escaping recess 4k' may be formed to be extended along the guide protrusion 4j. The rear surface of housing 2A of the imaging unit 2 may be provided with the unit rear wall reinforcing sheet metal member 10 having the projected line part 10a'. An outer surface of the unit rear wall reinforcing sheet metal member 10 may be capable of being slidably contacted with the sliding contact rib 4k.

Figure 33C:
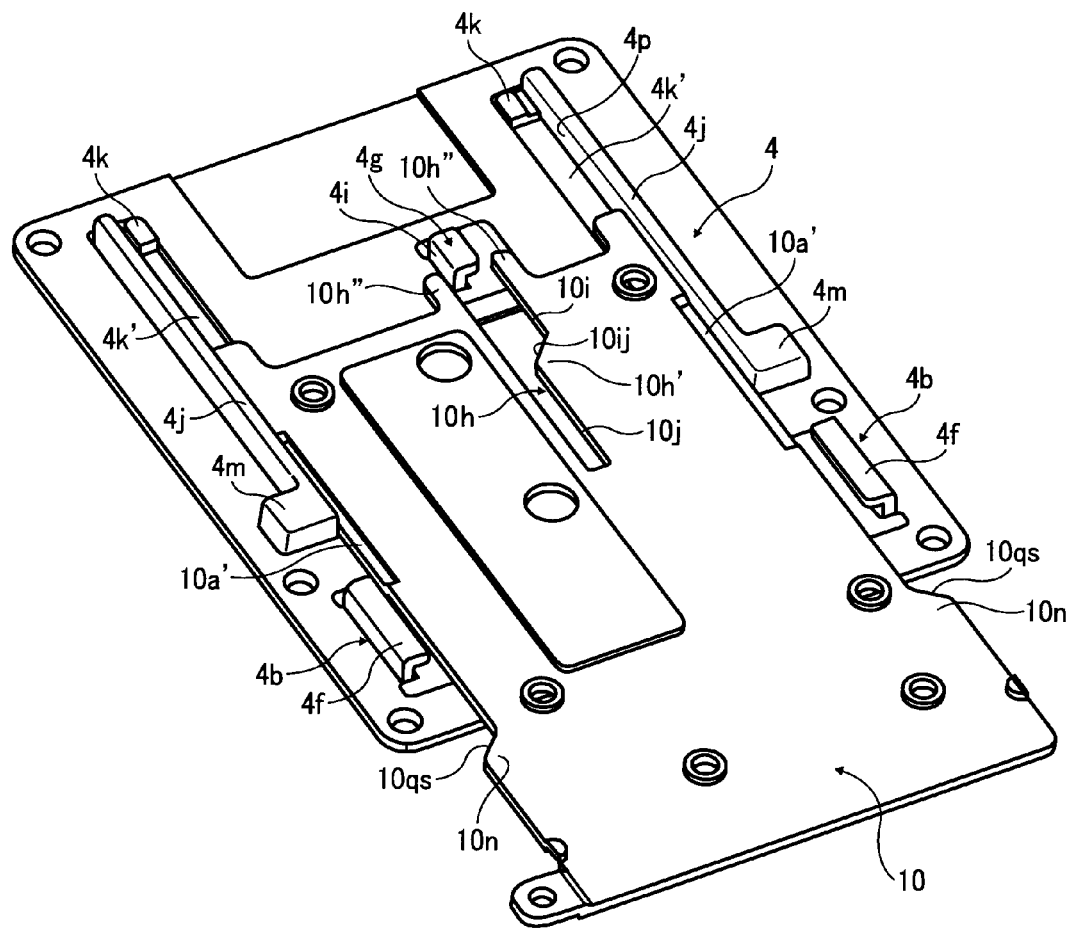
FIG. 33C is a perspective view showing a relative positional relationship of the unit rear wall reinforcing sheet metal member to the body rear wall reinforcing sheet metal member at the time when the imaging unit is set to the camera body with a normal operating procedure.
Figure 33D:
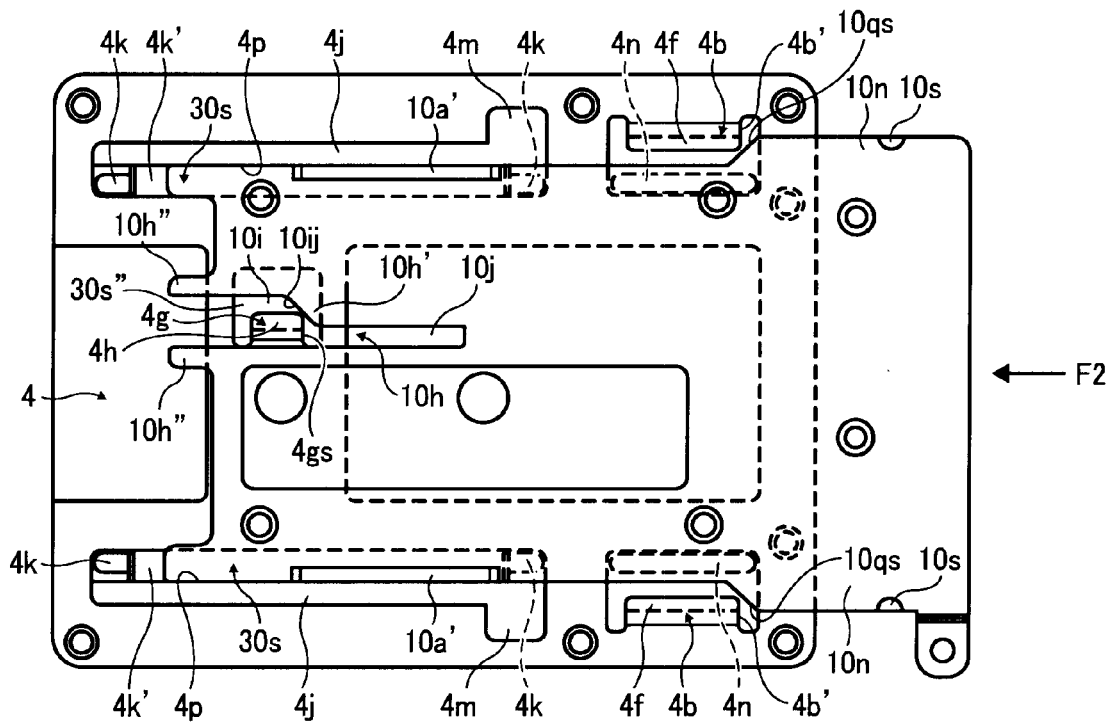
FIG. 33D is an explanatory diagram showing a relative positional relationship of the unit rear wall reinforcing sheet metal member to the body rear wall reinforcing sheet metal member at the time when an engagement protrusion is close to an inclined wall of an engagement plate section and an engagement claw is close to the inclined wall of an engagement protrusion guiding hole.

The guide protrusion 4j may include, as shown in FIGS. 5C, 9 and 33C, the guide surface 4p with which a marginal portion of the unit rear wall reinforcing sheet metal member 10 slidably contacts. The sliding contact rib 4k may abut on the projected line part 10a' of the unit rear wall reinforcing sheet metal member 10 from a side of the outer surface of the unit rear wall reinforcing sheet metal member 10 to enlarge the distance between the engagement claw 4b and the bottom wall 10p of the guiding groove 10q.

As shown in FIG. 10A, the guiding groove 10q may reach an end face where the imaging unit connector section 11 of the housing is provided.

(Structure of Unit Rear Wall Reinforcing Sheet Metal Member 10)

Figure 10B:
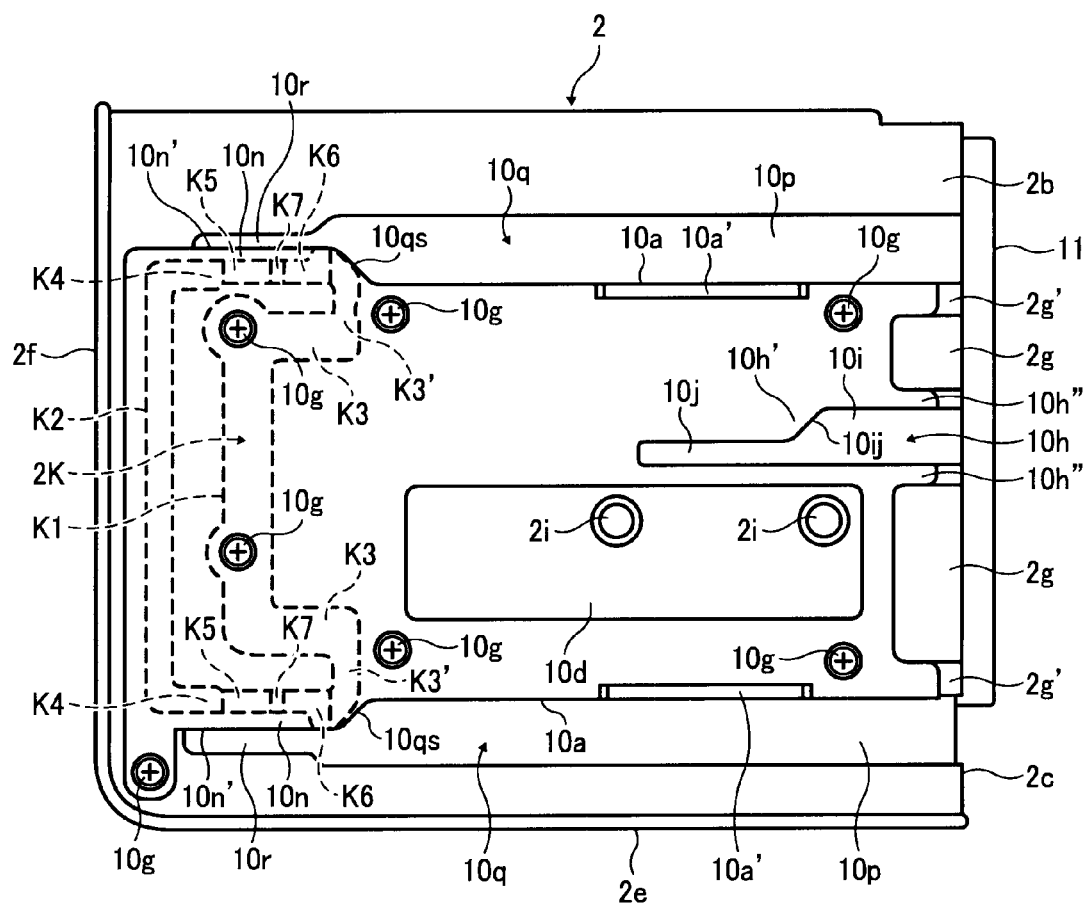
FIG. 10B is a plan view showing a positional relationship of a plate spring and the unit rear wall reinforcing sheet metal member shown in FIG. 10A.

The unit rear wall reinforcing sheet metal member 10 has a tabular raised section 10d having a shape corresponding to the rectangular recess 2h. On the tabular raised section 10d formed are fitting holes 10e into which the paired cylindrical sections 2i fit. In a periphery of the unit rear wall reinforcing sheet metal member 10, screw holes 10f are formed at positions corresponding to the screw holes 2j. The unit rear wall reinforcing sheet metal member 10 is fixed to the rear part 2b by locking screws 10g. The plate spring 2k is fixed when the unit rear wall reinforcing sheet metal member 10 is fixed by the locking screws 10g to the rear part 2b of the housing 2b. FIG. 10B shows a state where the plate spring 2k is fixed to the rear part 2b integrally with the unit rear wall reinforcing sheet metal member 10 of the housing 2A.

In the unit rear wall reinforcing sheet metal member 10 formed is an engagement protrusion guiding hole 10h which extends in the left-right direction on the right side when the unit rear wall reinforcing sheet metal member 10 is viewed from the rear side of the housing 2A with the unit rear wall reinforcing sheet metal member 10 attached to the housing 2A. The engagement protrusion guiding hole 10h has the open edge constituting wall section 10h" which opens toward the right side of the unit rear wall reinforcing sheet metal member 10. The engagement protrusion guiding groove 2s positions directly underneath the engagement protrusion guiding hole 10h and serves a function to guide the inflected section 4h of the engagement protrusion 4g.

In addition, in the unit rear wall reinforcing sheet metal member 10 formed are engagement plate sections 10n, 10n which also serve as a part of the biasing section, on the left side and on the peripheral edges 10a, 10a when the unit rear wall reinforcing sheet metal member 10 is viewed from the rear side of the housing 2A with the unit rear wall reinforcing sheet metal member 10 attached to the housing 2A. On the peripheral edges 10a, 10a of the unit rear wall reinforcing sheet metal member 10, as shown in FIGS. 11A to 11C, projected line parts 10a', 10a' are formed. The projected line parts 10a', 10a' project from inside (inner surface) of the housing 2A toward outside (outer surface).

Between the rear part 2b and the unit rear wall reinforcing sheet metal member 10 formed are the guiding groove 10q and guiding holes for engagement claw cut and bent section 10r, as shown in FIGS. 6 and 9. The guiding groove 10q allows guide protrusion 4j which extends in left-right direction, the rectangular protrusion 4m and the engagement claw 4b to enter. The guiding holes for engagement claw cut and bent section 10r guides the cut and bent section 4e of the engagement claw 4b. In addition, the notation 10p designates the bottom wall of the guiding groove 10q which constitutes a part of the rear part 2b.

In the engagement plate sections 10n, 10n, semicircular convex sections 10s, 10s, facing the end of the guiding holes for engagement claw cut and bent section 10r, formed are in the peripheral edges 10n', 10n', as shown in FIGS. 11A to 11C. The semicircular convex sections 10s, 10s are located at the ends of the guiding holes for an engagement claw cut and bent section 10r and projected to a direction in which the plate spring 2k exists.

That is to say, the semicircular convex sections 10s, 10s project from outer side of the housing 2A toward the inner side so that the direction in which the semicircular convex sections 10s, 10s project and the direction in which the projected line parts 10a', 10a' project are opposite each other. The action of the semicircular convex sections 10s, 10s will be explained together with that of the plate spring 2k.

In addition, the paired guiding grooves 10q constitute an imaging unit guide mechanism, and any one of the paired guiding grooves 10q is referred to as a first guiding groove which is provided on the rear part 2b of the imaging unit 2 and extends in a direction corresponding to a first direction. Any other one of the paired guiding grooves 10q is referred to as a second guiding groove which is provided on the rear part 2b of the imaging unit 2 and extends in a direction corresponding to the first direction.

The body rear wall reinforcing sheet metal member 4, as shown in FIGS. 33D and 33C, may include the engagement protrusion 4g configured to abut on the outer surface of the unit rear wall reinforcing sheet metal member 10 from the side of the outer surface of the unit rear wall reinforcing sheet metal member 10 when the engagement claw 4b of the body rear wall reinforcing sheet metal member 4 abuts on an outer surface of the engagement plate section 10n of the unit rear wall reinforcing sheet metal member 10 from the side of the outer surface of the unit rear wall reinforcing sheet metal member 10 in order to stop the camera body connector section 12 and the imaging unit connector section 11 from being connected each other in a way that the imaging unit 2 is to be slantingly attached to the camera body 1.

(Reasons that the Engagement Protrusion 4g, the Engagement Protrusion Guiding Hole 10h, the Projected Line Parts 10a' and the Projected Line Escaping Recess 4k' are Provided)

In the embodiment of the present application, since the recess 1A of the camera body 1 is open in the three directions, the level of freedom in attaching the imaging unit 2 to the camera body 1 is increased. Therefore, there may be a case that the imaging unit 2 is not attached to the camera body 1 with a normal operating procedure described later.

For example, the paired engagement claws 4b is provided on the far side of the camera-body connector section 12. Therefore, if there were no engagement protrusion 4g, the cut and bent section 4e of the engagement claw 4b would not be guided to the guiding hole for engagement claw cut and bent section 10r, and the inflected section 4f of the paired engagement claws 4b would abut on the engagement plate section 10n. Thus, even though the rear part 2b of the imaging unit 2 were obliquely inclined to the rear wall of the back wall section 1B, the camera-body connector section 12 and the imaging unit connector section 11 might be fitted and connected to each other. If the camera-body connector section 12 and the imaging unit connector section 11 were forcibly fitted to each other with the rear part 2b of the imaging unit 2 obliquely inclined to the rear wall of the back wall section 1B, the camera-body connector section 12 and the imaging unit connector section 11 might be destroyed.

Further, even when the imaging unit 2 is attached to the camera body 1 with the normal operating procedure described later, since the paired engagement claws 4b, 4b are projecting from the recess 1A, even if the paired engagement claws 4b, 4b are inserted into the guiding groove 10q, the inflected section 4f of the engagement claw 4b may damage the bottom wall 10p of the guiding groove 10q by abutting thereon somehow.

Specifically, if a depth of the guiding groove 10q of the rear part 2b is made shallower in order to increase the space inside the housing 2A without thickening the entire thickness (thickness in the Z direction) of the housing 2A, there may be more chances to damage the bottom wall 10p somehow.

In every case as described above, since the recess 1A is open to the three directions; the lower side, the front side and the lateral side, and because the level of freedom of the imaging unit 2 being attached to and detached from the camera body 1 is increased, the quality of the manipulation of attaching and detaching may be degraded.

Figure 33E:
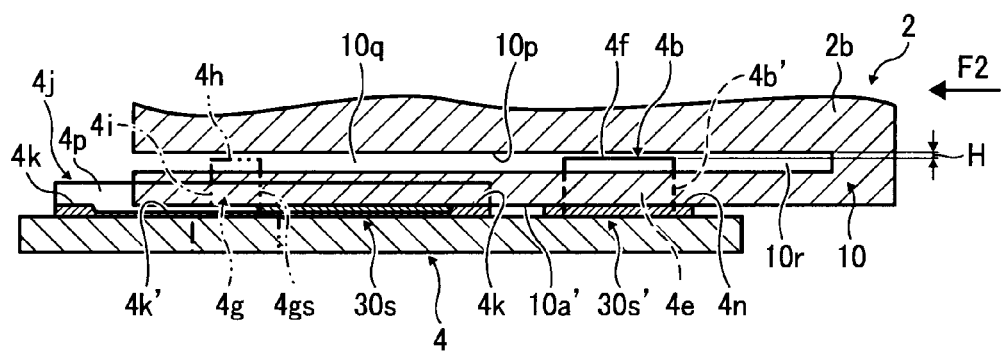
FIG. 33E is a cross sectional view at the time when the body rear wall reinforcing sheet metal member and the rear wall reinforcing sheet metal for unit are in a positional relationship shown in FIG. 33D.
Figure 33F:
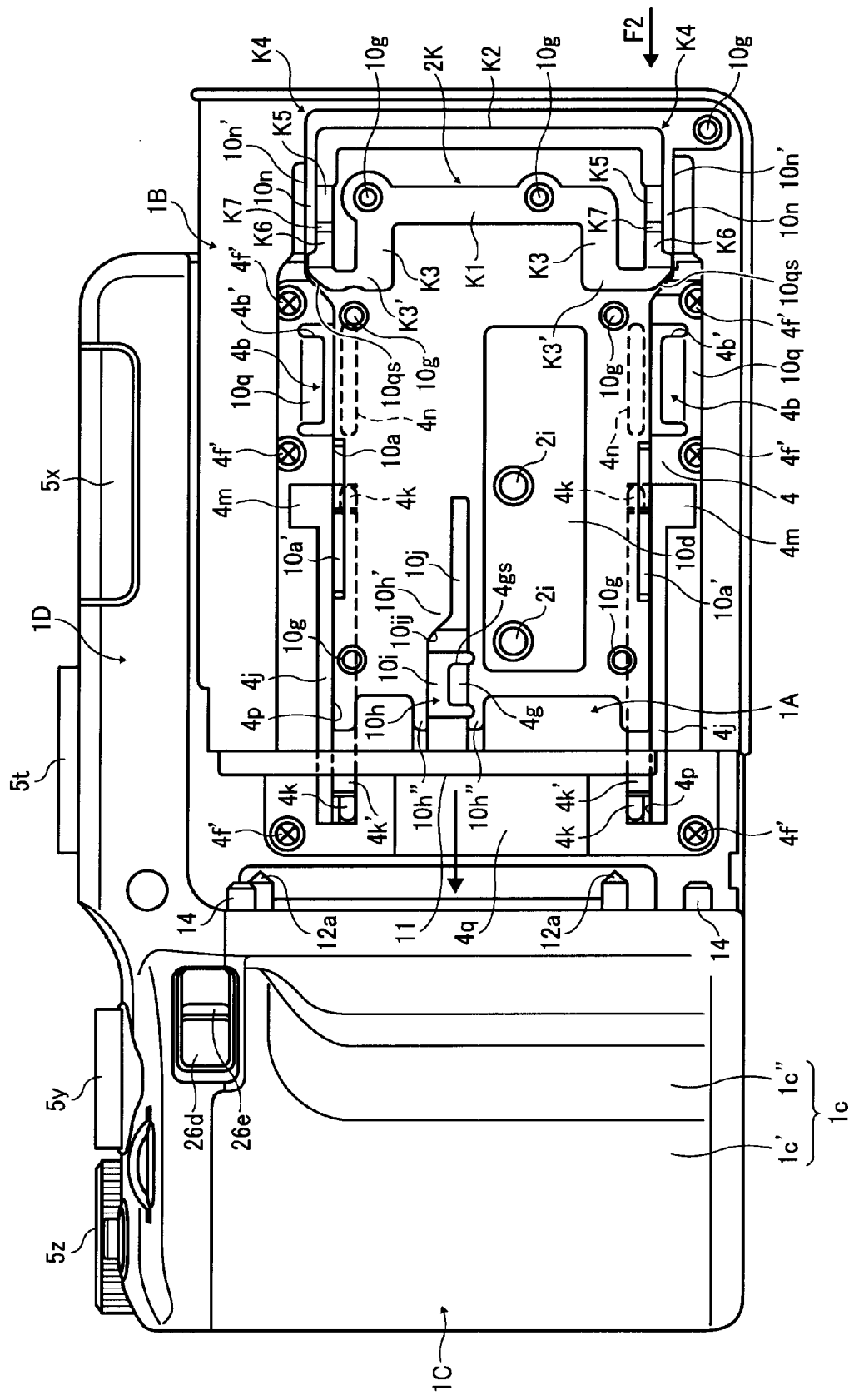
FIG. 33F is an explanatory diagram showing in detail an intermediate state between the states where the body rear wall reinforcing sheet metal member and the unit rear wall reinforcing sheet metal member are in a positional relationship shown in FIG. 33A and where the body rear wall reinforcing sheet metal member and the unit rear wall reinforcing sheet metal member are in a positional relationship shown in FIG. 33D.
Figure 33G:
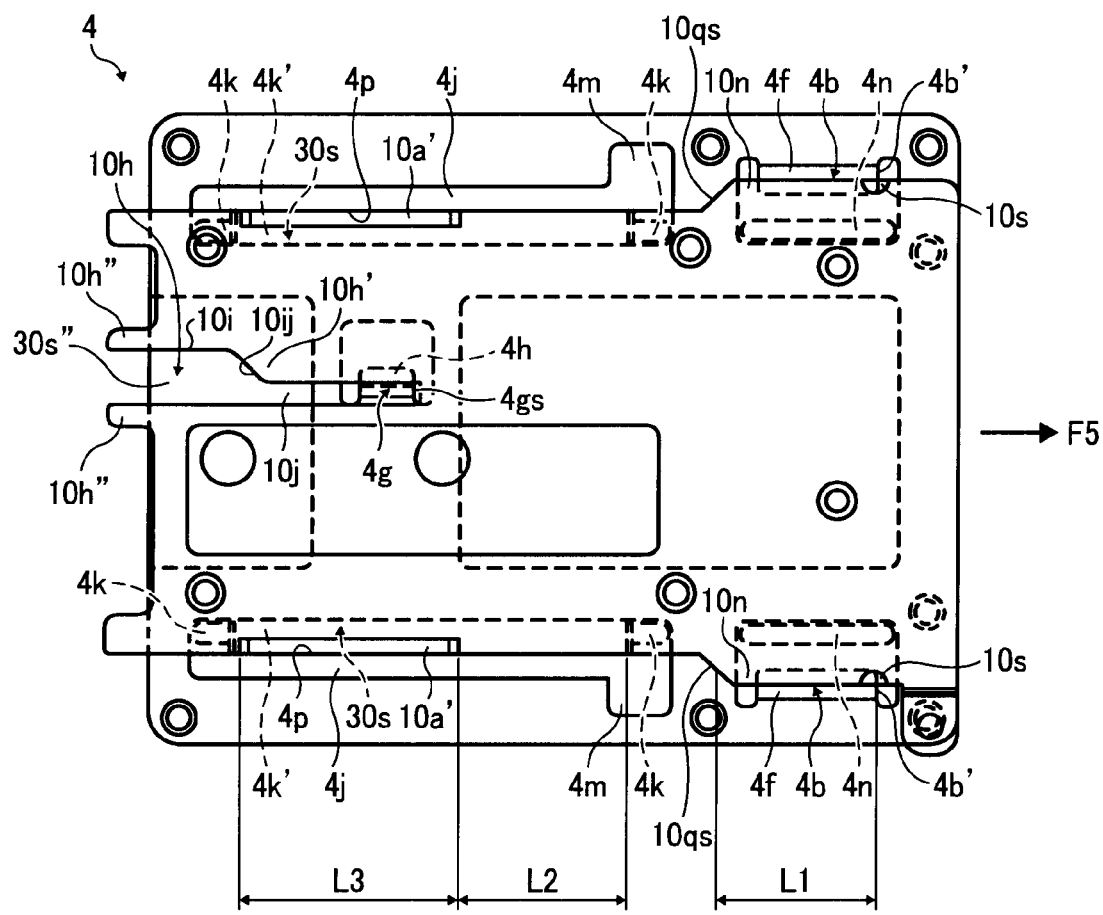
FIG. 33G is an explanatory diagram showing a relative positional relationship of the unit rear wall reinforcing sheet metal member to the camera-body rear wall reinforcing sheet metal member with a connection of the camera-body connector section and the imaging unit connector section completed, and a perspective view in which the unit rear wall reinforcing sheet metal member and the body rear wall reinforcing sheet metal member are shown from the front face side of the imaging unit.
Figure 33H:
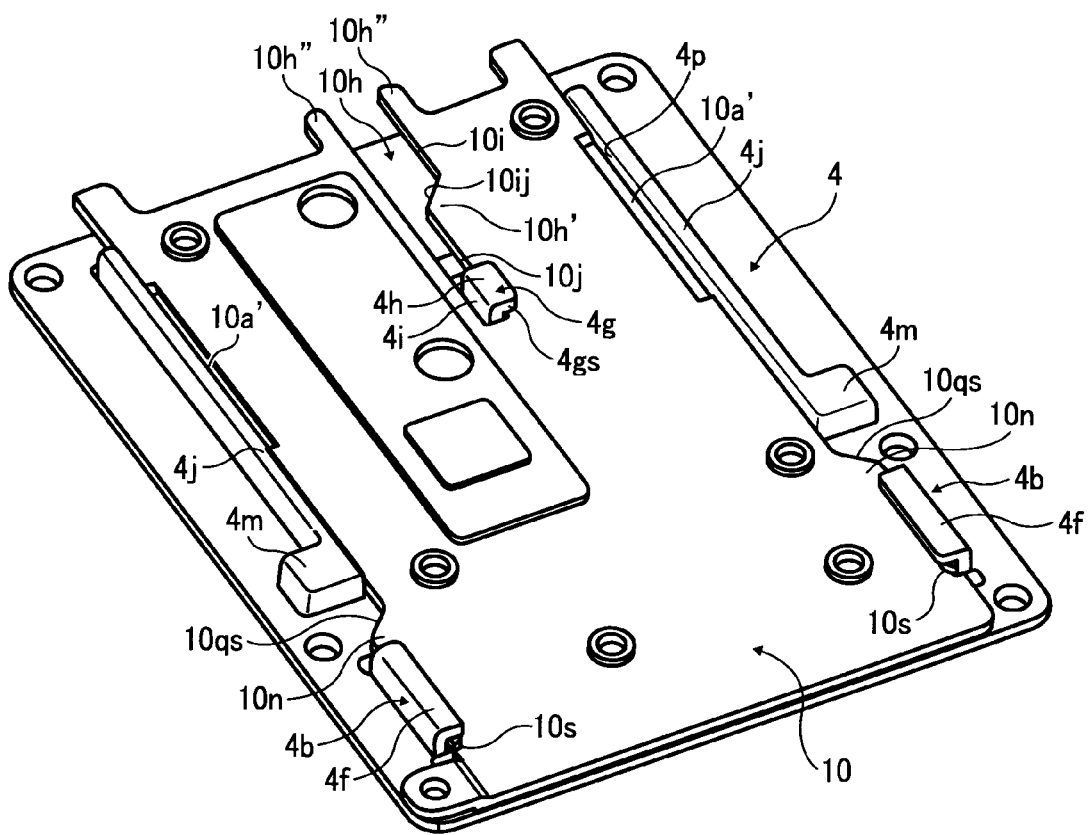
FIG. 33H is a perspective view showing a relative positional relationship of the unit rear wall reinforcing sheet metal member to the camera-body rear wall reinforcing sheet metal member with a connection of the camera-body connector section and the imaging unit connector section completed.

The unit rear wall reinforcing sheet metal member 10, as shown in FIGS. 9 and 33H, may include the engagement protrusion guiding hole 10h. The engagement protrusion 4g may be inserted into the engagement protrusion guiding hole 10h when the engagement claw 4b is inserted into the guiding groove 10q.

(Structure of Preventing Camera-Body Connector Section 12 and Imaging Unit Connector Section 11 from Being Connected in Case of Abnormal Operating Procedure)

The engagement protrusion 4g has a role to prevent the camera-body connector section 12 and the imaging unit connector section 11 from being destroyed, in cooperation with the engagement protrusion guiding hole 10h. The engagement protrusion guiding hole 10h is provided corresponding to the engagement protrusion guiding groove 2s. The engagement protrusion guiding hole 10h and the engagement protrusion guiding groove 2s are open toward the left side surface (end surface) 2c of the housing 2A in here. As shown in FIGS. 6, 9, and FIGS. 11A to 11C, the engagement protrusion guiding hole 10h includes an insertion opening 10i which allows entry of the inflected section 4h of the engagement protrusion 4g and a guiding hole for engagement protrusion cut and bent section 10j which guides the cut and bent section 4l in a left-right direction.

Width of the guiding hole for engagement protrusion cut and bent section 10j is designed to be smaller than that of the inflected section 4h, and a part of a constituting wall section (angle controlling abutting section) 10h' which includes the guiding hole for engagement protrusion cut and bent section 10j and the insertion opening 10i is an inclined wall section. A connection of the camera-body connector section 12 and the imaging unit connector section 11 is prevented by the inflected section 4h abutting on the constituting wall section 10h'.

That is to say, the insertion opening 10i is formed so that whenever the right edges 4b', 4b' of the paired engagement claws 4b, 4b shown in FIGS. 5A, 5C, and FIGS. 7A to 7C abut on the constituting wall section which constitutes an inclined wall 10qs shown in FIGS. 6, 9, and FIGS. 11A to 11C, an edge 4gs of the engagement protrusion 4g shown in FIGS. 4, 5A, 5C and FIGS. 7A to 7C abuts on the constituting wall section 10h' of an inclined wall 10ij.

Because of this, when the inflected section 4f of the engagement claw 4b abuts and rests on the engagement plate section 10n from the outside, the inflected section 4h of the engagement protrusion 4g abuts and rests on the constituting wall section 10h' and the imaging unit 2 floats parallel to the rear wall of the back wall section 1B. Thus, positions of the auxiliary fitting protrusions 14 and the auxiliary fitting holes 22 are out of alignment, thus preventing a connection of the camera-body connector section 12 and the imaging unit connector section 11.

In addition, if the inflected section 4f is located inside the imaging unit 2 relative to the engagement plate section 10n, both connector sections 11, 12 are connected in parallel. The detailed function will be described later.

(Description of Unit Upper Surface Wall Reinforcing Sheet Metal Member 20)

Figure 12:
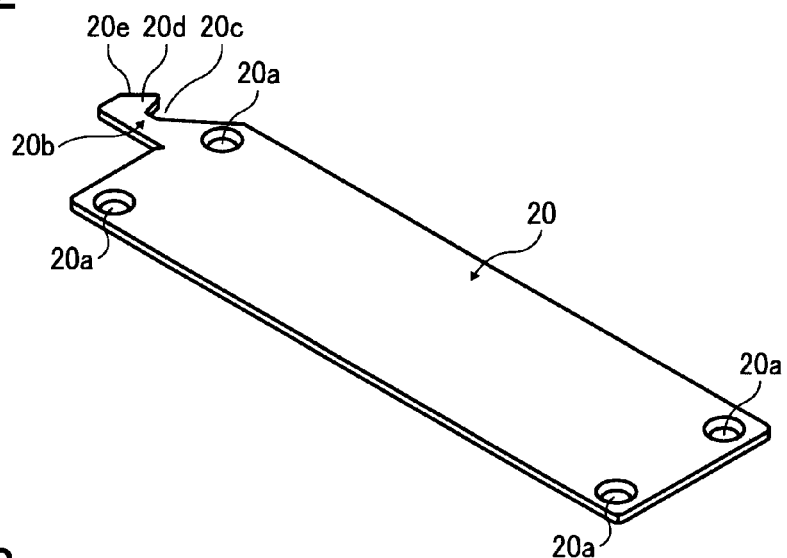
FIG. 12 is a perspective view of the unit upper wall reinforcing sheet metal member shown in FIG. 6.

On the upper surface 2d of the housing 2A, an unit upper surface wall reinforcing sheet metal member 20 shown in FIGS. 4, 6, 8 and 12 is placed. As shown in FIG. 12, the unit upper surface wall reinforcing sheet metal member 20 has screw holes 20a at appropriate positions. The unit upper surface wall reinforcing sheet metal member 20 has an extended plate section 20b which is extended more outward than the left side surface 2c of the housing 2A.

As shown in FIG. 9, on the upper surface 2d of the housing 2A, a place of placement 2t of the unit upper surface wall reinforcing sheet metal member 20 is defined by a surrounding wall 2x which surrounds a circumference of the unit upper surface wall reinforcing sheet metal member 20. In the placement place 2t, screw holes 2y are formed at positions corresponding to the screw holes 20a of the unit upper surface wall reinforcing sheet metal member 20. The unit upper surface wall reinforcing sheet metal member 20 is placed at the placement place 2t and fixed by locking screws 20z to the upper surface 2d, as shown in FIGS. 4, 6, and 8.

In this way, the extended plate section 20b extends along the upper surface of the imaging unit connector section 11. In the extended plate section 20b, a notch section 20c and a to-be-locked claw 20d as a to-be-locked member are formed, as shown in FIG. 12. A locking claw, to be described later, as a locking member enters the notch section 20c. The to-be-locked claw 20d enters the notch section of the locking member to be described later. The to-be-locked claw 20d has an inclined wall 20e. The imaging unit 2 is fixed to the camera body 1 by engagement of the locking member and the to-be-locked member.

In a state that the imaging unit 2 is fixed to the camera body 1, as shown in FIGS. 1 and 2, as the unit upper surface wall reinforcing sheet metal member 20 is surrounded by the surrounding wall 2x, it is not visible even when the imaging unit 2 is viewed from the front face. This makes appearance of the imaging apparatus look better and prevents entry of any dust between the upper surface 2d of the imaging unit 2 and the upper wall section 1D of the camera body 1.

(Description of Locking Mechanism and Unlocking Mechanism)

Figure 13:
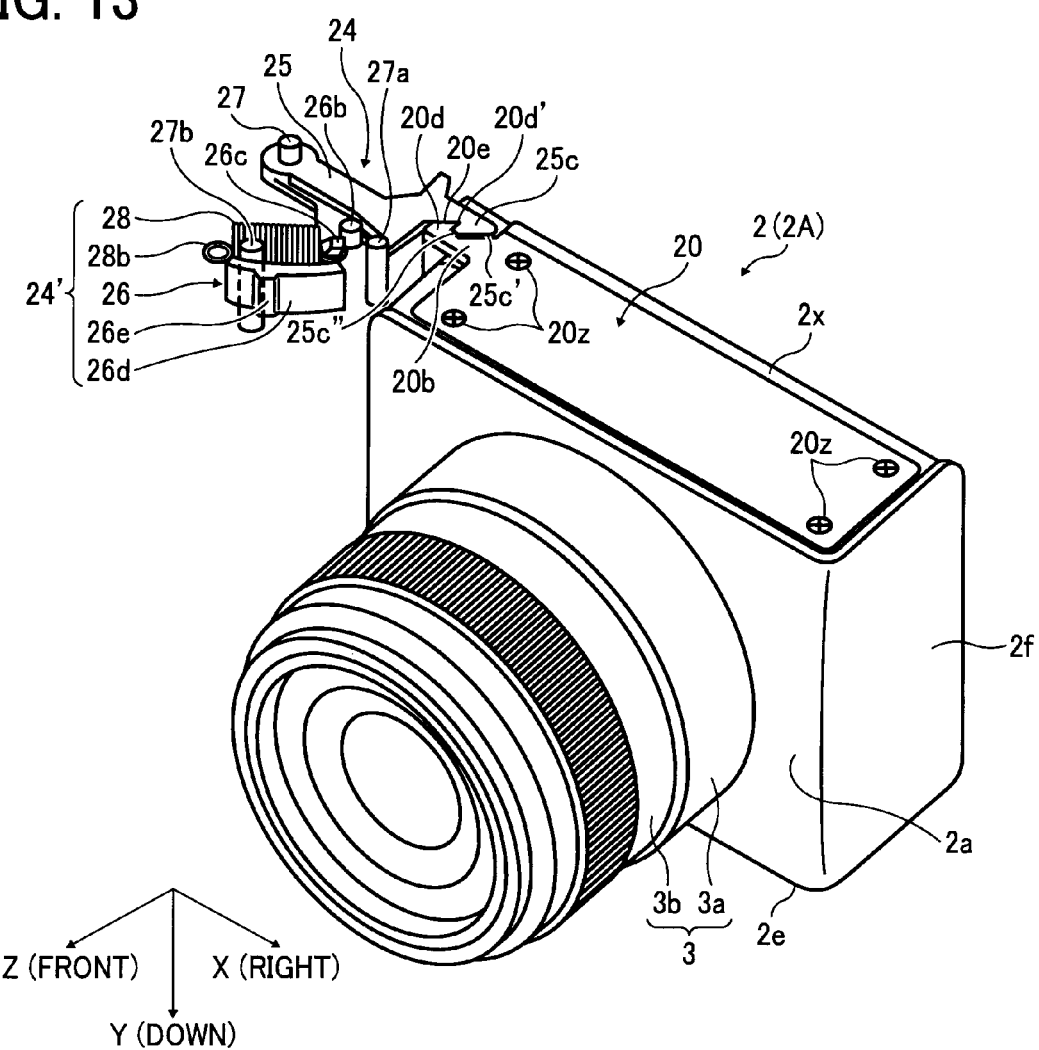
FIG. 13 is a perspective view showing an engagement relationship of the imaging unit, a locking member, and an unlocking member shown in FIG.
Figure 14:
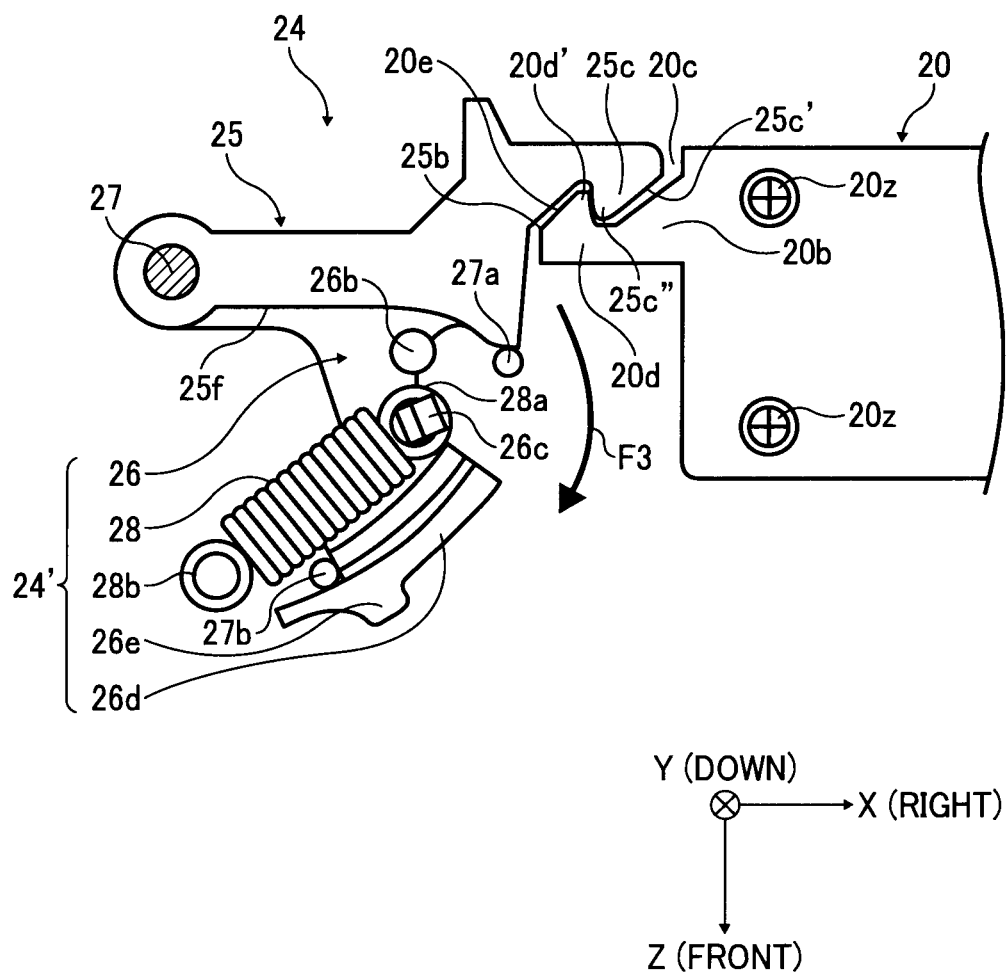
FIG. 14 is a partial enlarged view showing an engagement relationship of the locking member, the unlocking member, and a to-be-locked member shown in FIG. 13.

In the camera body 1, a locking mechanism 24 shown in FIGS. 13 and 14 is provided. The locking mechanism 24 is located at a crossing section (corner) where the side wall section 1C and the upper wall section 1D meet. The locking mechanism 24 has a capability of locking the imaging unit 2. As shown in FIG. 5C, the locking mechanism 24 is located in the proximity of the upper left corner with respect to the housing 2A, when the housing 2A is viewed from an oblique direction with the housing 2A placed in the recess 1A.

The locking mechanism 24 roughly includes a locking plate 25 (see FIGS. 15 and 16) as a locking member, a spindle 27, and a stopper 27a. The stopper 27a is fixed to the camera body 1. The locking plate 25 serves a function to lock the imaging unit 2 in cooperation with the to-be-locked claw 20d as a to-be-locked member. The unlocking mechanism 24' roughly includes an unlocking manipulating member (unlocking plate) 26 (see FIGS. 17 and 18), a spindle 27, and a stopper 27b. The stopper 27b is fixed to the camera body 1. The unlocking manipulating member 26 serves a function to unlock the imaging unit 2 locked to the camera body 1 by the locking plate 25.

The unlocking manipulating member 26 is provided at a position similar to that of a remove button of an interchangeable lens barrel unit of a conventional single lens reflex camera, when the camera body 1 is viewed from the front face. Thus, even a user who is accustomed to a conventional single-lens reflex camera of interchangeable lens barrel type can easily perform removal operation of the imaging unit 2, and erroneous operation is less likely to occur. Hence, it is possible to provide a camera body 1 from which an imaging unit can be easily removed, while reducing risk due to erroneous operation.

Figure 15:
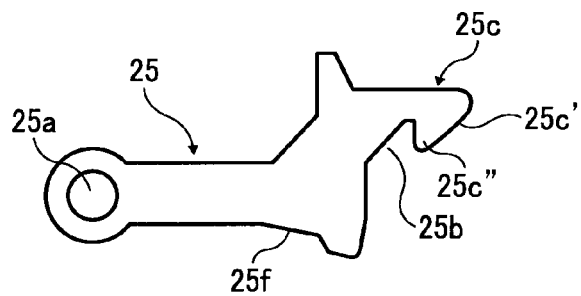
FIG. 15 is a plan view of the locking member shown in FIG. 14.
Figure 16:
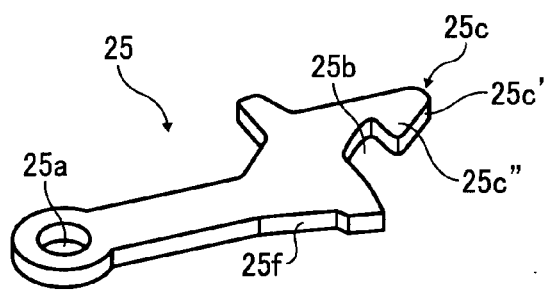
FIG. 16 is a perspective view of the locking member shown in FIG. 15.

As shown in FIGS. 15 and 16, the locking plate 25 has a shaft hole 25a, a notch section 25b, and a locking claw 25c. The spindle 27 (see FIGS. 13 and 14) is passed through the shaft hole 25a. A claw tip 25c" of the locking claw 25c is directed forward, when a direction from the rear side to the front face side of the camera body 1 is defined to be forward. In addition, a claw tip 20d' (see FIG. 14) of a to-be-locked claw 20d is directed to a direction facing the back wall section 1B with the imaging unit 2 placed in the recess 1A. That is to say, the claw tip 20d' of the to-be-locked claw 20d is directed backward when a direction from the front face side to the rear side of the camera body is defined as backward.

The locking plate 25 is turned around the spindle 27 and biased to a forward direction (arrow F3 direction in FIG. 14) by biasing means (not shown). The stopper 27a serves a function to control a turning stop position of the locking plate 25 by the biasing means. When the locking claw 25c and the to-be-locked claw 20d are not engaged with each other, the locking plate 25 is held in a state to abut on the stopper 27a, by turning and biasing of the biasing means.

The unlocking manipulating member 26 is disconnected from the stopper 27a. An inclined wall 25c' is formed in the locking claw 25c. The inclined wall 25c' is engaged with an inclined wall 20e, producing component force that turns the locking plate 25 backward with the spindle 27 as a supporting point, when the imaging unit 2 is attached to the camera body 1 by moving the imaging unit 2 from right to left relative to the camera body 1.

Figure 17:
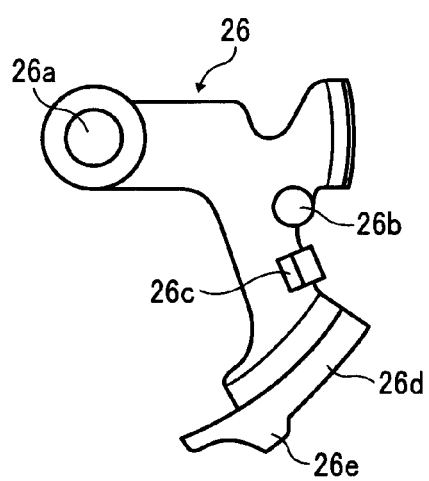
FIG. 17 is a plan view of the unlocking member shown in FIG. 14.
Figure 18:
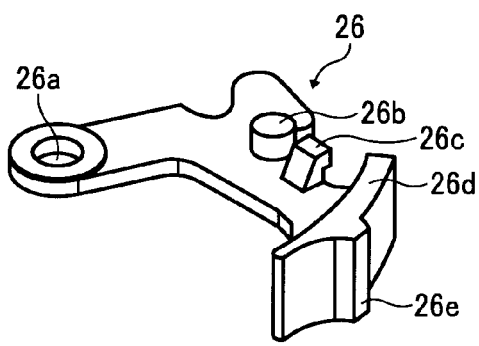
FIG. 18 is a perspective view of the unlocking member shown in FIG. 17.

As shown in FIGS. 17 and 18, the unlocking manipulating member 26 has a shaft hole 26a, a releasing protrusion 26b, a latching protrusion 26c and an unlock button 26d. The spindle 27 which rotatably supports the locking plate 25 passes through the shaft hole 26a. The spindle 27 is inserted into the shaft hole 25a and the shaft hole 26a and fixed to the camera body 1.

The releasing protrusion 26b serves a function to abut the side surface 25f of the locking plate 25 and turn the locking plate 25 in an unlocking direction (opposite direction to F3). One end 28a of an unlocking spring 28 is latched to the latching protrusion 26c. The other end 28b of the unlocking spring 28 is latched to a latching protrusion (not shown) provided at an appropriate part in the side wall section 1C. The unlocking spring 28 serves a function to turn and bias the unlocking manipulating member 26 forward with the spindle 27 as a center.

The stopper 27b serves a function to control a turning stop position of the unlocking manipulating member 26 by turning and biasing force of the unlocking spring 28. The unlocking manipulating member 26 abuts on the stopper 27b when it is not manipulated. When the unlocking manipulating member 26 is manipulated, the unlocking manipulating member 26 moves away from the stopper 27b, and is turned in a direction toward the stopper 27a. The turning of the unlocking manipulating member 26 to the manipulation direction is controlled by the stopper 27a.

As shown in FIGS. 1 and 2, the unlock button 26d is located above the finger rest recess 1c" when the side on which the upper wall section 1D exists is up. That is to say, the finger rest recess 1c" is located below the unlocking manipulating member 26. The unlock button 26d has a finger receiving section 26e which protrudes outward from the grip section 1c.

The upper part of the grip 1c is usually a position which does not hinder a user from gripping the grip section while shooting. Since the position does not easily allow inadvertent manipulation, it is possible to provide a camera body from which an imaging unit can be easily removed, while further reducing risk of erroneous operation. Furthermore, since the unlocking manipulating member 26 is provided at a position above the grip recess where the user's finger is less likely to reach when gripping a grip convex section, a concern of erroneous operation can further be reduced.

In this embodiment, the unlock button 26d is turned along the appearance configuration of the grip section 1c. The locking plate 25 and the unlocking manipulating member 26 overlap each other, and are turned with the spindle 27 as a supporting point. The locking plate 25 is turned on almost the same plane as a turning plane of the unlock button 26d.

(Detailed Structure of Camera-Body Connector Section 12 and Imaging Unit Connector Section 11)

Figure 19:
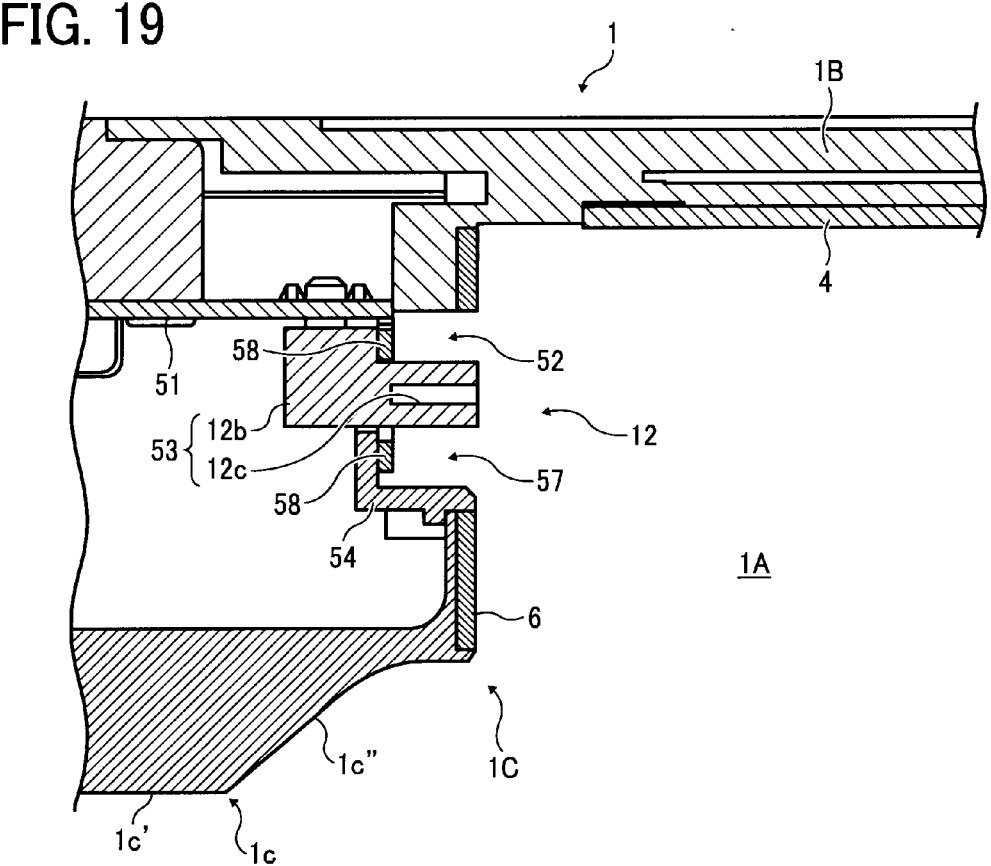
FIG. 19 is a cross sectional view showing a detailed structure of a camera-body connector section shown in FIGS. 4 and 5C.
Figure 20:
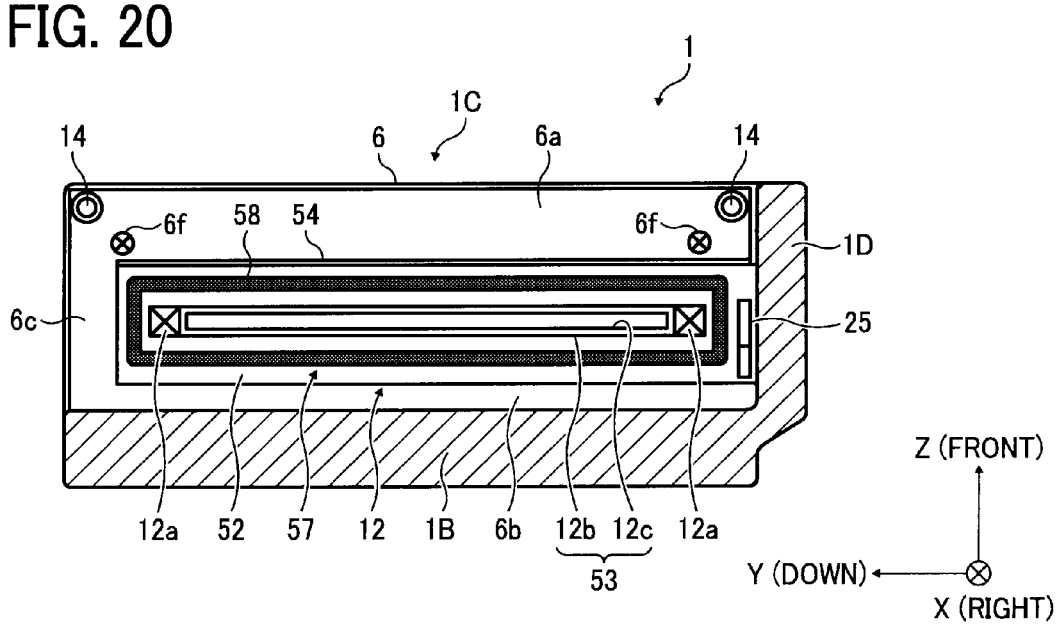
FIG. 20 is a cross sectional view showing a state where the camera-body connector section shown in FIG. 19 is viewed straight with the back wall section on the downside.

As shown in FIGS. 19 and 20, in the side wall section 1C, an opening for fitting 52 which opens to the recess 1A is formed corresponding to the imaging unit connector section 11. A connector main body 53 is placed in the opening 52. The camera-body connector section 12 is formed by placing the connector main body 53 in the opening 52. The side surface wall reinforcing sheet metal member 6 is placed so as to avoid the opening 52.

Here, as shown in FIG. 20, the side surface wall reinforcing sheet metal member 6 includes an upper marginal plate section 6a, a lower marginal plate section 6b and a connecting plate section 6c which connects the plate sections 6a and 6b, when the side wall section 1C is viewed from the front face, with the back wall section 1B on the downside and the upper wall section 1D on the right side. The connecting plate section 6c is located on the left side and the right side of the side surface wall reinforcing sheet metal member 6 is open.

An outline configuration of the opening 52 is defined by a connector cover member 54 provided in the side wall section 1C and the back wall section 1B. The connector main body 53 is formed of the connector terminal 12c covered with the covering member 12b.

Figure 21:
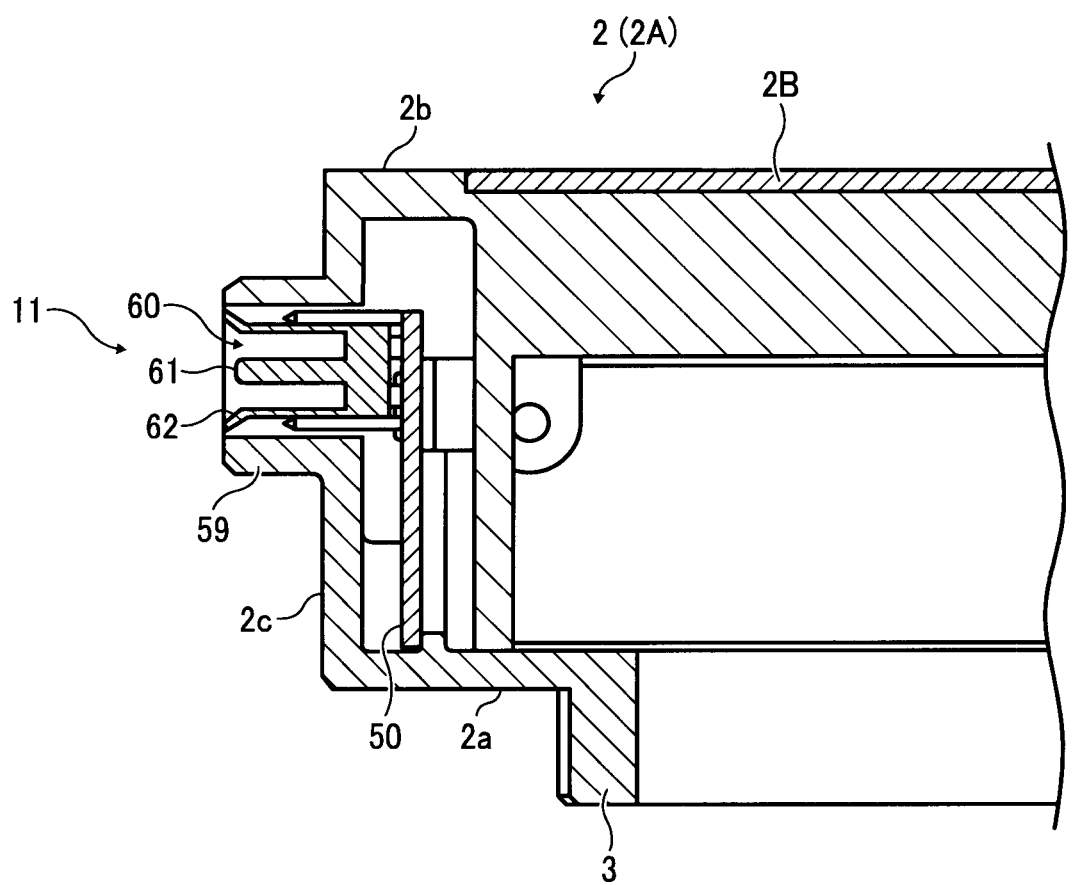
FIG. 21 is a cross sectional view showing a detailed structure of the imaging unit connector section shown in FIG. 8.

To enable data transfer (communications) between the camera body 1 and the imaging unit 2, the connector main body 53 is connected to a connector main body 60 of the imaging unit connector section 11 shown in FIG. 21.

The connector terminal 12c can be electrically connected with a connector terminal 61, as a result of horizontal movement of the connector main body 60 of the imaging unit connector section 11 relative to the connector terminal 61. Here, the connector terminal 12c is of female type. In addition, the connector terminal 61 is of male type. Additionally, the connector terminal 61 is surrounded by a surrounding member 62. As shown in FIG. 8, positioning holes 63 into which positioning protrusion 12a, 12a are fitted are formed between the surrounding member 62 and the connector terminal 61.

The connector terminal 12c is connected to a connector board 51 which is fixed to the camera body 1. On the connector board 51, electric circuits such as a circuit to control the imaging unit 2 by manipulating the manipulating section, a processing circuit to process images captured by the imaging unit 2, or the like are wired.

The covering member 12b is formed of an elongated shape so as to cover the connector terminal 12c. The covering member 12b serves a function to prevent the electric circuit, an electric element or the like from being damaged by discharge, caused by a touch of a human hand, of static electricity accumulated on human body, when the imaging unit 2 is attached to the camera body 1

In the camera-body connector section 12, an annular groove 57 surrounding the connector main body 53 is formed due to a difference in dimensions of the opening 52 and the connector main body 53. The annular groove 57 is such dimensioned that a connector cover section 59 as a fitting protrusion of the imaging unit connector section 11 can enter medially, while surrounding the connector main body 53 and the connector main body 60 which are mutually connected. A rectangular sealing member 58 which surrounds the connector main body 53 is provided in the annular groove 57. As shown in FIG. 20, in the annular groove 57, the locking plate 25 is placed more closely to the upper wall section 1D than to the sealing member 58.

The connector cover section 59 protrudes from the left side surface 2c of the housing 2A. The connector main body 60 is placed within the connector cover 59.

The sealing member 58 is shaped like a sheet formed of elastically deformable materials such as rubber (elastic resin material) or sponge (spongy resin material). The sealing member 58 is bonded to an annular wall forming the annular groove 57 using an adhesive or the like.

Figure 22:
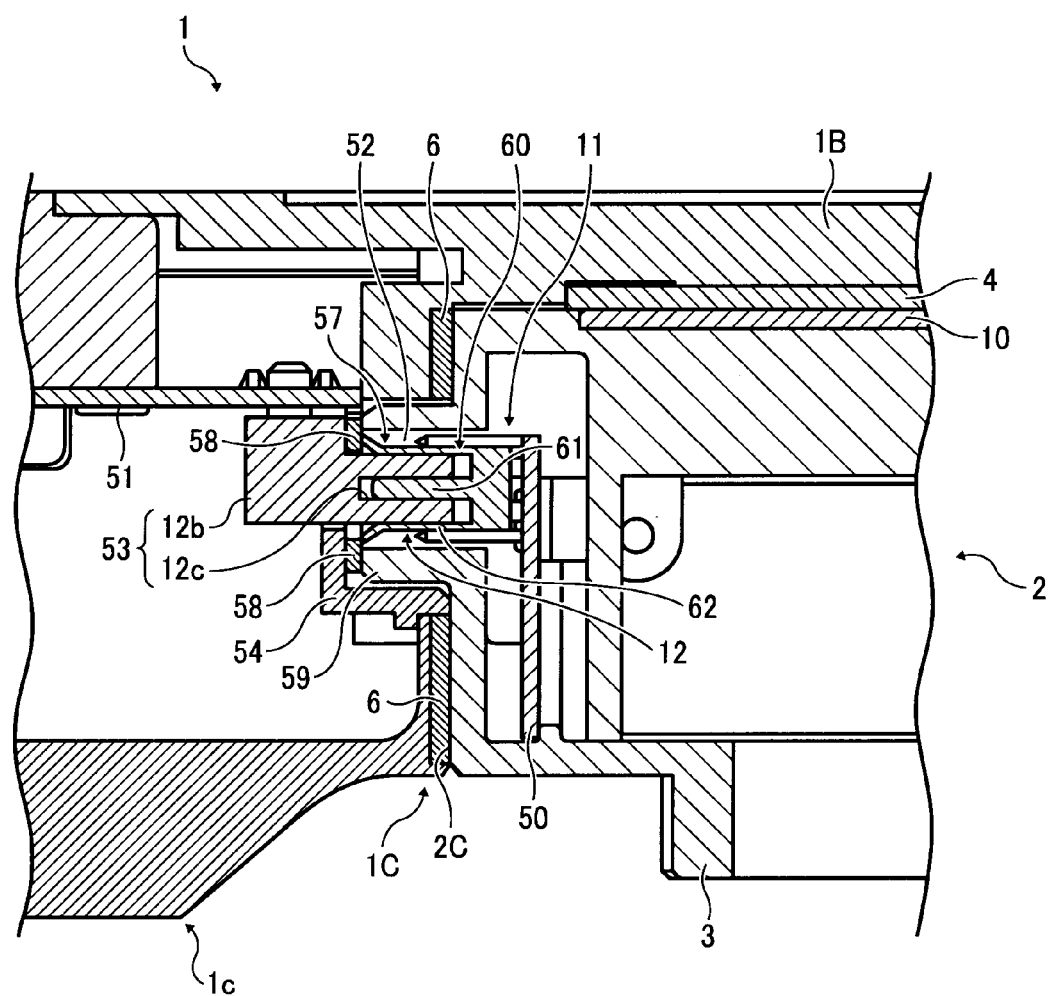
FIG. 22 is a cross sectional view showing how the camera-body connector section shown in FIG. 19 and the imaging unit connector section shown in FIG. 21 are connected to each other.

The sealing member 58 has a dust-proof or water-proof function which prevents dust or liquid or the like from adhering to the connector main body 53 (connector terminal 12c) and the connector main body 60 (connector terminal 61) which are mutually connected as shown in FIG. 22.

As shown in FIG. 22, when the imaging unit 2 is attached to the recess 1A of the camera body 1 in an appropriate manner, the left side surface 2c of the housing 2A abuts on the side wall section 1C, that is to say, the body side surface wall reinforcing metal sheet member 6, thereby performing positioning of the imaging unit 2 in the left-right direction in the recess 1A.

In addition, with the imaging unit 2 attached to the recess 1A of the camera body 1, the connector cover section 59 (see FIG. 21) of the imaging unit connector section 11 is loosely fitted into the annular groove 57 of the camera-body connector section 12, the connector main body 60 of the imaging unit connector section 11 is appropriately connected to the connector main body 53 of the camera-body connector section 12 by the paired positioning holes 63 and the paired positioning protrusions 12a, and thus the camera body 1 and the imaging unit 2 are connected so that they can electrically communicate.

Then, a tip of the connector cover section 59 of the imaging unit connector section 11 is brought into contact with the sealing member 58, by applying pressure, provided in the annular groove of the camera-body connector section 12.

Reliable sealing between the tip of the connector cover section 59 and the sealing member 58 is possible by the tip of the connector cover section 59 coming into contact with the sealing member 58 through application of pressure. Thus, it is possible to prevent entry of dust or liquid or the like from the recess 1A of the camera body 1 into the connector cover section 59 of the connector main body 60 of the imaging unit connector section 11.

(Description of Shape of Plate Spring 2K)

Figure 23:
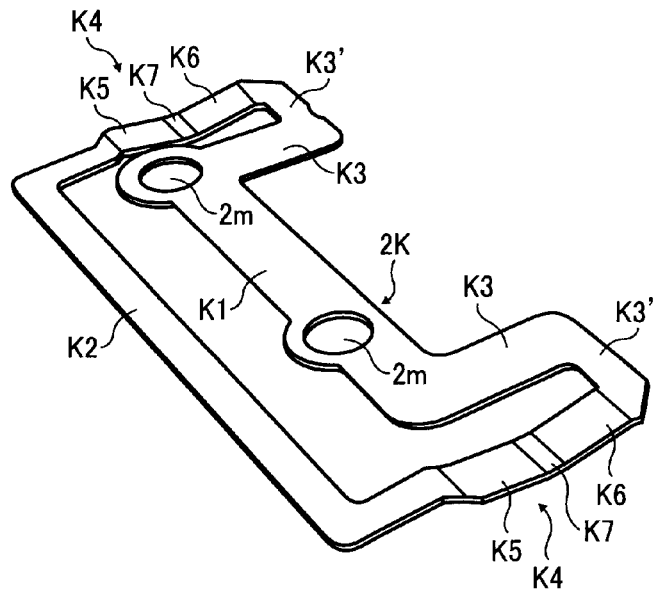
FIG. 23 is an enlarged perspective view showing an appearance configuration of the plate spring shown in FIG. 10A.
Figure 24:
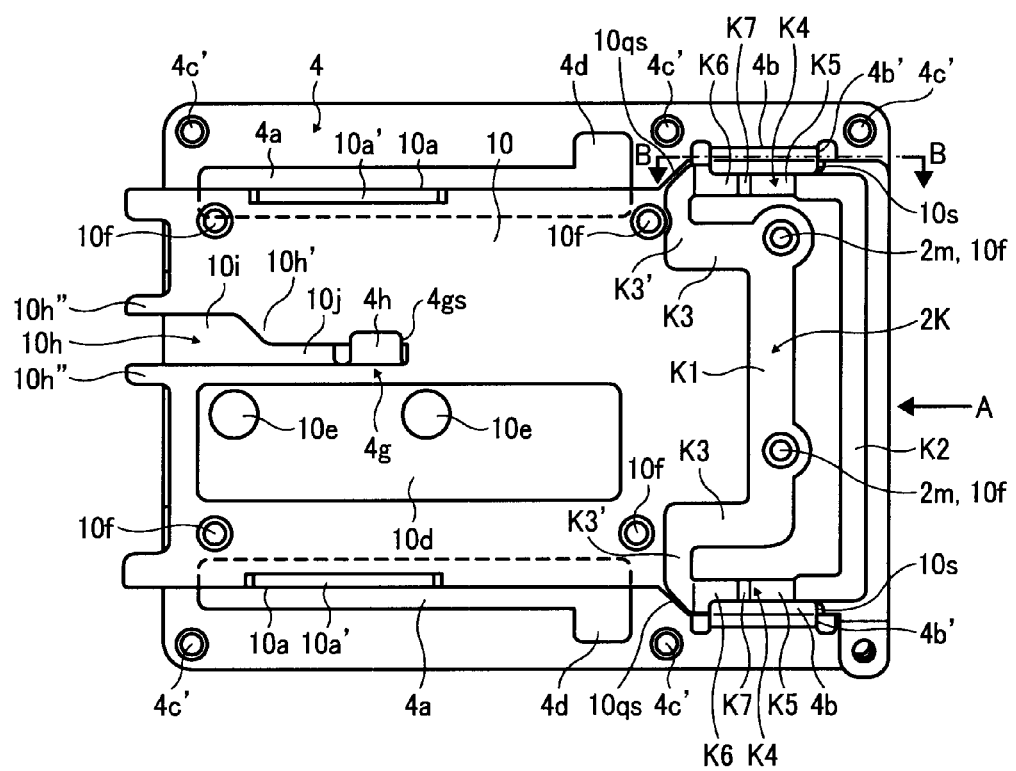
FIG. 24 is a plan view showing a relative positional relationship of the body rear wall reinforcing sheet metal member shown in FIG. 5A, the unit rear wall reinforcing sheet metal member shown in FIGS. 6 and 9, and the plate spring shown in FIGS. 10A and 23.

FIG. 23 is an enlarged perspective view showing an appearance configuration of the plate spring 2k. FIG. 24 is a view showing a positional relationship of the plate spring 2k, the unit rear wall reinforcing sheet metal member 10 and the body rear wall reinforcing sheet metal member 4 when their engagement is in a complete state.

As shown in FIGS. 10B, 23 and 24, the plate spring 2k has a mounting plate section k1 and a free plate section k2. The mounting plate section k1 and the free plate section k2 are almost parallel to each other and extend in a direction orthogonal to the paired guiding holes for engagement claw cut and bent section 10r of the imaging unit 2 shown in FIGS. 6 and 10B. The paired screw holes 2m, 2m are formed at an interval in the paired the mounting plate sections k1.

The mounting plate sections k1 have paired parallel plate sections k3, k3 which extend in parallel with the guiding holes for engagement claw cut and bent section 10r from the parts where the screw holes 2m, 2m are formed. The paired parallel plate sections k3, k3 have orthogonal plate sections k3', k3' which orthogonally extend in a direction to the guiding groove 10q on the same plane in the proximity to the border between the guiding holes for engagement claw cut and bent section 10r and the guiding groove 10q. The paired orthogonal plate sections k3', k3' are connected to each other at both ends in a direction in which the free plate section k2 extends.

In FIGS. 23 and 24, signs k4, k4 designate connecting plate sections which connect the paired orthogonal plate sections k3', k3' and the free plate section k2. As shown in FIG. 23, the paired connecting plate sections k4, k4 includes inclined elastic plate sections k5, k6 and abutting plate sections k7. The paired connecting plate sections k4, k4 extends along the guiding holes for engagement claw cut and bent section 10r.

The inflected sections 4f, 4f of the paired engagement claws 4b, 4b are configured so that with reference to the unit rear wall reinforcing sheet metal member 10, they face the connecting plate sections k4, k4 from the inside of the imaging unit 2 rather than from the unit rear wall reinforcing sheet metal member 10. That is to say, the inflected sections 4f, 4f of the paired engagement claws 4b, 4b are configured so that they face the connecting plate sections k4, k4.

The inclined elastic plate section (biasing spring) k5, k6 are located on the engagement plate sections 10n, 10n facing the engagement claws 4b, 4b and bias the imaging unit 2 to the back wall section 1B.

If there was no engagement protrusion 4g when the inflected section 4f abuts on the engagement plate section 10n from the outside of the imaging unit 2, both connector sections 11, 12 might be connected to each other with the imaging unit 2 inclined to the body rear wall reinforcing sheet metal member 4 of the camera body 1. However, according to the embodiment of the present invention, no such problem occurs because of the following reasons.

Figure 26:
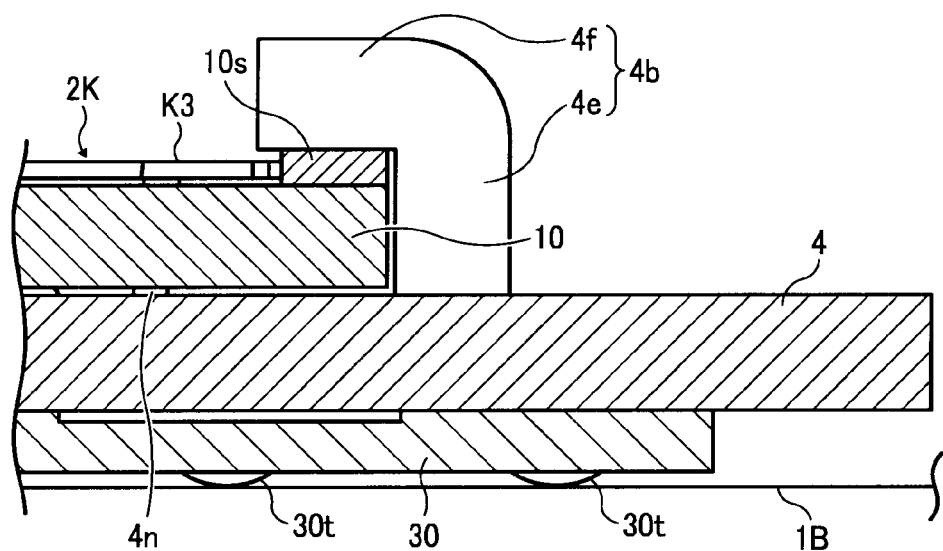
FIG. 26 is a cross sectional view showing an engagement relationship between an engagement claw and the unit rear wall reinforcing sheet metal member shown in FIG. 25 in a partially enlarged manner.
Figure 27:
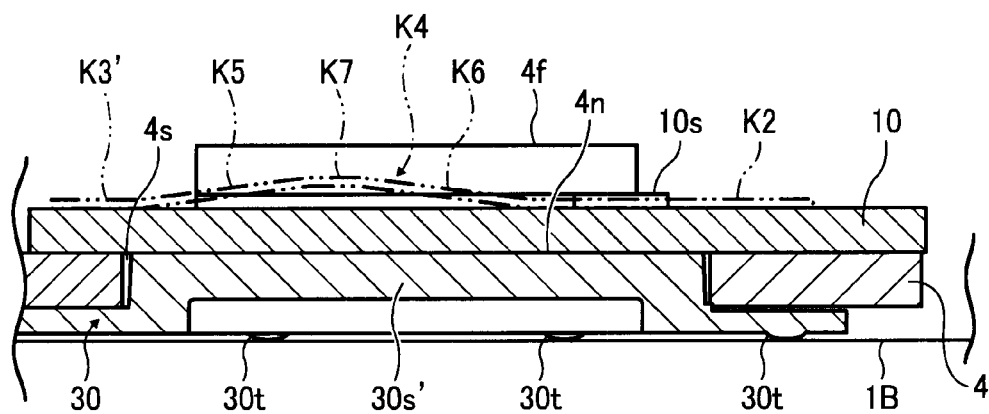
FIG. 27 is a cross sectional view along an arrow B-B line shown in FIG. 24.

In addition, as shown in FIGS. 26 and 27, when the inflected section 4f is located within the imaging unit 2 with respect to the engagement plate section 10n, irrespective of presence of engagement protrusion 4g, there is no possibility that both connector sections 11, 12 are connected to each other with the imaging unit 2 inclined to the body rear wall reinforcing sheet metal member 4 of the camera body 1.

Paired engagement claws 4b, 4b can abut on the abutting plate section k7 with the imaging unit 2 appropriately attached to the camera body 1, that is to say, with the imaging unit connector section 11 and the camera-body connector section 12 connected to each other.

Figure 25:
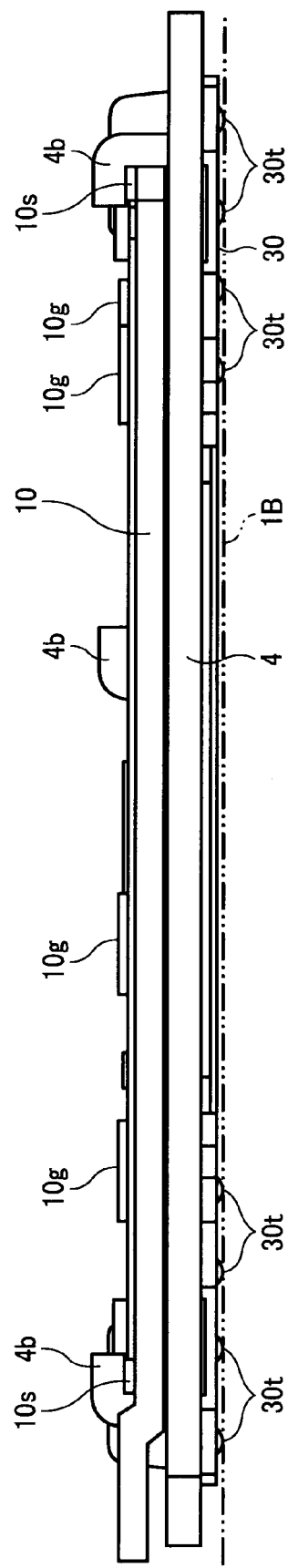
FIG. 25 is an explanatory view of an engagement relationship of the unit rear wall reinforcing sheet metal member and the body rear wall reinforcing sheet metal member shown in FIG. 24, as viewed from a direction of an arrow A shown in FIG. 24.

As shown in FIGS. 24 to 26, pressing force in a direction to the body rear wall reinforcing sheet metal member 4 by biasing force due to elastic deformation of the inclined elastic plate sections k5, k6 is applied to the unit rear wall reinforcing sheet metal member 10, with engagement of the engagement claw 4b with engagement plate sections 10n, 10n of the unit rear wall reinforcing sheet metal member 10 being completed. As a result of this, the imaging unit 2 is pressed against the camera body 1.

In addition, the semicircular convex section 10s abuts on the inflected section 4f, and even if there is any gap attributed to a dimension error between the inflected section 4f and the unit rear wall reinforcing sheet metal member 10, play due to this dimension error will be absorbed by elastic deformation of the plate spring 2k and the semicircular convex section 10s, as shown in FIG. 27. In addition, FIG. 27 shows a state of the plate spring 2k before the elastic formation in a two-dot chain line.

(Description of Function of Sliding Contact Ribs 4k, 4n of Resin Plate 30 and Supplementary Description of Configuration of Resin Plate 30)

Supposing that the projected line escaping recess 4k' is not provided on the raised sections 30s and the projected line parts 10a', 10a' are not formed on the unit rear wall reinforcing sheet metal member 10, the function of the sliding contact rib 4k is identical to that of the sliding contact rib 4n. Thus, here, only the function of the sliding lib 4n will be described with reference to FIGS. 28 and 29.

Figure 28:
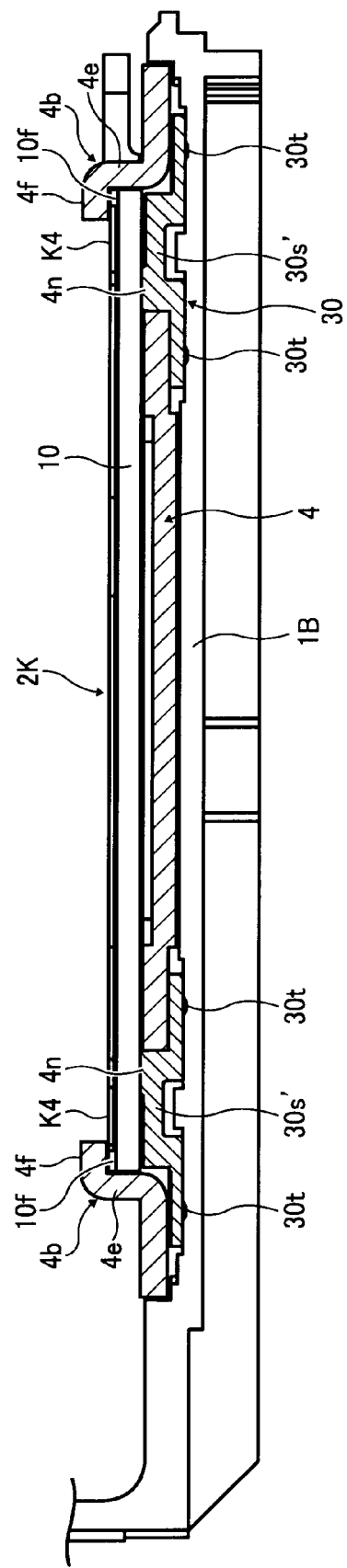
FIG. 28 is a view cross-sectionally showing in detail the engagement relationship of the unit rear wall reinforcing sheet metal member and the body rear wall reinforcing sheet metal member shown in FIG. 25.
Figure 29:
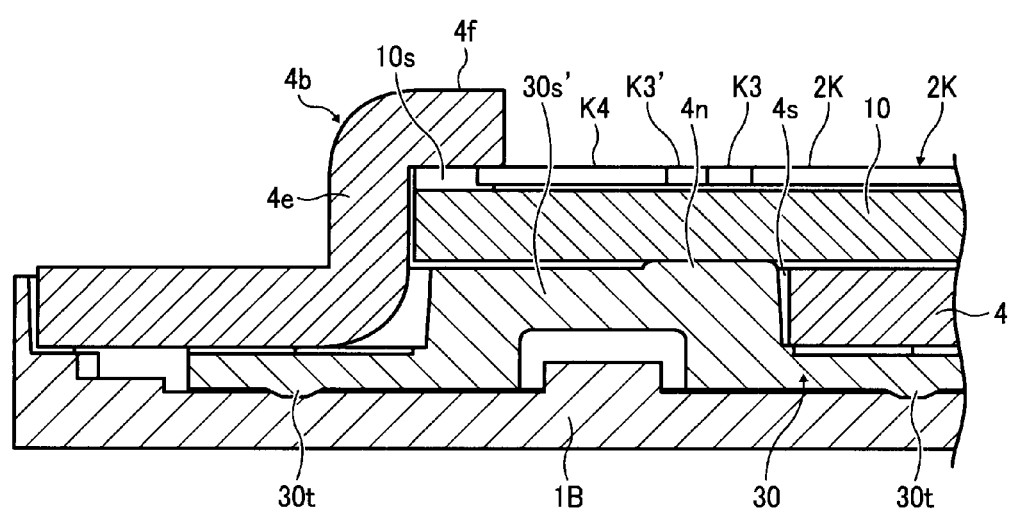
FIG. 29 is a partial enlarged cross-sectional view showing the engagement relationship of the unit rear wall reinforcing sheet metal member and the body rear wall reinforcing sheet metal member shown in FIG. 28.

If a configuration is such that the unit rear wall reinforcing sheet metal member 10 comes into direct contact with the body rear wall reinforcing sheet metal member 4 when the imaging unit 2 is attached to or detached from the camera body 1 by sliding the imaging unit 2 in a left-right direction, metallic sound is produced due to metal scraping of the body rear wall reinforcing sheet metal member 4 and the unit rear wall reinforcing sheet metal member 10. However, according to the embodiment, it is possible to prevent production of metallic sound due to metal scraping because the configuration is such that when the imaging unit 2 slides in a left-right direction with respect to the camera body 1, the unit rear wall reinforcing sheet metal member 10 slides in the left-right direction while being in sliding contact with the resin-made sliding contact rib 4n, as shown in FIGS. 28 and 29.

Alternatively, as a configuration of placing the resin plate 30 in the recess of the back wall section 1B, if the imaging unit 2 is pressed against the back wall section 1B, the resin plate 30 elastically deforms and rolls back due to a dimensional tolerance between the back wall section 1B and the resin plate 30, and so-called "clip-clop sound" is produced due to the roll-back of the resin plate 30. In the embodiment, however, since a configuration is such that multiple semicircular protrusions 30t are formed to absorb a dimensional tolerance between the back wall section 1B and the resin plate 30 at appropriate positions on a surface of the resin plate 30 on the side facing the back wall section 1B, as shown in FIGS. 25 to 29, the configuration avoids "clip-clop sound" due to the roll-back by preventing the roll-back and elastic deformation due to the dimensional tolerance.

The resin plate 30 may include the projected line escaping recess 4k'. The distance between the engagement claw 4b and the bottom wall 10p of the guiding groove 10q may be minified when the projected line part 10a' goes into the projected line escaping recess 4k' so that the unit rear wall reinforcing sheet metal member 10 slidably contacts the sliding contact rib 4k.

(Relationship Between Projected Line Parts 10a', 10a' and Projected Line Escaping Recess 4k')

Next, referring to FIG. 33G, L3 showing a length of which the projected line parts 10a', 10a' extend along the guide protrusions 4j, L2 showing a length between a right end portion of the projected line parts 10a', 10a' and the sliding contact rib 4k close to the sliding contact rib 4n in a state where the connection of the imaging unit connector section 11 and the camera-body connector section 12 is completed, and L1 showing a length between a position where the right edge 4b' of the engagement claw 4b crosses the inclined wall 10q and a position where the right edge 4b' of the engagement claw 4b abuts on the semicircular convex section 10s will be described.

FIG. 33G is an explanatory diagram showing a relative positional relationship of the unit rear wall reinforcing sheet metal member 10 to the camera-body rear wall reinforcing sheet metal member 4 in a state where the connection of the camera-body connector section 12 and the imaging unit connector section 11 is completed, and a perspective view in which the unit rear wall reinforcing sheet metal member 10 and the body rear wall reinforcing sheet metal member 4 are shown from the front face side of the imaging unit 2.

The projected line parts 10a', 10a', although the operating procedure thereof will be described later in detail, are provided for securing a space H which is a space between the inflected section 4f of the engagement claw 4b and the bottom wall 10p by abutting on the sliding contact rib 4k close to the sliding contact rib 4n shown in FIG. 33B when the imaging unit 2 is attached to the camera body 1 with the normal operating procedure, that is, when the imaging unit 2 is attached to the camera body 1 without allowing the inflected section 4h of the engagement protrusion 4g to contact with the constituting wall section 10h' of the engagement protrusion guiding hole 10h.

On the other hand, the projected line escaping recess 4k' is provided so that an outer surface of the unit rear wall reinforcing sheet metal member 10 abuts on the sliding contact rib 4k close to the sliding contact rib 4n while the cut and bent section 4i of the engagement protrusion 4g moves from a position where the cut and bent section 4*i* enters the guiding hole for the engagement protrusion cut and bent section 10*j* to a position where the cut and bent section 4*i* reaches the end and while the right edge 4*b'* of the engagement claw 4*b* moves from a position where the right edge 4*b'* crosses the inclined wall 10*qs* to a position where the right edge 4*b'* abuts on the semicircular convex section 10*s*.

Therefore, as shown in FIG. 33G, L2, that is, a length between a right end portion of the projected line parts 10*a'*, 10*a'* and the sliding contact rib 4*k* close to the sliding contact rib 4*n* in a state where the imaging unit connector section 11 is connected with the camera-body connector section 12 is necessary to be at least the same as or longer than a length as L1, that is, a length between a position where the right edge 4*b'* of the engagement claw 4*b* crosses the inclined wall 10*q* and a position where the right edge 4*b'* of the engagement claw 4*b* abuts on the semicircular convex section 10*s*.

If L2 is shorter than L1, when the imaging unit 2 is detached from the camera body 1, the right end portion of the projected line parts 10*a'*, 10*a'* run upon the sliding contact rib 4*k* close to the sliding contact rib 4*n* before an engagement of the engagement claw 4*b* with the engagement plate section 10*n* is released and before the engagement protrusion 4*g* is separated from the engagement protrusion cut and bent section 10*j*. Accordingly, either one or both of the unit rear wall reinforcing sheet metal member 10 and the engagement protrusion 4*g* may be destroyed.

L3, that is, the length of the projected line parts 10*a'*, 10*a'* are preferable to be as long as possible under a condition that L2 is the same as or longer than L1 to secure a sufficient range where the projected line parts 10*a'*, 10*a'* have contact with or abut on the sliding contact rib 4*k* close to the sliding contact rib 4*n* shown in FIG. 33B when the imaging unit 2 is set to the camera body 1.

(Circuit Configuration of Electrical Parts Incorporated in Camera Body 1 and Imaging Unit 2)

Now, electrical parts incorporated in the camera body 1 and imaging unit 2 will be described with reference to FIG. 30.

Figure 30:
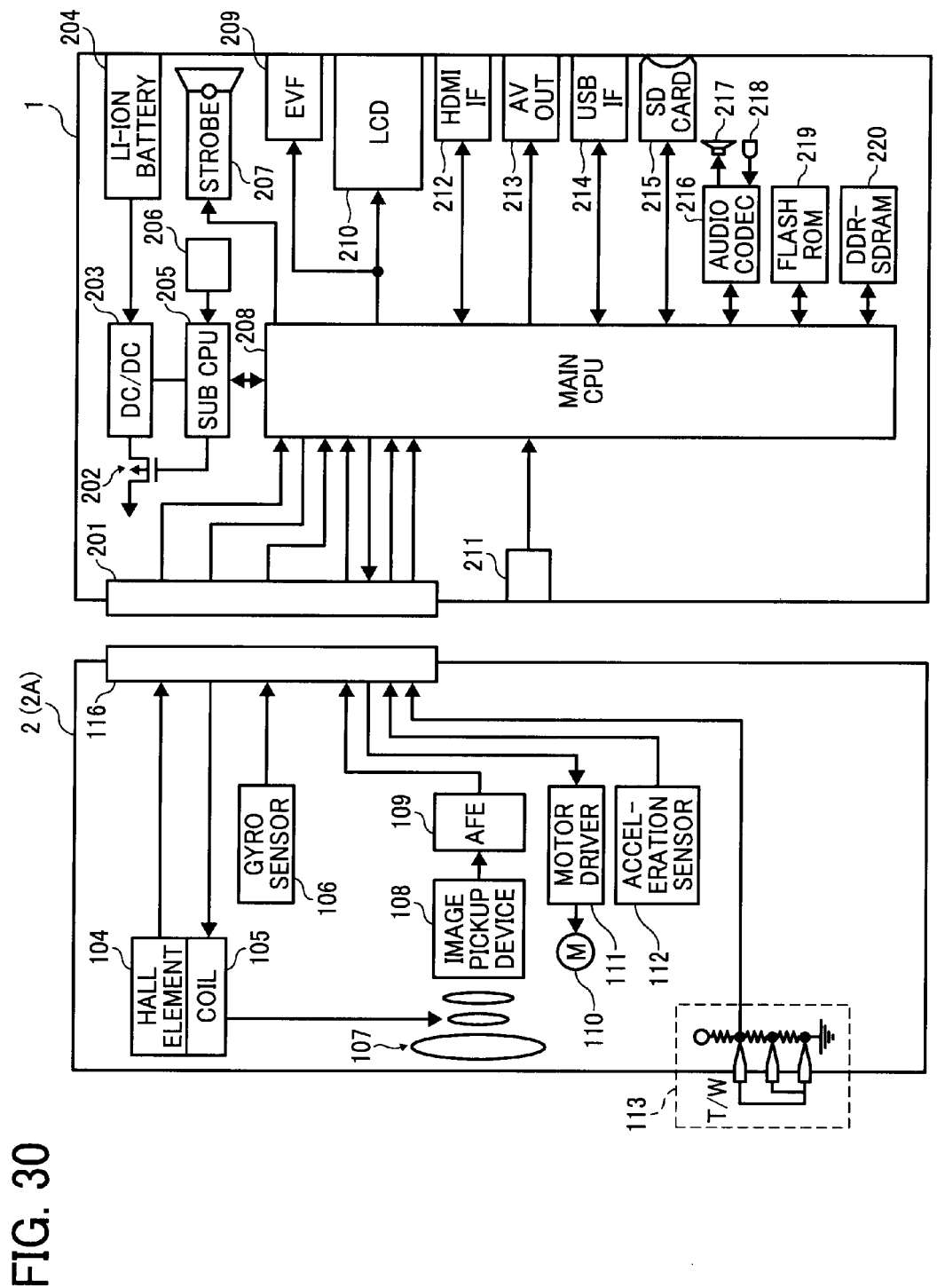
FIG. 30 is a circuit diagram showing one example of an electrical part built in the imaging apparatus shown in FIGS. 1 and 2.

As shown in FIG. 30, for example, in the camera body 1 provided are a lithium ion battery 204, a strobe light emitting section 207 (the popup type strobe device 5*x*), an electronic viewfinder device 209, a liquid crystal display device (LCD) 210 having a display surface 1*b* as a display section, a high-vision television connector interface (HDMIIF) 212, an audio-video (AVOUT) output terminal 213, an USB interface (USBIF) 214, an SD card interface (SD card) 215, an audio-codec circuit (Audio codec) 216, a speaker 217, a microphone 218, a flash ROM (Flash ROM) 219 as a recording medium which stores image data, a DDR-SDRAM 220, a main CPU 208 also functioning as a receiving section which receives image data, manipulation switches 206, 211 which give an imaging instruction, a sub-CPU (Sub CPU) 205 as an imaging instruction receiving section which receives an imaging instruction from the manipulation switch 206, a DC/DC power circuit 203, a switching element 202, and a connector terminal 201 (12*c*) of the camera-body connector section 12.

They constitute a part of electrical parts having publicly known functions which a digital camera is required to have as an imaging apparatus. The manipulating switch 206 is the release button 5*y*, for example, and the manipulating switch 211 is a manipulation key for manipulating the liquid crystal display (LCD) 210, for example, or the like. The liquid crystal display (LCD) 210 is provided on the back wall section 1B, for example. The manipulating switch 211 is provided at an appropriate position on the back wall section 1B.

In the housing 2A of the imaging unit 2 are provided an imaging lens unit 107 as an optical system, an image pickup device 108, an AFE circuit 109, a hall element (Hall element) 104, a driving coil (Coil) 105, a gyro sensor (Gyro sensor) 106, a motor driver (Motor Driver) 111, a drive motor (M) 110, an acceleration detection sensor 112, a Tele/Wide detection switch 113, and a connector terminal 116 (61) of the imaging unit connector section 11 which transmits image data.

These also constitute a part of included parts having the publicly known functions which a digital camera is required to have as an imaging apparatus. The imaging lens unit 107 includes multiple lenses, and a part of the multiple lens system is provided in the movable barrel 3*b*. In addition, in this embodiment, although the configuration is described as having the drive motor (M) 110 and the motor driver 111 provided in the imaging unit 2, a configuration may alternatively be such that they are provided in the camera body 1.

Here, power is supplied to the imaging unit 2 from the camera body 1. The hall element 104, the driving coil 105, and the gyro sensor 106, for example, constitute a part of the image stabilization mechanism. Signals of the image stabilization mechanism are inputted into the main CPU 208 by way of the connector terminals 116, 201, and the main CPU 208 performs image stabilization operation on the basis of these signals. The image stabilization operation is an operation to correct blurring of images projected on a light receiving surface of an image pickup device caused by hand movement.

For example, the operation may be to drive an image pickup device in a direction opposite to a direction of blurring detected by the gyro sensor 106 or to drive some optical devices of the image pickup lens unit 107 in a direction identical to the direction of blurring detected by the gyro sensor 106. A video signal of the image pickup device 108 is inputted into the main CPU 208 by way of the AFE circuit 109, subjected to predetermined image processing, and displayed on the liquid crystal display (LCD) 210 or the like.

Signals of the Tele/Wide detection switch 113 is inputted to the main CPU 208 by way of the connector terminals 106, 201, and the main CPU 208 controls the motor driver 111 and the drive motor 110 on the basis of the switch signals of the Tele/Wide detection switch 113 and the manipulating switch 211, and thereby drive controls the image pickup lens unit 107. Detection output of the acceleration detection sensor 112 is inputted to the main CPU 208 by way of the connector terminals 116, 202, and the main CPU 208 controls inclination of images to be displayed on the liquid crystal display (LCD) 210 based on detection output of the acceleration detection sensor 112.

Based on the detection output of the acceleration detection sensor 112, a degree of inclination of the imaging unit 2 to horizontality is displayed on the liquid crystal display (LCD) 210. The degree of inclination of the imaging unit 2 to horizontality may be expressed by a numeric value or an image.

When the manipulating switch 206 is manipulated, the imaging unit 2 captures a subject on the basis of an imaging instruction thereof and converts the subject image into image data. The connector terminal 116 transmits the image data to the main CPU 208.

Figure 31:
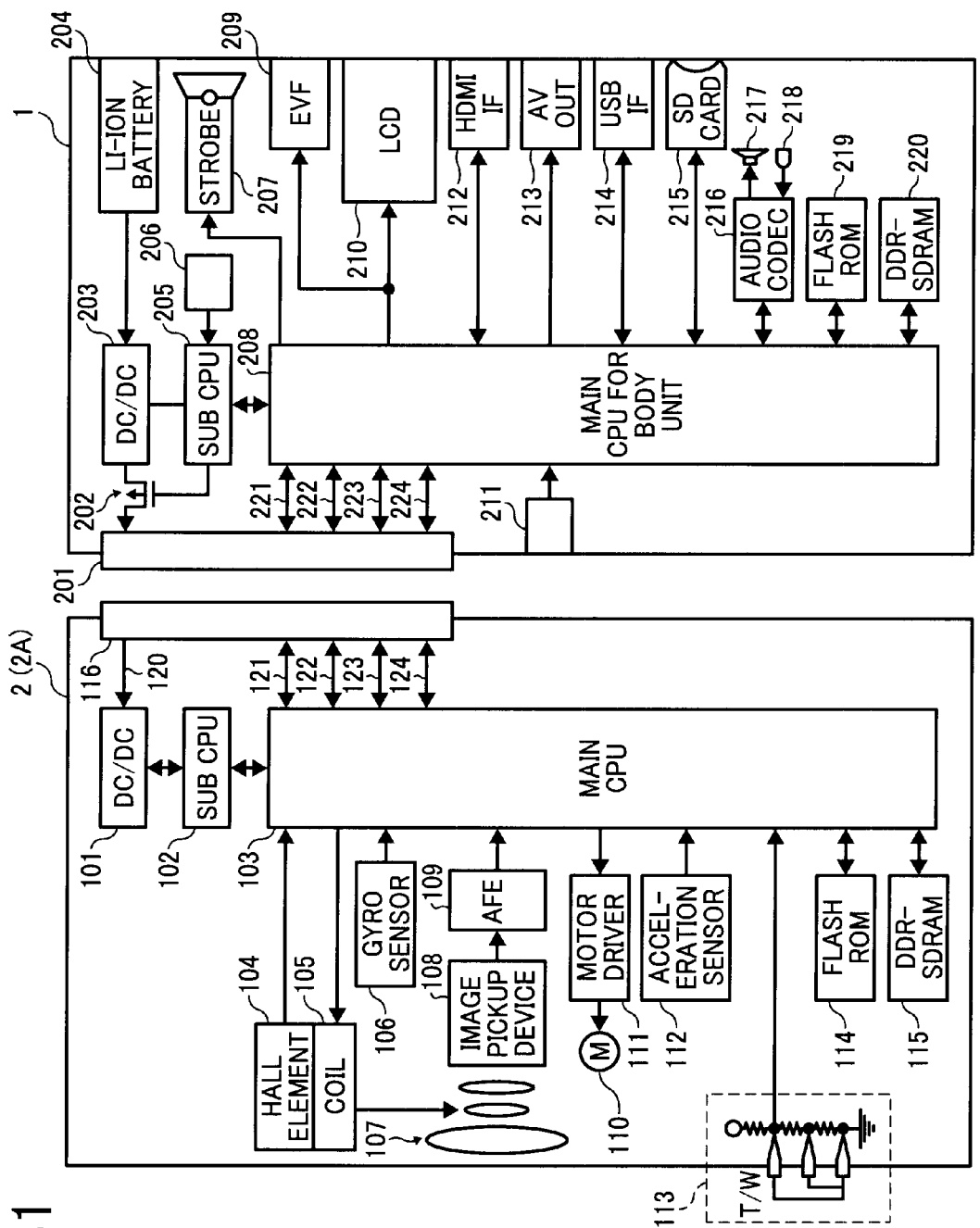
FIG. 31 is a circuit diagram showing another example of an electrical part built in the imaging apparatus shown in FIGS. 1 and 2.

As shown in FIG. 31, such a configuration can be adopted that a DC/DC power circuit 101, a sub CPU 102, a main CPU 103, a flash ROM 114, and a DDRSDRAM 115 are provided in the imaging unit 2, and after the main CPU 103 performs image processing, an image processing signal is transmitted to the main CPU 208 by way of the connector terminals 116, 201. Alternatively, such a configuration can be adopted that the main CPU 103 performs compression processing into a format such as JPEG or the like, and transmits compressed image data to the main CPU 208 by way of the connector terminals 116, 201.

Thus, the configuration in which the imaging unit 2 performs image processing or compression processing enables stable images with less noise to be transmitted to the main CPU 208 of the camera body 1. These electrical parts are arranged on an electrical base to be described later.

Thus, according to the embodiment of the present invention, as shown in FIGS. 1 and 2, imaging units 2 of different sizes can be attached to or detached from the same camera body 1. If a camera body 1 and an imaging unit 2 are configured so that when the imaging unit 2 is attached to the camera body 1, a lower surface of the housing 2A of the imaging unit 2 is flush with that of the camera body 1, handling of the camera body 1 to which the imaging unit 2 is attached will be easier.

Furthermore, if a configuration is such that whenever an imaging unit 2 of a different size is attached to the camera body 1, a lower surface of the imaging unit 2 is flush with that of the camera body 1, handling of the camera body 1 will be easier irrespective of whatever size of the imaging unit is attached.

Since the recess 1A of the camera body 1 is open to three directions (right, down, forward) and the restriction on the size of an imaging unit 2 to the camera body 1 is eased, a large-size high-sensitive image pickup device or a small-size image pickup device can be placed in the imaging unit 2 according to a customer's need, and an imaging unit 2 whose size differs in the right, left, up, down, forward and backward directions can be attached to or detached from a common camera body 1. In addition, as freedom in size of the lens barrel 3 of the imaging unit 2 has been increased, the imaging unit can be offered as an interchangeable lens group unit of a variety of lenses from a single-focus lens to a high-power zoom lens. Therefore, customers purchase only an image pickup lens 2 and will upgrade it as the image pickup device 108 progresses.

Since the recess 1A of the camera body 1 is opened to the two directions of the right and down directions, an imaging unit 2 having different sizes in a left-right direction and an up-down direction can be attached. Thus, as the restriction on the size of the imaging unit 2 to the camera body 1 has been eased, a large-size high-sensitive image pickup device or a small-size image pickup device can be placed in the imaging unit 2 according to a customer's need, and imaging units 2 of different sizes having different lens barrels 3 or image pickup devices can be attached to or detached from a common camera body 1. In addition, as freedom in size of the lens barrel 3 of the imaging unit 2 has been increased, the imaging unit 2 can be offered as an interchangeable lens group unit of a variety of lenses from a single-focus lens to a high-power zoom lens. Therefore, customers purchase only an image pickup lens 2 and will upgrade it as the image pickup device 108 progresses.

According to the embodiment of the present invention, as stated above, it is possible to attach to or detach from the same camera body multiple imaging units 2 which have lens barrels 3 or image pickup devices of different sizes and which have different sizes of housings placed in the recess. The lens barrel 3 of the imaging unit 2 shown in FIG. 2 is longer and has larger optical system than the lens barrel 3 of the imaging unit 2 shown in FIG. 1. It is also desirable to configure the camera body 1 and the imaging unit 2 so that the lower surface 2e of the housing 2A of the imaging unit 2 is flush with that of the camera body 1 when the imaging unit 2 is attached to the camera body 1.

That is to say, here, as the recess 1A of the camera body 1 is opened to three directions, and as the restriction on the size of the imaging unit 2 to the camera body 1 has been eased, a large-size high-sensitive image pickup device 108 or a small-size image pickup device 108 can be placed in the imaging unit 2 according to a customer's need, and imaging units 2 with different lens barrels 3 or image pickup devices 108 can be attached to or detached from a common camera body 1.

In addition, as freedom in size of the lens barrel 3 of the imaging unit 2 has been increased, the imaging unit 2 can be offered as an interchangeable lens group unit of a variety of lenses from a single-focus lens to a high-power zoom lens. Therefore, customers purchase only an image pickup lens 2 and will upgrade it as the image pickup device 108 progresses. In addition, when a bay connector is used for both connector sections 11, 12, image data can be transferred in a short time.

In addition, there were restrictions on the size of an image pickup device 108, the distance between a lens mount and an image pickup device 108 in an optical axis direction (flange back), a diameter of a lens mount or the like in a conventional standard for a lens mount for an interchangeable lens (Four Thirds System or the like, for example). Due to the restrictions, there was a limit on slimming/downsizing as an entire camera.

In contrast, in the present invention, the size of an image pickup device 108, the distance between an optical system and the image pickup device 108 in an optical axis direction, a diameter of a lens barrel (a lens barrel 3 or a movable barrel 3b) can be freely set for each imaging unit. Depending on an application of each imaging unit 2, a variety of optical systems and various types/sizes of image pickup devices 108 (types: CMOS, CCD or the like. Sizes: ASP-C, ⅔-inch type, 1/2.33 type or the like) can be freely combined.

In addition, when slimming/downsizing of an entire camera is performed, an entire size of an imaging unit can be reduced since length of an optical axis direction of the imaging unit 2 can be shortened and a diameter of a lens barrel (a lens barrel 3 or a movable barrel 3b) can be reduced.

On the other hand, a larger-size image pickup device 108 and a larger optical system can be combined to improve imaging performance of a camera, thereby being able to improve various imaging capabilities. Also in this case, since a degree of freedom in a combination of an optical system and an image pickup device 108 is high and optimum designing is possible by combining an optical system and an image pickup device 108, an entire size of the imaging unit can be reduced while improving the imaging performance. It is also possible to combine a large optical system with a small image pickup device 108 or a small optical system with a large image pickup device 108, depending on applications.

Furthermore, since an imaging unit 2 which has been slimmed and downsized as an entire camera and an imaging unit 2 which has improved imaging performance of the camera can be attached to or detached from the same camera body 1, the entire imaging system including a camera having various characteristics can be slimmed and downsized. That is to say, according to the present invention, a digital camera (imaging device) itself and an entire imaging system can be downsized, thereby improving portability.

In addition, since a 68-pin bay connector is used for both connector sections 11, 12 which perform communications between the camera body 1 and the imaging unit 2, transfer of large volume image data can be performed in a short time. Alternatively, in order to perform communications between a camera body 1 and an imaging unit 2, other methods including a wireless communication system, an optical communication system, a contact communication system which performs communications by abutting instead of fitting may be used.

In addition, both connector sections 11, 12 supply power to the imaging unit 2 from the camera body 1 (see FIG. 31). In the embodiment, since both connector sections 11, 12 perform communications as well as power supply, failures are less likely to occur when pulling out or inserting the connectors. However, a configuration may be such that a connector for communications and a connector for power supply are separately provided.

(Procedure for Attaching Imaging Unit 2 to Camera Body 1)

Figure 32:
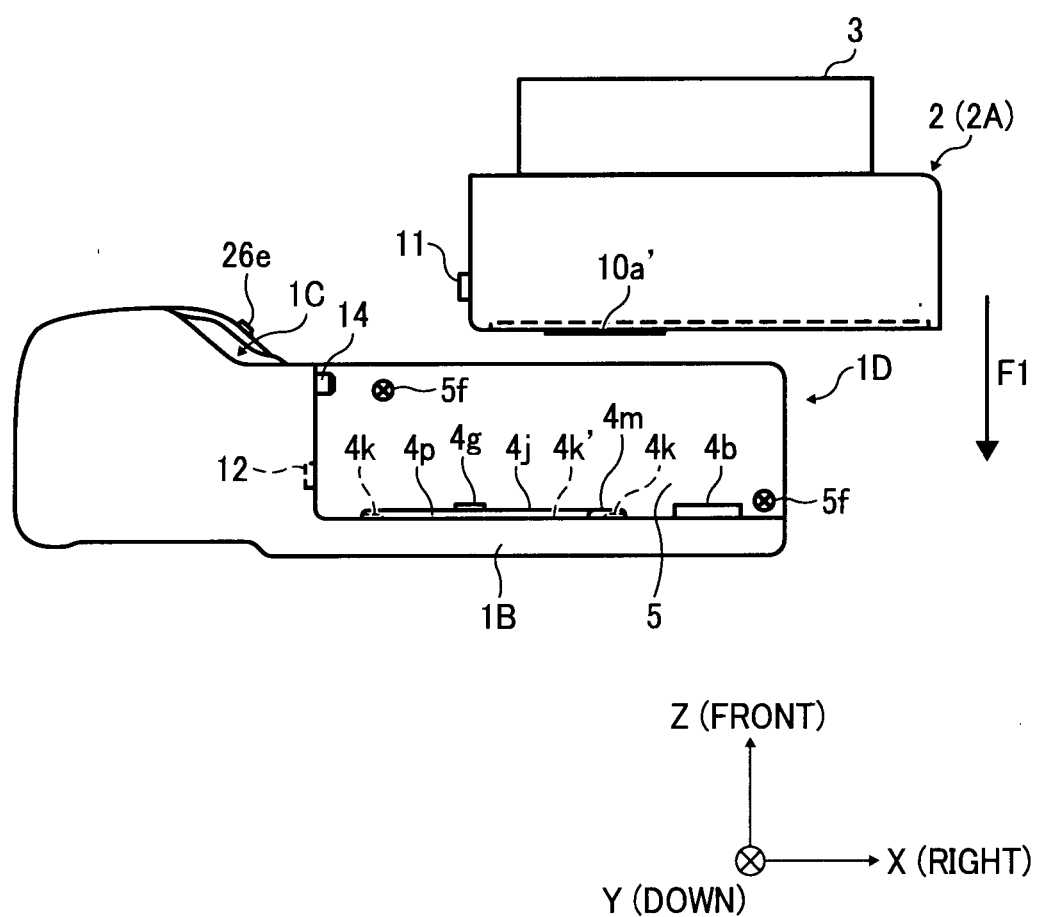
FIG. 32 is a view for explaining how the imaging unit is attached to the camera body shown in FIG. 4.

Procedure for attaching an imaging unit 2 to a camera body 1 is generally described. In FIG. 32, the imaging unit 2 is set to a rear part 1B of the camera body 1 by being moved to a negative side direction of the Z direction. Then, a camera-body connector section 12 and an imaging unit connector section 11 are fitted by the imaging unit 2 being moved to a negative direction (left direction) of the X direction.

An engagement protrusion (angle controlling member) 4g is positioned between the side wall section 1C and a biasing section when it is viewed in a left-right direction (XY direction) in this state.

In addition, in the imaging unit 2, in a state where the camera-body connector section 12 and the imaging unit connector section 11 are engaged with each other, when the imaging unit 2 is moved to a positive direction (right direction) in the X direction with respect to the camera body 1, the camera-body connector section 12 and the imaging unit connector section 11 are disengaged.

Therefore, a direction in which the imaging unit 2 is attached to or detached from the side surface wall of the side wall section 1C of the camera body 1 is the X direction (left-right direction).

Next, the normal operating procedure for setting the imaging unit 2 to the camera body 1 will be described in detail.

In the embodiment of the present invention, a user of the camera holds the imaging unit 2 with his/her hand and sets a position of the imaging unit 2 in relative relation to a position of the camera body 1 such that the unit rear wall reinforcing sheet metal member 10 faces the body rear wall reinforcing sheet metal member 4 provided on the back wall section 1B of the camera body 1 from above and that the engagement protrusion 4g faces the proximity of the open edge constituting wall section 10h" of the engagement protrusion guiding hole 10h.

Then, the camera user sets the imaging unit 2 to the camera body 1 by sliding the imaging unit 2 toward the side wall section 1C of the camera body 1 while moving the peripheral edges 10a, 10a of the unit rear wall reinforcing sheet metal member 10 along the guide surfaces 4p, 4p of the guiding protrusions 4j, 4j in a state where the unit rear wall reinforcing sheet metal member 10 faces the body rear wall reinforcing sheet metal member 4 parallel to each other. This is the normal operating procedure.

That is to say, the camera body 1 is horizontally set such that the back wall section 1B of the camera body 1 is disposed at a bottom side. For example, the camera body 1 may be horizontally set by being placed on a left hand of the user. Then, the user makes the imaging unit 2 approach the camera body 1 along an arrow F1 direction as shown in FIG. 32 (front to rear direction or top to bottom direction in FIG. 32) to allow the engagement protrusion 4g to face the insertion opening 10i close to the open edge constituting wall section 10h" and to allow the guide protrusion 4j, the rectangular protrusion 4m and the engagement claw 4b to face the guiding groove 10q, as shown in FIGS. 33A, 33B, 33C. At the same time, the peripheral edges 10a, 10a of the unit rear wall reinforcing sheet metal member 10 are contacted with the guide surfaces 4p, 4p of the guiding protrusion 4j.

At this time, since the projected line parts 10a', 10a' formed on the peripheral edges 10a, 10a of the unit rear wall reinforcing sheet metal member 10 contact with or abut on the sliding contact rib 4k close to the sliding contact rib 4n, as shown in FIG. 33B, the space H which is a space between the inflected section 4f of the engagement claw 4b and the bottom wall 10p is secured.

If the projected line parts 10a', 10a' are not formed on the peripheral edges 10a, 10a of the unit rear wall reinforcing sheet metal member 10, the space H which is a space between the inflected section 4f of the engagement claw 4b and the bottom wall 10p is smaller than that in the case where the projected line parts 10a', 10a' are formed. Therefore, if the imaging unit 2 is inclined to the camera body 1 because of the attaching or detaching operation by the camera user and the inflected section 4f of the engagement claw 4b vigorously hits the bottom wall 10p, the space H is not secured so that the bottom wall 10p is damaged by the engagement claw 4b. Therefore, the quality level of operating attaching and detaching the imaging unit 2 and the camera body 1 may be degraded.

However, in the embodiment of the present invention, the projected line parts 10a', 10a' are formed on the peripheral edges 10a, 10a of the unit rear wall reinforcing sheet metal member 10. Therefore, at the attaching and detaching operation, the space H which is a space between the inflected section 4f of the engagement claw 4b and the bottom wall 10p is secured so that it is possible to prevent the bottom wall 10p from being destroyed even when the imaging unit 2 is inclined to the camera body 1 because of the attaching or detaching operation by the camera user.

Specifically, if a depth of the guiding groove 10q of the rear part 2b is made shallower in order to increase the space inside the housing 2A without thickening the entire thickness (thickness in the Z direction) of the housing 2A, it is possible to prevent the bottom wall 10p from being damaged at the attaching and detaching of the imaging unit 2 and the camera body 1.

When the imaging unit 2 is moved in an arrow F2 direction shown in FIGS. 33A and 33B, the peripheral edges 10a, 10a of the unit rear wall reinforcing sheet metal member 10 slidably abut on the guide surfaces 4p, 4p of the guiding protrusion 4j in a state where the projected line parts 10a', 10a' are contacted with the sliding contact rib 4k close to the sliding contact rib 4n. At the same time, the engagement protrusion 4g is guided from the insertion opening 10i close to the open edge constituting wall section 10h" to the guiding hole for engagement protrusion cut and bent section 10j which exists at the bottom part of the insertion opening 10i.

As shown in FIG. 33D, when the edge 4gs of the engagement protrusion 4g reaches a position close to the inclined wall 10ij, the right edge 4b' of the engagement claws 4b reaches a position close to the inclined wall 10qs of the unit rear wall reinforcing sheet metal member 10. Then, as shown in FIGS. 33D and 33E, the projected line parts 10a', 10a' enter the projected line escaping recess 4k'. Because of this, the outer surface of the unit rear wall reinforcing sheet metal member 10 contacts the sliding contact rib 4n and the sliding contact rib 4k close to the sliding contact rib 4n.

Further, the inflected section 4f of the engagement claw 4b comes close to the bottom wall 10p of the guiding groove 10q, and the inflected section 4h of the engagement protrusion 4g comes close to the bottom wall of the engagement protrusion guiding groove 2s. Then, the unit rear wall reinforcing sheet metal member 10 is capable of being inserted between the body rear wall reinforcing sheet metal member 4 and each of the inflected sections 4f and the inflected section 4h.

In addition, the left end portion and the right end portion in a direction where the projected line parts 10a', 10a' extend are inclined. Correspondingly, a part between the sliding contact rib 4k and the projected line escaping recess 4k' is also inclined so that the projected line parts 10a', 10a' smoothly enter the projected line escaping recess 4k' and escape from the projected line escaping recess 4k'.

FIG. 33F is an explanatory diagram showing in detail an intermediate state between states shown in FIGS. 33A and 33D, and the intermediate state is a state where the engagement protrusion 4g is positioned at the insertion opening 10i. FIG. 33F shows a relationship between the engagement protrusion 4g of the body rear wall reinforcing sheet metal member 4 and the insertion opening 10i of the unit rear wall reinforcing sheet metal member 10 including the other configuration parts. FIG. 33A shows the state where the engagement protrusion 4g of the body rear wall reinforcing sheet metal member 4 faces the proximity of the insertion opening 10i of the open edge constituting wall section 10h" of the unit rear wall reinforcing sheet metal member 10. FIG. 33D shows the state where the edge 4gs of the engagement protrusion 4g of the body rear wall reinforcing sheet metal member 4 is at the proximity of a position of the inclined wall 10ij of the unit rear wall reinforcing sheet metal member 10. Also in the state shown in FIG. 33F, the projected line parts 10a', 10a' contact with or abut on the sliding contact rib 4k close to the sliding contact rib 4n.

Therefore, the imaging unit 2 may also be attached to the camera body 1 by sliding the imaging unit 2 toward the side wall section 1C of the camera body 1 not with the state shown in FIG. 33A where the position of the imaging unit 2 is set in relative relation to the camera body 1 such that the engagement protrusion 4g faces the proximity of the open edge constituting wall section 10h" of the engagement protrusion guiding hole 10h, but with the state shown in FIG. 33F where the position of the imaging unit 2 is set in relative relation to the camera body 1 such that the engagement protrusion 4g faces the intermediate position of the insertion opening 10i in an up-down direction, and then the body rear wall reinforcing sheet metal member 4 and the unit rear wall reinforcing sheet metal member 10 face parallel each other in a state where the peripheral edges 10a, 10a of the unit rear wall reinforcing sheet metal member 10 move along the guide surfaces 4p, 4p of the guiding protrusions 4j, 4j, and not in the state shown in FIG. 33A where the position of the imaging unit 2 is set in relative relation to the camera body 1 such that the engagement protrusion 4g faces the proximity of the open edge constituting wall section 10h" of the engagement protrusion guiding hole 10h. This operating procedure is also the normal operating procedure.

After the edge 4gs of the engagement protrusion 4g, as shown in FIG. 33D, reaches the position of the proximity of the inclined wall 10ij and the right edge 4b' of the engagement claws 4b reaches a position of the proximity of the inclined wall 10qs of the unit rear wall reinforcing sheet metal member 10, the imaging unit 2 is further moved in the arrow F2 direction as shown in FIGS. 33D and 33E, and then the cut and bent section 4e of the engagement claw 4b is guided along the guiding hole for engagement claw cut and bent section 10r in a state where the outer surface of the unit rear wall reinforcing sheet metal member 10 is contacted with the sliding contact rib 4 and the sliding contact rib 4k close to the sliding contact rib 4n, and at the same time, the cut and bent section 4i of the engagement protrusion 4g is guided along the guiding hole for engagement protrusion cut and bent section 10j. Further, the inflected section 4f of the engagement claw 4b faces the inner surface of the engagement plate section 10n, and the inflected section 4h of the engagement protrusion 4g faces the inner surface of the constitution wall section of the guiding hole for engagement protrusion cut and bent section 10j of the unit rear wall reinforcing sheet metal member 10.

When the engagement claw 4b is guided along an inclined wall 10qs of the engagement plate section 10n, the engagement claw 4b elastically deforms a plate spring 2k, and the unit rear wall reinforcing sheet metal member 10 is pressed against the back wall section 1B due to the elastic deformation force applied to the plate spring 2k. This absorbs rattling due to a dimensional error between the imaging unit 2 and the camera body 1.

In addition, as the imaging unit 2 is guided to the side wall section 1C, while a outer surface of the unit rear wall reinforcing sheet metal member 10 slides the resin-made sliding contact ribs 4k, 4n, and while the marginal edges 10a, 10a of the unit rear wall reinforcing sheet metal member 10 are in sliding contact with the guiding surfaces 4p, 4p, metallic scraping sound caused by scraping of the unit rear wall reinforcing sheet metal member 10 and the body rear wall reinforcing sheet metal member 4 is also avoided.

Fitting of an auxiliary fitting protrusion 14 and an auxiliary fitting hole 22 is started almost at the same time when the engagement claw 4b comes into contact with the plate spring 2k, and the auxiliary fitting protrusion 14 and the auxiliary fitting hole 22 roughly perform control of a position of the imaging unit connector section 11 with respect to the camera-body connector section 12.

Then, the camera-body connector section 12 and the imaging unit connector section 11 are fitted into each other, as shown in FIG. 22, and the camera body 1 and the imaging unit 2 are electrically connected so that they can communicate.

A Main CPU 208 of the camera body 1 monitors whether a predetermined pin of the camera-body connector section 12 (camera-body connection detection pin) is connected or not. When it detects that the camera-body connection detection pin is connected with an imaging unit connection detection pin, communications and power transmission between the camera-body connector section 12 and the image pickup side connector section 11 start.

Alternatively, a configuration can be such that when the main CPU detects that the connection detection pin is connected, it immediately starts communications and power transmission between the camera-body connector section 12 and the imaging unit connector section 11.

Alternatively, a configuration can be such that when the main CPU detects that the connection detection pin is connected, it starts communications and power transmission between the camera-body connector section 12 and the imaging unit connector section 11 after predetermined time elapses. That is to say, a connection of the imaging unit connector section 11 and the camera-body connector section 12 only has to establish a condition in which communication is possible, and it is not necessary to perform communications upon connection.

In addition, since a shock absorbing member 22a is provided on the bottom of the auxiliary fitting hole 22, shock due to collision of the camera body 1 and the imaging unit 2 is alleviated when the auxiliary fitting protrusion 14 and the auxiliary fitting hole 22 are fitted. In addition, the auxiliary fitting protrusion 14 and the auxiliary fitting hole 22 can further mitigate rattling of the imaging unit 2 to the camera body 1 in a front-back direction.

When a connection of the camera-body connector section 12 and the imaging unit connector section 11 is completed, as shown in FIGS. 24 to 29, the inflected section 4f of the engagement claw 4b abuts on the semicircular convex sections 10s, 10s while being subjected to elastic biasing force of the plate spring 2k.

In addition, when the inflected section 4f of the engagement claw 4b abuts on the semicircular convex sections 10s, 10s, as shown in FIGS. 33G and 33H, the engagement protrusion 4g is positioned at the end edge of the guiding hole for engagement protrusion cut and bent section 10j.

In addition, an inclined wall 20e of a to-be-locked claw 20d shown in FIG. 14 abuts on the inclined wall 25c' of a locking claw 25c almost at the same time as when the auxiliary fitting protrusion 14 and the auxiliary fitting hole 22 are fitted and immediately before a positioning protrusion 12a and a positioning hole 63 are fitted. When component force generated in an inclined wall 25c' by the abutting exceeds turning and biasing force of the locking plate 25 by the biasing member (not shown), the locking plate 25 is turned with a spindle 27 as a supporting point in a direction opposite to a direction in which the turning and biasing force acts (an arrow F3 direction in FIG. 14).

Then, when the to-be-locked claw 20d climbs over the locking claw 25c, the locking plate 25 returns to its original position by turning and biasing force. As a result, the locking claw 25c enters a notch 20c and the to-be-locked claw 20d enters a notch 25b. Accordingly, the locking claw 25c and the to-be-locked claw 20d are engaged with each other, and the imaging unit 2 is locked to the camera body 1 in a left-right direction. By the locking claw 25c as a locking member and the to-be-locked claw 20d as a to-be-locked member, rattling of the camera body 1 and the imaging unit 2 in the left-right direction is restricted.

In the embodiment, the paired engagement claws 4b, 4b reliably engages the engagement plate section 10n, 10n with the imaging unit 2 locked to the camera body 1. Since the pickup engagement plate sections 10n, 10n are formed in a left-right direction at positions far from the paired auxiliary fitting protrusions 14, 14 formed on the side wall section 1C, force resulting from pullout when the imaging unit 2 is pulled out to the front side from the camera body 1 is dispersed, and the pullout is reliably inhibited. In addition, application to both connector sections 11, 12 of unreasonable force involved in the pull-out can be inhibited.

In addition, even when a user tries to hold a right lower marginal section by hand and to forcibly pull it out to a lower right direction, the auxiliary fitting protrusions 14, 14, the auxiliary engagement claws 4b, 4b, and the locking mechanism 24 prevents the pull-out and prevents application of unreasonable force involved in the pull-out to both connector sections 11, 12.

Furthermore, as one action of moving the imaging unit 2 to the side wall section 1C almost simultaneously completes mechanical fixing of the camera body 1 and the imaging unit 2 by the locking mechanism 24 and electrical connection of both connector sections 11, 12, an operation of attaching the imaging unit 2 to the camera body 1 can be performed easily in a short time.

Additionally, timing to fit both connector sections 11, 12 may differ from timing to start communications and power transmission/receipt of both connector sections 11, 12, independently of the camera-body connection detection pin of the camera body 1.

For example, a configuration may be such that a manipulating section (not shown) which instructs start/end of communications and power transmission/receipt by both connectors 11, 12 may be provided in the camera body 1, and both connectors 11, 12 starts/ends the communications and power transmission/receipt depending on manipulation of the manipulating section.

Alternatively, a configuration may be such that a lock state detection section which detects a position of the locking plate 25 is provided, and after the lock state detection section detects that the imaging unit 2 is locked in a predetermined position of the locking plate 25, both connectors 11, 12 start/end communications and power transmission and receipt.

Figure 34:
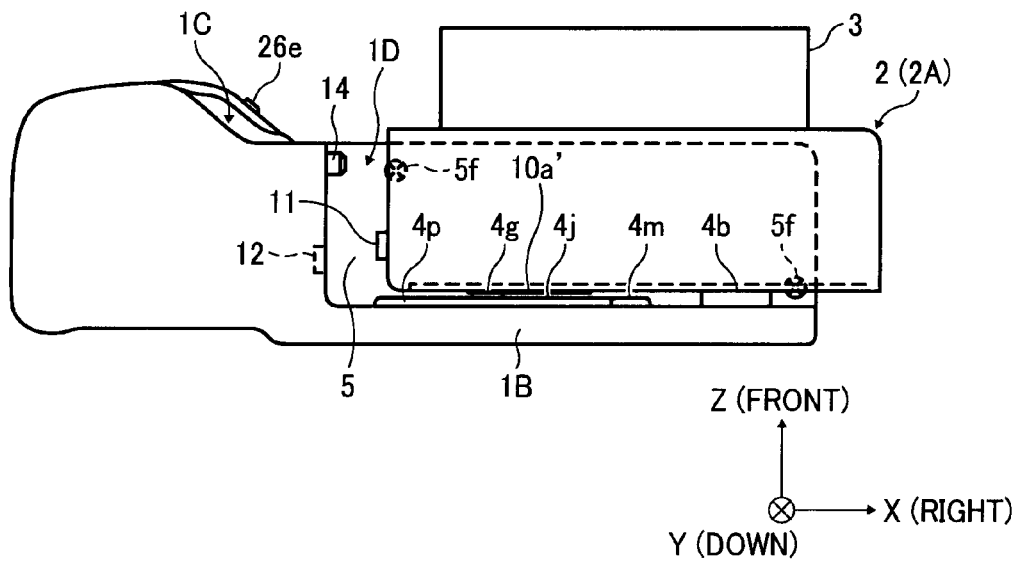
FIG. 34 is an explanatory diagram showing a state where a connection of the imaging unit connector section and the camera-body connector section is prevented by the engagement protrusions shown in FIG. 33 abutting on a constituting wall section shown in FIG. 33 and by an engaging member abutting on an engagement plate section.

In the embodiment of the present invention, when the attaching was not performed with the normal attaching operation procedure, that is, since inflected sections 4h abut on an outer surface of the constituting wall section 10h' from the outside of the imaging unit 2 when inflected sections 4f of the paired engagement claws 4b abut on an outer surface of the engagement plate sections 10n from the outside of the imaging unit 2 (inflected sections 4f run on the engagement plate sections 10n), as shown in FIG. 34, for example, imaging unit 2 floats parallel to the body rear wall reinforcing sheet metal member 4 of the back wall section 1B and prevents the imaging unit 2 from tilting to the camera body 1, thereby preventing a connection of the camera-body connector section 12 and the imaging unit connector section 11 with the imaging unit 2 at a tilt.

In addition, in the embodiment, as a positional relationship of the auxiliary fitting protrusion 14 and the auxiliary fitting holes 22 is offset, prevention of a mutual connection of both connector sections 11, 12 can be secured. Consequently, destruction of both connector sections 11, 12 is securely prevented.

That is to say, the engagement protrusion 4g functions as an unnatural posture and angle avoidance member (angle controlling member) to prevent the imaging unit 2 from being connected to the camera body 1 at an unnatural posture and angle, when the imaging unit 2 is placed in the recess 1A and attached to or detached from the camera body 1, and a connection of the imaging unit connector section 11 and the camera-body connector section 12 is made.

The engagement protrusion 4g also serves a function to prevent an opening section 52 formed on the side wall section 1C of the camera body 1 and a connector cover section 59 as a fitting protrusion of the imaging unit 2 from being obliquely fitted.

In short, the angle controlling member (controlling member) prevents the imaging unit connector section 11 and the camera-body connector section 12 from being connected at an unnatural posture and angle. When the controlling member is inserted into an insertion opening 10i, the rear of the imaging unit 2 and the back wall section 1B of the camera body 1 abut on each other in parallel, and the imaging unit connector section 11 and the camera-body connector section 12 are connected as the imaging unit 2 moves in a direction to the side wall section 1C.

In addition, when the controlling member abuts on a controlling member abutting section (constituting wall section 10h'), the rear of the imaging unit 2 and the back wall section 1B of the camera body 1 do not abut on each other in parallel, and the imaging unit connector section 11 and the camera-body connector section 12 are not connected.

In addition, the angle controlling member can prevent the imaging unit connector section 11 and the camera-body connector section 12 from being connected at an unnatural posture and angle, irrespective of presence of a biasing section.

In addition, in the embodiment, since in the camera body 1, a biasing section which biases the imaging unit 2 to the back wall section 1B of the camera body 1 is provided with the imaging unit 2 attached to the camera body 1, a trouble that the image pickup body 2 is attached to the camera body 1 at an unnatural angle may occur. In the embodiment, as the angle controlling member is provided, it can securely prevent inconvenience of the imaging unit 2 being attached to the camera body 1 at unnatural angle and posture.

When the height from a back wall surface of the back wall section 1B to the inflected section 4*h* of the engagement protrusion (angle controlling member) is the same as or greater than that from the back wall surface of the back wall section 1B to the inflected section 4*f* of the engagement claw 4*b*, a connection of the imaging unit 2 to the camera body 1 at an unnatural posture and angle can be prevented.

On the other hand, when the height from the back wall surface of the back wall section 1B to the inflected section 4*h* of the engagement protrusion 4*g* (angle controlling member) is lowered, the engagement protrusion guiding hole 10*h* corresponding to the engagement protrusion 4*g* can be formed shallow, and thus the imaging unit 2 can be downsized.

Thus, the engagement protrusion (angle controlling member) 4*g* is placed closer to the camera-body connector section 12, namely, closer to the side wall section 1C than to the biasing section. If the engagement protrusion 4*g* (angle controlling member) is thus placed closer to the camera-body connector section 12, even when the height of the engagement protrusion 4*g* is lower than that of the engagement claw 4*b*, not only the inflected sections 4*f* of the paired engagement claws 4*b* abut on the engagement plate section 10*n*, but also a tilt angle of the imaging unit 2 to the camera body 1 when the inflected section 4*h* abuts on the constituting wall section 10*h*' can be reduced. That is to say, since the imaging unit 2 can be made closer in parallel to the body rear wall reinforcing sheet metal member 4 of the back wall section 1B, a connection of the imaging unit 2 to the camera body 1 at an unnatural posture and angle can be prevented even when height of the engagement protrusion (angle controlling member) 4*g* is lowered.

(Procedure for Removing Imaging Unit 2 from Camera Body 1)

Now, a procedure for removing the imaging unit 2 from the camera body 1 will be described.

The unlock button 26*d* is manipulated to the right direction (F4 direction in FIG. 4) when the imaging unit 2 is viewed from the front face with the imaging unit 2 placed in the recess 1A. This turns the unlocking manipulating member 26 to an opposite direction (opposite direction to F3 in FIG. 14) to turning and biasing force of the unlocking spring 28 with the spindle 27 as a supporting point.

Then, the releasing protrusion 26*b* abuts on the side surface 25*f* of the locking plate 25. By turning the releasing protrusion 26*b* to an opposite direction (opposite direction to F3 in FIG. 14) to the turning and biasing force of the unlocking spring 28, the locking plate 25 is turned in a direction (backward) in which it retreats from the notch 20*c* with the spindle 27 as a supporting point. This releases engagement of the locking claw 25*c* and the to-be-locked claw 20*d*.

That is to say, locking of the imaging unit 2 to the camera body 1 is released. In this state, the imaging unit 2 is moved away from the camera body 1 from the left to right direction (arrow F5 direction in FIGS. 1, 2, and 33G). Then, not only engagement of the both connector sections 11, 12 is released but also fitting of the auxiliary fitting protrusion 14 and the auxiliary fitting hole 22 is released.

Further, when the imaging unit 2 is moved away from the camera body 1 in the left to right direction, the unit rear wall reinforcing sheet metal member 10 moves from the left to right in a state where the outer surface of the unit rear wall reinforcing sheet metal member 10 is contacted with the resin-made sliding contact ribs 4*k*, 4*k*, 4*n* and in a state where the projected line parts 10*a*', 10*a*' are guided to the projected line escaping recesses 4*k*', 4*k*'. Thereby, as shown in FIG. 33D, the right end portion of the projected line parts 10*a*', 10*a*' reach a position just before the sliding contact rib 4*k* of the right side.

At this time, as shown in FIG. 33D, the edge 4*gs* of the engagement protrusion 4*g* reaches a position where the edge 4*gs* separates from the inclined wall 10*ij* or a position just before the edge 4*gs* separates from the inclined wall 10*ij*. At the same time, the right edge 4*b*' of the engagement claws 4*b* reaches a position where the right edge 4*b*' separates from the inclined wall 10*qs* or a position just before the right edge 4*b*' separates from the inclined wall 10*qs*.

That is to say, a state where the engagement protrusion 4*g* separates from the guiding hole for engagement protrusion cut and bent section 10*j* and the engagement claw 4*b* separates from the paired guiding hole for engagement claw cut and bent section 10*r* is formed.

When the imaging unit 2 is continuously moved away from the camera body 1 in the left to right direction, as shown in FIGS. 33A and 33F, the projected line parts 10*a*', 10*a*' run on the sliding contact rib 4*k* of the side close to the sliding contact rib 4*n*.

As described above, when the projected line parts 10*a*', 10*a*' of the unit rear wall reinforcing sheet metal member 10 run on the sliding contact rib 4*k* close to the sliding contact rib 4*n*, the space H which is a space between the inflected section 4*f* of the engagement claw 4*b* and the bottom wall 10*p* of the rear part 2*b* is increased. As a result, when the imaging unit 2 is detached from the camera body 1, the bottom wall 10*p* of the rear part 2*b* is prevented from being somehow damaged by the inflected section 4*f* of the engagement claw 4*b*.

In the case of the embodiment of the present invention, since the guiding groove 10*q* is open toward the left side surface 2*c*, the imaging unit 2 can be detached from the camera body 1 by just sliding the imaging unit parallel to the camera body 1 in the left to right direction as it is. However, the imaging unit 2 can be detached from the camera body 1 also by lifting the imaging unit 2 at the position shown in FIG. 33F in the bottom to up direction.

In addition, the unlocking manipulating member 26 returns to the original position by the biasing force of the unlocking spring 28 when the finger of the user is removed from the unlock button 26*d*.

Thus, in the embodiment, a state where a photographer uses the camera with the lens system facing a subject ahead while holding the grip section 1*c* by right hand when the upper wall section 1D is located topside is referred to as a normal use state. In this normal use state, as the right direction in which the user finds it difficult to manipulate is an unlocking manipulation direction, a concern can be reduced that the imaging unit 2 drops off from the camera body 1 due to erroneous operation during use while the user normally grips the grip section 1*c*.

In addition, in the embodiment, the configuration is described as the body rear wall reinforcing sheet metal member 4 is provided on the back wall section 1B of the camera body 1, the unit rear wall reinforcing sheet metal member 10 is provided on the rear part 2*b* of the imaging unit 2, the unit upper surface wall reinforcing sheet metal member 20 is provided on the rear part 2*b* of the imaging unit 2, the side surface wall reinforcing sheet metal member 6 is provided on the side wall section 1C of the camera body 1 by the insert molding, and the upper wall reinforcing sheet metal member 5 is provided on the upper wall section 1D of the camera body 1 by the insert molding.

Here, the back wall section 1B of the camera body 1 and the rear part 2b of the imaging unit 2 need to be reinforced with a reinforcing member such as the body rear wall reinforcing sheet metal member 4 and the unit rear wall reinforcing sheet metal member 10 in order to adopt the attachable and detachable mechanism, and the upper surface 2d of the imaging unit 2 needs to be reinforced to construct a part of the locking mechanism. However, the side wall section 1C of the camera body 1 and the upper wall section 1D of the camera body 1 do not necessarily need to construct the attachable and detachable mechanism or the locking mechanism. Therefore, the upper wall reinforcing sheet metal member 5 and the side surface wall reinforcing sheet metal member 6 are preferably not to be provided for improvement of the appearance, and the side wall surface of the side wall section 1C and the upper wall surface of the camera body 1 are preferably formed with a resin itself.

(Configuration of the Imaging Apparatus in which the Engagement Protrusion Guiding Hole 10h is Formed in the Body Rear Wall Reinforcing Sheet Metal Member 4 and the Engagement Protrusion 4g is Provided in the Unit Rear Wall Reinforcing Sheet Metal Member 10)

Figure 35:
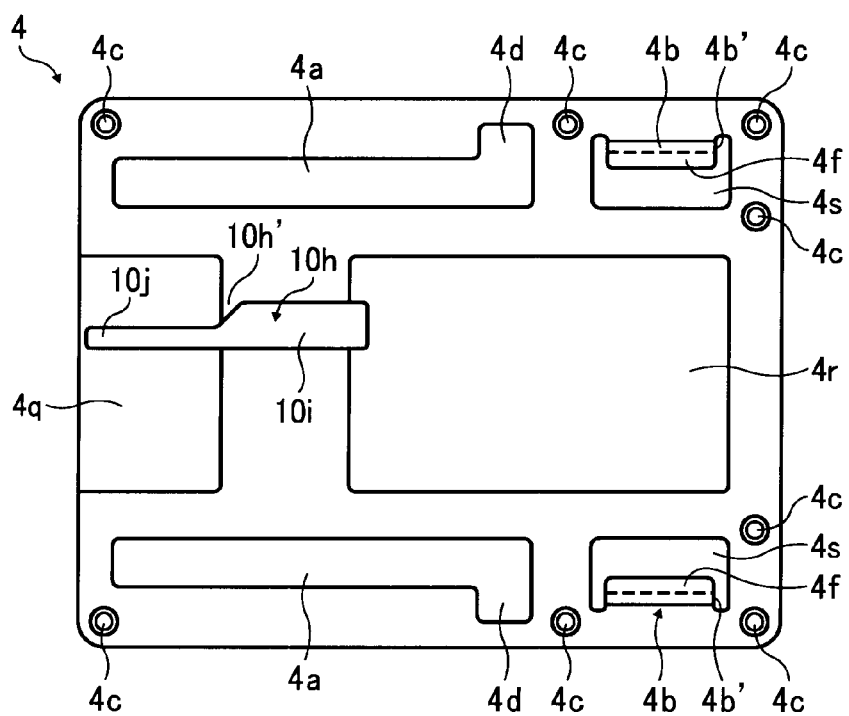
FIG. 35 is a plan view in which an engagement protrusion guiding hole is formed on the body rear wall reinforcing sheet metal member shown in FIG. 7A.
Figure 36:
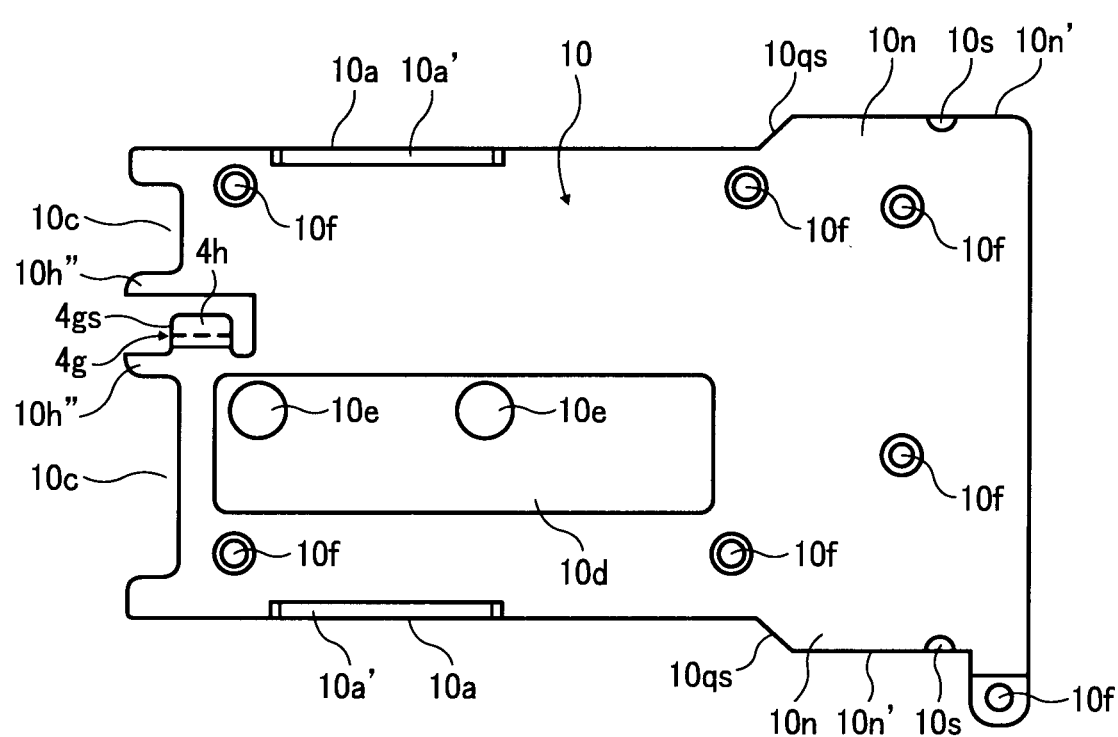
FIG. 36 is a plan view in which an engagement protrusion is formed on the unit rear wall reinforcing sheet metal member shown in FIG. 11B.
Figure 37:
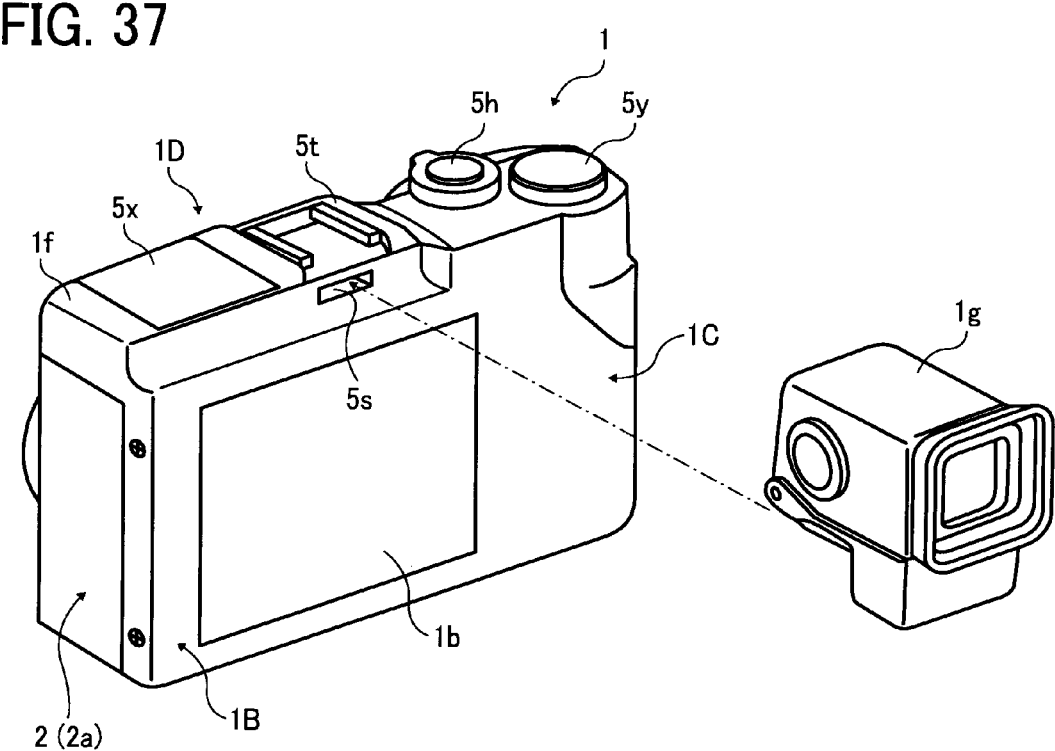
FIG. 37 is an external view showing a state before an electronic viewfinder is attached to the camera body, as viewed from the rear side.

In the embodiment described above, as enlarged and shown in FIG. 7C, the engagement protrusion 4g is provided in the body rear wall reinforcing sheet metal member 4 of the camera body 1, and the engagement protrusion guiding hole 10h which guides the engagement protrusion 4g is formed in the unit rear wall reinforcing sheet metal member 10 of the imaging unit 2, as shown in FIG. 11C. However, a configuration in which the engagement protrusion guiding hole 10h is formed in the body rear wall reinforcing sheet metal member 4 of the camera body 1 as shown in FIG. 35, and in which the engagement protrusion 4g is formed in the unit rear wall reinforcing sheet metal member 10 of the imaging unit 2 as shown in FIG. 36 achieves a similar effect.

Further, in the embodiment, the configuration is proposed such that the projected line parts 10a', 10a' are provided on the rear part 2b of the imaging unit 2, and the projected line escaping recess 4k' is provided on the back wall section 1B of the camera body 1. However, the configuration may also be such that the projected line parts 10a', 10a' are provided on the back wall section 1B of the camera body 1, and the projected line escaping recess 4k' is provided on the rear part 2b of the imaging unit 2.

(Other Configuration 1)

In these embodiments described above, although the configuration is such that the guide protrusion 4j is provided in the camera body and the guiding groove 10q is provided in the imaging unit 2, a configuration may be such that the guiding groove 10q is provided in the camera body 1 and the guide protrusion 4j is provided in the imaging unit 2. Note that, in this case, the engagement claw 4b is formed in the imaging unit 2.

In addition, in these embodiments, although the engagement plate section 10n, the plate spring 2k, and the guiding hole for engagement claw cut and bent section 10r are provided in the imaging unit 2 and the engagement claw 4b is provided in the camera body 1, a configuration may be such that the engagement claw 4b is provided in the imaging unit 2, the engagement plate section 10n, the plate spring 2k, and the guiding hole for engagement claw cut and bent section 10r are provided in the camera body 1.

Furthermore, in these embodiments, although the auxiliary fitting protrusions 14 are provided in the camera body 1 and the auxiliary fitting holes 22 are provided in the imaging unit 2, a configuration may be such that the auxiliary fitting holes 22 are provided in the camera body 1 and the auxiliary fitting protrusions 14 are provided in the imaging unit 2.

In addition, in these embodiments, each two of the guiding holes for engagement claw cut and bent sections 10r, guide protrusions 4j, the engagement plate sections 10n, the guiding grooves 10q, the auxiliary fitting protrusions 14, and the auxiliary fitting holes 22 are provided, and two biasing sections including the inclined elastic plate sections k5, k6 and the abutting plate section k7 are formed for one plate spring 2k. However, the number of these may be three or more.

In addition, in these embodiments, although the unlocking manipulating member 26 is configured so that the unlock button 26d (also referred to as an unlocking lever) turns with the spindle 27 as a supporting point, the unlock button 26d may be configured to be a pushbutton or sliding type.

Furthermore, in these embodiments, although the configuration is such that the imaging unit connector section 11 protrudes from the left side surface 2c of the imaging unit 2 and the camera-body connector section 12 is provided in the opening 52 formed on the side wall section 1C of the camera body 1, a configuration may be such that the opening 52 is provided on the left side surface 2c of the imaging unit 2, the imaging unit connector section 11 is placed in the opening 52, and the camera-body connector section 12 is protruded from the side wall section 1C of the camera body 1.

That is to say, the connector section may protrude from any one of the left side surface 2c of the imaging unit 2 and the side wall section 1C of the camera body 1, and the opening may be provided in any other one of the left side surface 2c of the imaging unit 2 and the side wall section 1C of the camera body 1.

In addition, if the engagement protrusion (angle controlling member) 4g is placed between the side wall section 1C and the biasing section with the imaging unit 2 placed in the recess 1A of the camera body 1 and with the camera-body connector section 12 and the imaging unit connector section 11 connected to each other, an angle around the direction (the Y direction) orthogonal to the first direction can be controlled even when the height of the engagement protrusion (angle controlling member) 4g is low.

In addition, even if the engagement protrusion (angle controlling member) 4g is placed at a position closer to the side wall section 1C than to the biasing section with the imaging unit 2 placed in the recess 1A of the camera body 1 and with the camera-body connector section 12 and the imaging unit connector section 11 connected to each other, the engagement protrusion (angle controlling member) 4g can perform similar angle control.

If the engagement protrusion (angle controlling member) 4g is placed almost at the center of the camera-body connector section 12 when it is viewed in a direction perpendicular to the first direction (the X direction) in which the imaging unit 2 moves toward or away from the side wall section 1C, with the imaging unit 2 placed in the recess 1A of the camera body 1 and with the camera-body connector section 12 and the image pickup side connector section 11 connected to each other, the engagement protrusion (angle controlling member) 4g can control an angle around the first direction (the X direction) of the imaging unit 2.

If the engagement protrusion (angle controlling member) 4g is placed almost at the center of the recess 1A when it is viewed in the direction (the Y direction) perpendicular to the first direction (the X direction) in which the imaging unit 2 moves toward or away from the side wall section C, with the imaging unit 2 placed in the recess 1A of the camera body 1 and with the camera-body connector section 12 and the imaging unit connector section 11 connected to each other, the engagement protrusion (angle controlling member) 4g can further control an angle around the first direction (the X direction) of the imaging unit 2.

When the biasing section includes a first biasing section and a second biasing section arranged at an interval in a direction perpendicular to the first direction (the X direction) in which the imaging unit 2 moves toward or away from the side wall section 1C, and the engagement protrusion (angle controlling member) 4g is placed almost at the center between the first engagement claw 4b and the second engagement claw 4b when it is viewed in the direction (the Y direction) almost perpendicular to the first direction (the X direction), an angle around the first direction (the X direction) of the imaging unit 2 can be further controlled even when a failure occurs in any one of engagement with the first engagement claw 4b and engagement with the second engagement claw 4b.

In a state where the guide mechanism includes the camera-body guide mechanism and the imaging unit guide mechanism, the imaging unit guide mechanism includes the guiding groove provided on the rear part 2b of the imaging unit 2 and extending in a direction corresponding to the first direction, the camera-body guide mechanism includes the guide protrusion provided on the back wall section 1B of the camera body 1 and to be inserted in the guiding groove, the guide protrusion includes the first guide protrusion and the second guide protrusion arranged at an interval in a direction perpendicular to the first direction, the imaging unit 2 is placed in the recess 1A of the camera body 1, and the camera-body connector section 12 and the imaging unit connector section 11 are connected to each other, the engagement protrusion (angle controlling member) 4g is positioned between the first guide protrusion and the second guide protrusion when it is viewed in a direction perpendicular to the first direction.
(Other Configuration 2)

In the embodiments of the present invention described above, when the imaging unit 2 is moved to the camera body 1 in the arrow F2 direction shown in FIG. 33F or in a direction opposite thereto, although the configuration is such that the rear part 2b (unit rear wall reinforcing sheet metal member 10) of the imaging unit 2 is caused to abut on the back wall section 1B (rear wall reinforcing sheet metal member for body 4) of the camera body 1 and to slide, a configuration may be such that the upper wall section 1D of the camera body 1 (upper wall reinforcing sheet metal member 5) is caused to abut on the upper surface 2d (surrounding wall 2x or unit upper surface wall reinforcing sheet metal member 20) of the housing 2A of the imaging unit 2 and to slide in the arrow F2 direction or in an direction opposite thereto.

With such a configuration, the upper wall section 1D of the camera body 1 (body upper surface wall reinforcing sheet metal member 5) of the camera body 1 and the upper surface 2d (surrounding wall 2x or upper wall reinforcing sheet metal member for unit 20) of the housing 2A of the imaging unit 2 function as a guide mechanism which guides the imaging unit 2 in the first direction.

Alternatively, the guide protrusion 4j, the rectangular protrusion 4m and the engagement claw 4b may be provided on the upper wall section 1D of the camera body 1, and the guiding groove 10q and the guiding hole for engagement claw cut and bent section 10r may be provided on the upper surface 2d of the housing 2A.

With such a configuration, the guide protrusion 4j, the rectangular protrusion 4m and the engagement claw 4b which are provided on the upper wall section 1D of the camera body 1, the guiding grooves 10q provided on the upper surface 2d of the imaging unit 2, and the guiding hole for engagement claw cut and bent section 10r function as a guide mechanism which guides the imaging unit 2 in the first direction.

In addition, on the contrary, the guide protrusion 4j, the rectangular protrusion 4m and the engagement claw 4b may be provided on the upper surface 2b of the imaging unit 2, and the guiding grooves 10q and the guiding hole for engagement claw cut and bent section 10r may be provided on the upper wall section 1D of the camera body 1.

With such a configuration, the guide protrusion 4j, the rectangular protrusion 4m and the engagement claw 4b which are provided on the upper surface 2d of the imaging unit 2, and the guiding grooves 10q and the guiding hole for engagement claw cut and bent section 10r which are provided on the upper wall section 1D of the camera body 1 function as a guide mechanism which guides the imaging unit 2 in the first direction.

Thus, rattling in the up-down direction between the imaging unit 2 and the camera body 1 can be further controlled by arranging a part of the guide mechanism on the upper surface section 1D of the camera body 1 and the upper surface 2d of the imaging unit 2.

Furthermore, the guide mechanisms may be provided on both back wall section 1B and the upper wall section 1D.
(Other Configuration 3)

Although the embodiments of the present invention have been described above, the present invention is not limited to them. As shown in FIGS. 37 to 40, for example, a configuration may be such that the hot shoe section 5t to which the strobe device and the electronic viewfinder 1g can be attached, the electronic viewfinder connection terminal 5s, the popup type strobe light emitting device 5x, and a mode dial switch 5h are provided on an upper surface 1f of the upper wall section 1D of the camera body 1. In addition, the electronic viewfinder connection terminal 5s shown in FIG. 37 includes a female type connector. The electronic viewfinder connection terminal 5s' as the male type connector shown in FIG. 39 is fitted into the electronic viewfinder connection terminal 5s.

Figure 38:
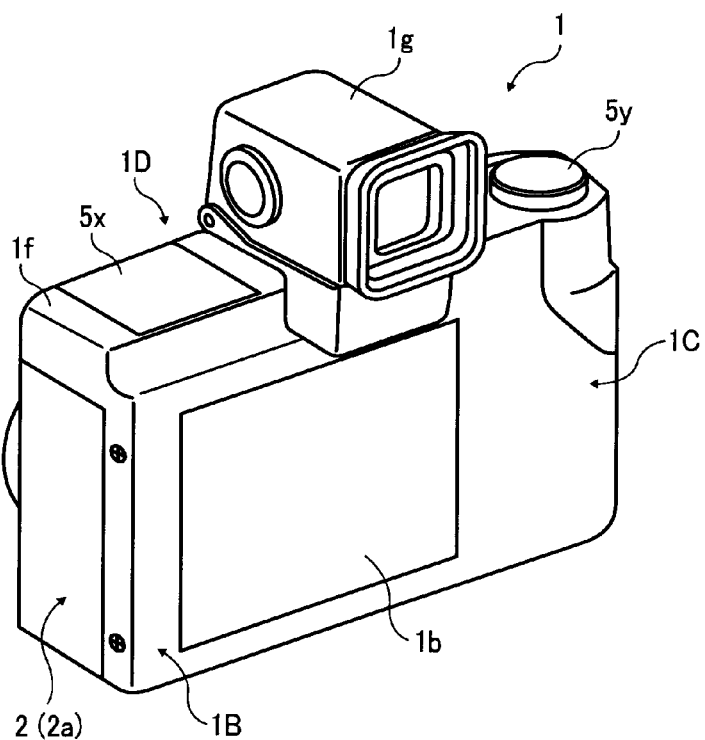
FIG. 38 is an external view showing a state where an electronic viewfinder is attached to the camera body, as viewed from the rear side.
Figure 39:
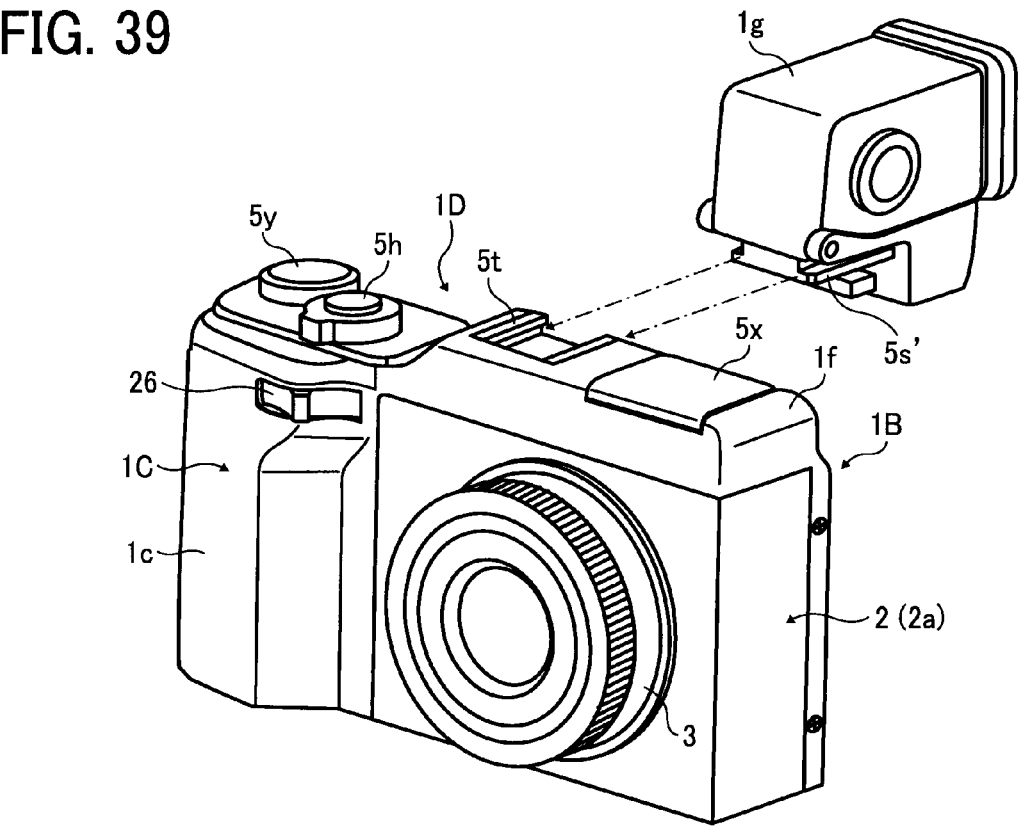
FIG. 39 is an external view showing a state before an electronic viewfinder is attached to the camera body, as viewed from the front side.
Figure 40:
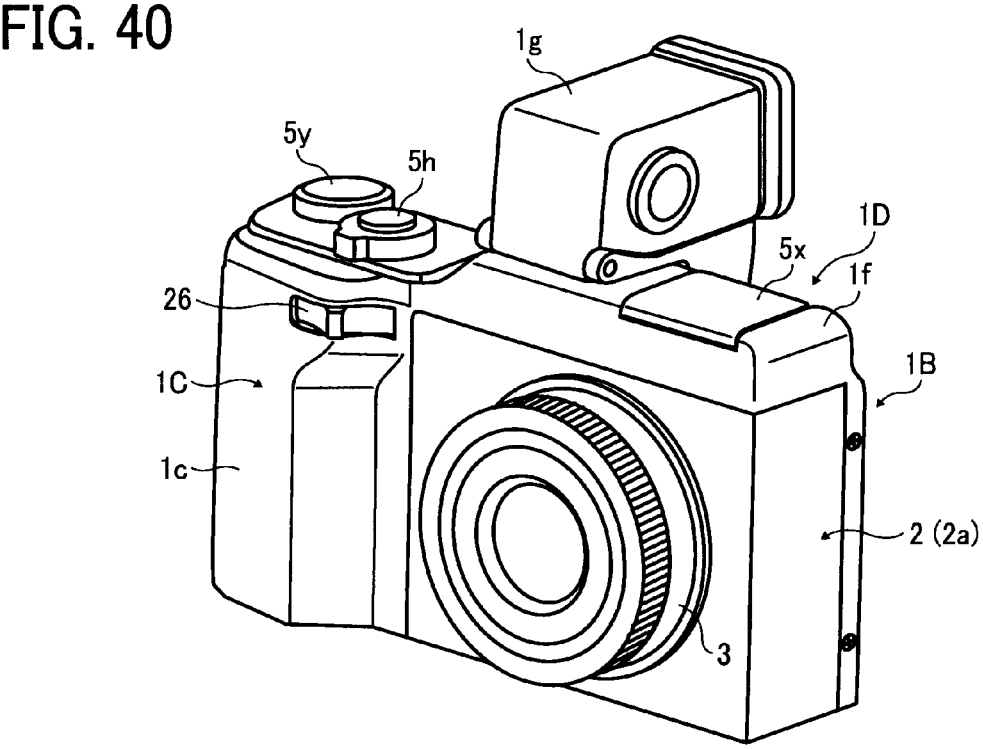
FIG. 40 is an external view showing a state where an electronic viewfinder is attached to the camera body, as viewed from the front side.

In addition, in FIGS. 37 to 40, FIG. 37 shows a state before the electronic viewfinder 1g is attached to the camera body 1 when the camera body 1 is viewed from the rear side, FIG. 38 shows a state where the electronic viewfinder 1g is attached to the camera body 1 when the camera body 1 is viewed from the rear side, FIG. 39 shows a state before the electronic viewfinder 1g is attached to the camera body 1 when the camera body 1 is viewed from the front face side, and FIG. 40 shows a state where the electronic viewfinder 1g is attached to the camera body 1 when the camera body 1 is viewed from the front face.

Although the embodiments have been described above, the imaging apparatus according to the present invention can be formed by combining the configurations of these embodiments as appropriate.

According to the present invention, when the imaging unit is attached to or detached from the camera body, the connection of the camera body and the imaging unit can be performed accurately and smoothly. Also, the quality of the manipulation of the attaching and detaching can be improved.

Specifically, since the guiding groove of the imaging unit reaches the end surface where the imaging unit connector section of the housing is provided, the imaging unit can be connected to the camera body with a highly secure connection and in a highly accurate position only by performing a sliding operation which is to slide the imaging unit to one direction.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A camera body comprising a recess to which an imaging unit is detachably attached to be placed therein, wherein:
the imaging unit includes an optical system configured to guide light incoming from a subject, an image pickup device configured to convert a subject image guided by the optical system into an electrical signal, and an imaging unit connector section;
the recess includes a back wall section, an upper wall section, and a side wall section to be opened to a lower side, a front side, and a lateral side of the camera body, the back wall section facing a rear of the imaging unit when the imaging unit is placed in the recess, the upper wall section facing a topside of the imaging unit when the imaging unit is placed in the recess and being connected to the back wall section, the side wall section facing a side surface of the imaging unit when the imaging unit is placed in the recess and being connected to the back wall section and the side wall section;
the camera body has a camera body connector section;
the camera body has a guide mechanism configured to control a position of the camera body connector section in relation to a position of the imaging unit connector section in cooperation with the imaging unit and guide the imaging unit in a direction where the imaging unit approaches or separates from the side wall section of the camera body;
the imaging unit has a rear surface on which at least two guiding grooves and an engagement plate section are formed, the at least two guiding grooves being provided to be extended between an edge of the imaging unit and an opposite edge of the imaging unit;
one of the camera body and the imaging unit has a biasing member configured to bias the imaging unit toward the back wall section of the camera body;
the guide mechanism has at least two guide protrusions provided on the back wall section of the camera body, the at least two guide protrusions being capable of being inserted into the at least two guiding grooves; and
the guide mechanism has an engagement claw formed on the back wall section of the camera body so as to face the engagement plate section and to engage with the biasing member when the imaging unit is attached to the camera body.

2. The camera body according to claim 1, wherein:
the rear surface of the imaging unit has a projected line part;
the back wall section of the camera body has a projected line escaping recess configured to adjust a distance between the engagement claw and a bottom wall of the guiding groove in cooperation with the projected line part; and
the projected line escaping recess is configured to minify the distance between the engagement claw and the bottom wall of the guiding groove if the projected line part is positioned at the projected line escaping recess when the imaging unit is attached to or detached from the camera body and to enlarge the distance between the engagement claw and the bottom wall of the guiding groove if the projected line part is not positioned at the projected line escaping recess when the imaging unit is attached to or detached from the camera body.

3. The camera body according to claim 1, wherein:
the rear surface of the imaging unit has a projected line escaping recess;
the back wall section of the camera body has a projected line part configured to adjust a distance between the engagement claw and a bottom wall of the guiding groove in cooperation with the projected line escaping recess; and
the projected line part is configured to minify the distance between the engagement claw and the bottom wall of the guiding groove if the projected line part is positioned at the projected line escaping recess when the imaging unit is attached to or detached from the camera body and to enlarge the distance between the engagement claw and the bottom wall of the guiding groove if the projected line part is not positioned at the projected line escaping recess when the imaging unit is attached to or detached from the camera body.

4. The camera body according to claim 2, wherein:
the back wall section of the camera body has a resin plate and a body rear wall reinforcing sheet metal member having the engagement claw;
the resin plate has a sliding contact rib adjoined to the guide protrusion along with the guide protrusion;
the projected line escaping recess is formed to be extended along the guide protrusion;
the rear surface of the imaging unit is provided with a unit rear wall reinforcing sheet metal member having the projected line part;
an outer surface of the unit rear wall reinforcing sheet metal member is capable of being slidably contacted with the sliding contact rib.

5. The camera body according to claim 4, wherein:
the guide protrusion has a guide surface with which a marginal portion of the unit rear wall reinforcing sheet metal member slidably contacts;
the sliding contact rib abuts on the projected line part of the unit rear wall reinforcing sheet metal member from a side of the outer surface of the unit rear wall reinforcing sheet metal member to enlarge the distance between the engagement claw and the bottom wall of the guiding groove.

6. The camera body according to claim 5, wherein:
the body rear wall reinforcing sheet metal member has an engagement protrusion configured to abut on the outer surface of the unit rear wall reinforcing sheet metal member from the side of the outer surface of the unit rear wall reinforcing sheet metal member when the engagement claw of the body rear wall reinforcing sheet metal member abuts on an outer surface of the engagement plate section of the unit rear wall reinforcing sheet metal member from the side of the outer surface of the unit rear wall reinforcing sheet metal member in order to stop the camera body connector section and the imaging unit connector section from being connected each other in a way that the imaging unit is to be slantingly attached to the camera body.

7. The camera body according to claim 6, wherein:
the unit rear wall reinforcing sheet metal member has an engagement protrusion guiding hole; and
the engagement protrusion is inserted into the engagement protrusion guiding hole when the engagement claw is inserted into the guiding groove.

8. An imaging unit comprising a housing configured to be detachably attached to a camera body, wherein:

the housing includes an optical system configured to guide light incoming from a subject, an image pickup device configured to convert a subject image guided by the optical system into an electrical signal, and an imaging unit connector section;

the camera body has a camera body connector section configured to perform communication with the imaging unit connector section;

the camera body has a recess to which the housing is attached;

the recess includes a back wall section facing a rear surface of the housing when the housing is mounted on the camera body, an upper wall section facing a topside of the housing when the housing is mounted on the camera body, and a side wall section facing a side surface of the housing when the housing is mounted on the camera body;

the housing has a guide mechanism configured to control a position of the imaging unit connector section in relation to a position of the camera body connector section in cooperation with the camera body and guide the housing in a direction where the housing approaches or separates from the side wall section of the camera body;

the back wall section of the camera body has at least two guide protrusions and an engagement claw;

one of the camera body and the housing has a biasing member configured to bias the housing toward the back wall section of the camera body;

the guide mechanism has an engagement plate section formed on the rear surface of the housing so as to face the engagement claw and to engage with the biasing member when the housing is attached to the camera body;

the guide mechanism has at least two guide protrusions configured to be capable of being inserted into the at least two guiding grooves; and the at least two guiding grooves are extended between an edge of the housing and an opposite edge of the housing.

9. The imaging unit according to claim 8, wherein:

the back wall section of the camera body has a projected line part;

the rear surface of the housing has a projected line escaping recess configured to adjust a distance between the engagement claw and a bottom wall of the guiding groove in cooperation with the projected line part; and the projected line escaping recess is configured to minify the distance between the engagement claw and the bottom wall of the guiding groove if the projected line part is positioned at the projected line escaping recess when the housing is attached to or detached from the camera body and to enlarge the distance between the engagement claw and the bottom wall of the guiding groove if the projected line part is not positioned at the projected line escaping recess when the housing is attached to or detached from the camera body.

10. The imaging unit according to claim 8, wherein:

the back wall section of the camera body has a projected line escaping recess;

the rear surface of the housing has a projected line part configured to adjust a distance between the engagement claw and a bottom wall of the guiding groove in cooperation with the projected line escaping recess; and the projected line part is configured to minify the distance between the engagement claw and the bottom wall of the guiding groove if the projected line part is positioned at the projected line escaping recess when the housing is attached to or detached from the camera body and to enlarge the distance between the engagement claw and the bottom wall of the guiding groove if the projected line part is not positioned at the projected line escaping recess when the housing is attached to or detached from the camera body.

11. The imaging unit according to claim 10, wherein:

the rear surface of the housing has a unit rear wall reinforcing sheet metal member having the projected line part;

the back wall section of the camera body has a resin plate having a sliding contact rib being adjoined with the guide protrusion;

the projected line part abuts on the sliding contact rib to enlarge the distance between the engagement claw and the bottom wall of the guiding groove.

12. The imaging unit according to claim 11, wherein:

the resin plate has the projected line escaping recess;

the distance between the engagement claw and the bottom wall of the guiding groove is minified when the projected line part goes into the projected line escaping recess so that the unit rear wall reinforcing sheet metal member slidably contacts the sliding contact rib.

13. The imaging unit according to claim 12, wherein:

the body rear wall reinforcing sheet metal member has an engagement protrusion;

the engagement protrusion abuts on an outer surface of the unit rear wall reinforcing sheet metal member when the engagement claw of the body rear wall reinforcing sheet metal member abuts on an outer surface of the engagement plate section of the unit rear wall reinforcing sheet metal member from a side of the outer surface of the unit rear wall reinforcing sheet metal member in order to stop the imaging unit connector section from being connected with the camera body connector section in a way that the housing is to be slantingly attached to the camera body.

14. The imaging unit according to claim 13, wherein:

the unit rear wall reinforcing sheet metal member has a engagement protrusion guiding hole; and the engagement protrusion is inserted into the engagement protrusion guiding hole when the engagement claw is inserted into the guiding groove.

15. An imaging apparatus comprising:

a camera body configured to include a recess; and an imaging unit configured to be detachably attached to the recess of the camera body, wherein:

the imaging unit includes an optical system configured to guide light incoming from a subject, an image pickup device configured to convert a subject image guided by the optical system into an electrical signal, and an imaging unit connector section;

the recess includes a back wall section, an upper wall section, and a side wall section to be opened to a lower side, a front side, and a lateral side of the camera body, the back wall section facing a rear of the imaging unit when the imaging unit is placed in the recess, the upper wall section facing a topside of the imaging unit when the imaging unit is placed in the recess and being connected to the back wall section, and the side wall section facing a side surface of the imaging unit when the imaging unit is placed in the recess and being connected to the back wall section and the side wall section;

the camera body has a camera body connector section;

the camera body and the imaging unit has a guide mechanism configured to control a position of the camera body connector section in a relation to a position of the imaging unit connector section and guide the imaging unit in a direction where the imaging unit approaches or separates from the side wall section of the camera body;

the imaging unit has a rear surface on which at least two guiding grooves and an engagement plate section are formed;

the at least two guiding grooves are provided to be extended between an edge of the imaging unit and an opposite edge of the imaging unit;

one of the camera body and the imaging unit has a biasing member configured to bias the imaging unit toward the back wall section of the camera body;

the guide mechanism has at least two guide protrusions provided on the back wall section of the camera body, the at least two guide protrusions being capable of being inserted into the at least two guiding grooves; and the guide mechanism has an engagement claw formed on the back wall section of the camera body so as to face the engagement plate section and to engage with the biasing member when the imaging unit is attached to the camera body.

16. The imaging apparatus according to claim 15, wherein:

one of the back wall section of the camera body and the rear surface of the imaging unit has a projected line part;

the other one of the back wall section of the camera body and the rear surface of the imaging unit has a projected line escaping recess;

the imaging apparatus minifies a distance between the engagement claw and a bottom wall of the guiding groove if the projected line part is positioned at the projected line escaping recess when the imaging unit is attached to or detached from the camera body;

the imaging apparatus enlarges the distance between the engagement claw and the bottom wall of the guiding groove if the projected line part is not positioned at the projected line escaping recess when the imaging unit is attached to or detached from the camera body.

17. The imaging apparatus according to claim 16, wherein:

the back wall section of the camera body has a resin plate and a body rear wall reinforcing sheet metal member having the engagement claw;

the resin plate has a sliding contact rib being adjoined with the guide protrusion along with the guide protrusion;

the projected line escaping recess is formed to be extended along the guide protrusion;

the rear surface of the imaging unit is provided with a unit rear wall reinforcing sheet metal member having the projected line part; and an outer surface of the unit rear wall reinforcing sheet metal member is capable of being slidably contacted with the sliding contact rib.

18. The imaging apparatus according to claim 17, wherein:

the guide protrusion has a guide surface with which a marginal portion of the unit rear wall reinforcing sheet metal member slidably contacts;

the sliding contact rib abuts on the projected line part from a side of the outer surface of the unit rear wall reinforcing sheet metal member to enlarge the distance between the engagement claw and the bottom wall of the guiding groove.

19. The imaging apparatus according to claim 18, wherein the body rear wall reinforcing sheet metal member has an engagement protrusion configured to abut on the outer surface of the unit rear wall reinforcing sheet metal member from the side of the outer surface of the unit rear wall reinforcing sheet metal member when the engagement claw of the body rear wall reinforcing sheet metal member abuts on an outer surface of the engagement plate section of the unit rear wall reinforcing sheet metal member from the side of the outer surface of the unit rear wall reinforcing sheet metal member in order to stop the imaging unit connector section from being connected with the camera body connector section in a way that the imaging unit is to be slantingly attached to the camera body.

20. The imaging apparatus according to claim 19, wherein:

the unit rear wall reinforcing sheet metal member has an engagement protrusion guiding hole; and the engagement protrusion is inserted into the engagement protrusion guiding hole when the engagement claw is inserted into the guiding groove.

* * * * *